US012643763B2

(12) United States Patent
Saito et al.

(10) Patent No.: US 12,643,763 B2
(45) Date of Patent: Jun. 2, 2026

(54) MEDIUM PROCESSING APPARATUS AND IMAGE FORMING SYSTEM INCORPORATING SAME

(71) Applicants: Jun Saito, Kanagawa (JP); Kensuke Fukuchi, Kanagawa (JP); Naoki Kobayashi, Kanagawa (JP); Yasushi Tsuruoka, Kanagawa (JP); Shohei Saito, Kanagawa (JP); Kei Sasaki, Kanagawa (JP); Keisuke Sugiyama, Kanagawa (JP)

(72) Inventors: Jun Saito, Kanagawa (JP); Kensuke Fukuchi, Kanagawa (JP); Naoki Kobayashi, Kanagawa (JP); Yasushi Tsuruoka, Kanagawa (JP); Shohei Saito, Kanagawa (JP); Kei Sasaki, Kanagawa (JP); Keisuke Sugiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 125 days.

(21) Appl. No.: 18/603,581

(22) Filed: Mar. 13, 2024

(65) Prior Publication Data

US 2024/0317533 A1 Sep. 26, 2024

(30) Foreign Application Priority Data

Mar. 20, 2023 (JP) ................................ 2023-044250
Jan. 31, 2024 (JP) ................................ 2024-013323

(51) Int. Cl.
*B31F 5/02* (2006.01)
*B41J 2/175* (2006.01)
*B65H 37/04* (2006.01)

(52) U.S. Cl.
CPC .......... *B65H 37/04* (2013.01); *B41J 2/17566* (2013.01); *B65H 2301/5161* (2013.01)

(58) Field of Classification Search
CPC ..... G03G 15/6544; G03G 2215/00848; G03G 2215/00852; B31F 1/07; B31F 1/36;
(Continued)

(56) References Cited

U.S. PATENT DOCUMENTS 10,406,772 B2 * 9/2019 Takahashi ................. B42C 1/12
11,868,073 B2 * 1/2024 Sasaki ................ G03G 15/6544
(Continued)

FOREIGN PATENT DOCUMENTS

CN 102529453 A 7/2012
CN 102791490 A 11/2012
(Continued)

OTHER PUBLICATIONS

Chinese Office Action dated Apr. 24, 2026 issued in corresponding Chinese Patent Appln. No. 202410258959.9.

*Primary Examiner* — Leslie A Nicholson, III
(74) *Attorney, Agent, or Firm* — Harness, Dickey & Pierce, P.L.C.

(57) ABSTRACT

A medium processing apparatus includes a liquid applier, a post-processing device, a liquid storage unit, a liquid detector, and circuitry. The liquid applier applies liquid to a part of at least one medium. The post-processing device performs a given process on a bundle of media. The liquid storage unit stores the liquid. The liquid detector detects the liquid in the liquid storage unit. The circuitry is to determine whether to cause the liquid applier to apply the liquid on the at least one medium based on a detection result of the liquid detector, and set a number of times of application of the liquid to be equal to or less than a given number of times of application of the liquid when the liquid detector does not detect the liquid in the liquid storage unit.

11 Claims, 29 Drawing Sheets

(58) Field of Classification Search
CPC ................ B31F 5/02; B31F 2201/0754; B31F 2201/0784; B65H 37/04; B65H 2301/51616; B65H 2301/43828; B65H 2301/5142
USPC ........................................................ 270/58.08
See application file for complete search history.

(56) References Cited

U.S. PATENT DOCUMENTS

| | | | | |
|---|---|---|---|---|
| 11,914,317 | B2 * | 2/2024 | Kamiya | G03G 21/1814 |
| 12,162,242 | B2 * | 12/2024 | Fukuchi | B42B 5/00 |
| 12,337,570 | B2 * | 6/2025 | Saito | H04N 1/00639 |
| 2012/0105530 | A1 | 5/2012 | Munakata | |
| 2013/0044148 | A1 | 2/2013 | Kobayashi | |
| 2014/0219747 | A1 | 8/2014 | Takahashi et al. | |
| 2017/0225454 | A1 | 8/2017 | Yoshida | |
| 2022/0334525 | A1 | 10/2022 | Sasaki et al. | |
| 2022/0394145 | A1 | 12/2022 | Seto et al. | |
| 2023/0020065 | A1 | 1/2023 | Kamiya et al. | |
| 2023/0234322 | A1 | 7/2023 | Fukuchi et al. | |
| 2023/0234804 | A1 | 7/2023 | Suzuki et al. | |
| 2023/0241859 | A1 | 8/2023 | Saito et al. | |
| 2023/0271804 | A1 | 8/2023 | Abe et al. | |
| 2023/0294950 | A1 | 9/2023 | Ibuka et al. | |
| 2023/0399191 | A1 | 12/2023 | Akamatsu et al. | |
| 2023/0416040 | A1 | 12/2023 | Sasaki et al. | |

FOREIGN PATENT DOCUMENTS

| | | | |
|---|---|---|---|
| JP | 2014148398 | A | 8/2014 |
| JP | 2016-016973 | A | 2/2016 |
| JP | 2018-199245 | A | 12/2018 |
| JP | 2021-135517 | A | 9/2021 |

* cited by examiner

FIG. 20

D16

| BINDING POSITION | THICKNESS OF RECORDING MEDIUM | NUMBER OF LIQUID APPLICATIONS |
|---|---|---|
| FRONT BINDING | NORMAL PAPER | 2 TIMES |
| | THICK PAPER | 3 TIMES |
| BACK BINDING | NORMAL PAPER | 2 TIMES |
| | THICK PAPER | 3 TIMES |
| DOUBLE BINDING | NORMAL PAPER | 4 TIMES |
| | THICK PAPER | 4 TIMES |

MEDIUM PROCESSING APPARATUS AND IMAGE FORMING SYSTEM INCORPORATING SAME

CROSS-REFERENCE TO RELATED APPLICATIONS

This patent application is based on and claims priority pursuant to 35 U.S.C. § 119(a) to Japanese Patent Application Nos. 2023-044250, filed on Mar. 20, 2023, and 2024-013323, filed on Jan. 31, 2024, in the Japan Patent Office, the entire disclosure of each of which is hereby incorporated by reference herein.

BACKGROUND

Technical Field

Embodiments of the present disclosure relate to a medium processing apparatus and an image forming system incorporating the medium processing apparatus.

Background Art

Various types of medium processing apparatuses are known that bind a sheet bundle of stacked sheet media. Such medium processing apparatuses employ binding processes including, for example, a "stapling process" for penetrating needle-shaped members (binding members) through a sheet bundle to bind the sheet bundle and a "crimping process" for performing pressure deformation on a portion of a sheet bundle to bind the sheet bundle.

In a liquid application crimp device that applies liquid to sheets as sheet-like media when performing crimp-binding, for the purpose of easily handling a binding unit that performs crimp binding after liquid application, a technique is disclosed in which a liquid application crimp device that applies liquid to sheets as sheet-like media when performing crimp-binding includes a liquid reservoir for applying liquid, and a liquid supply pump for supplying liquid to the liquid reservoir.

SUMMARY

Embodiments of the present disclosure described herein provide a novel medium processing apparatus includes a liquid applier, a post-processing device, a liquid storage unit, a liquid detector, and circuitry. The liquid applier applies liquid to a part of at least one medium. The post-processing device performs a given process on a bundle of media including the at least one medium on which the liquid is applied by the liquid applier. The liquid storage unit stores the liquid. The liquid detector detects the liquid in the liquid storage unit. The circuitry is to determine whether to cause the liquid applier to apply the liquid on at least one medium based on a detection result of the liquid detector, and set a number of times of application of the liquid to be equal to or less than a given number of times of application of the liquid when the liquid detector does not detect the liquid in the liquid storage unit.

Further, embodiments of the present disclosure described herein provide an image forming system including an image forming apparatus, a medium processing apparatus, and circuitry. The image forming apparatus forms an image on a medium. The medium processing apparatus includes a liquid applier, a post-processing device, and a liquid storage unit, a liquid detector. The liquid applier applies liquid to a part of at least one medium, on which the image is formed by the image forming apparatus. The post-processing device performs a given process on a bundle of media including the at least one medium on which the liquid is applied by the liquid applier. The liquid storage unit stores the liquid. The liquid detector detects the liquid in the liquid storage unit. The circuitry is to determine whether to cause the liquid applier to apply the liquid on at least one medium based on a detection result of the liquid detector, and set a number of times of application of the liquid to be equal to or less than a given number of times of application of the liquid when the liquid detector does not detect the liquid in the liquid storage unit.

BRIEF DESCRIPTION OF THE SEVERAL VIEWS OF THE DRAWINGS

Exemplary embodiments of this disclosure will be described in detail based on the following figures, wherein:

FIGS. 12(A), 12(B), and 12(C) are diagrams each illustrating a configuration of attachment and detachment of the second liquid storage tank of the post-processing apparatus;

FIG. 20 is a diagram illustrating an example of sheet information according to the present embodiment;

Figure 1:
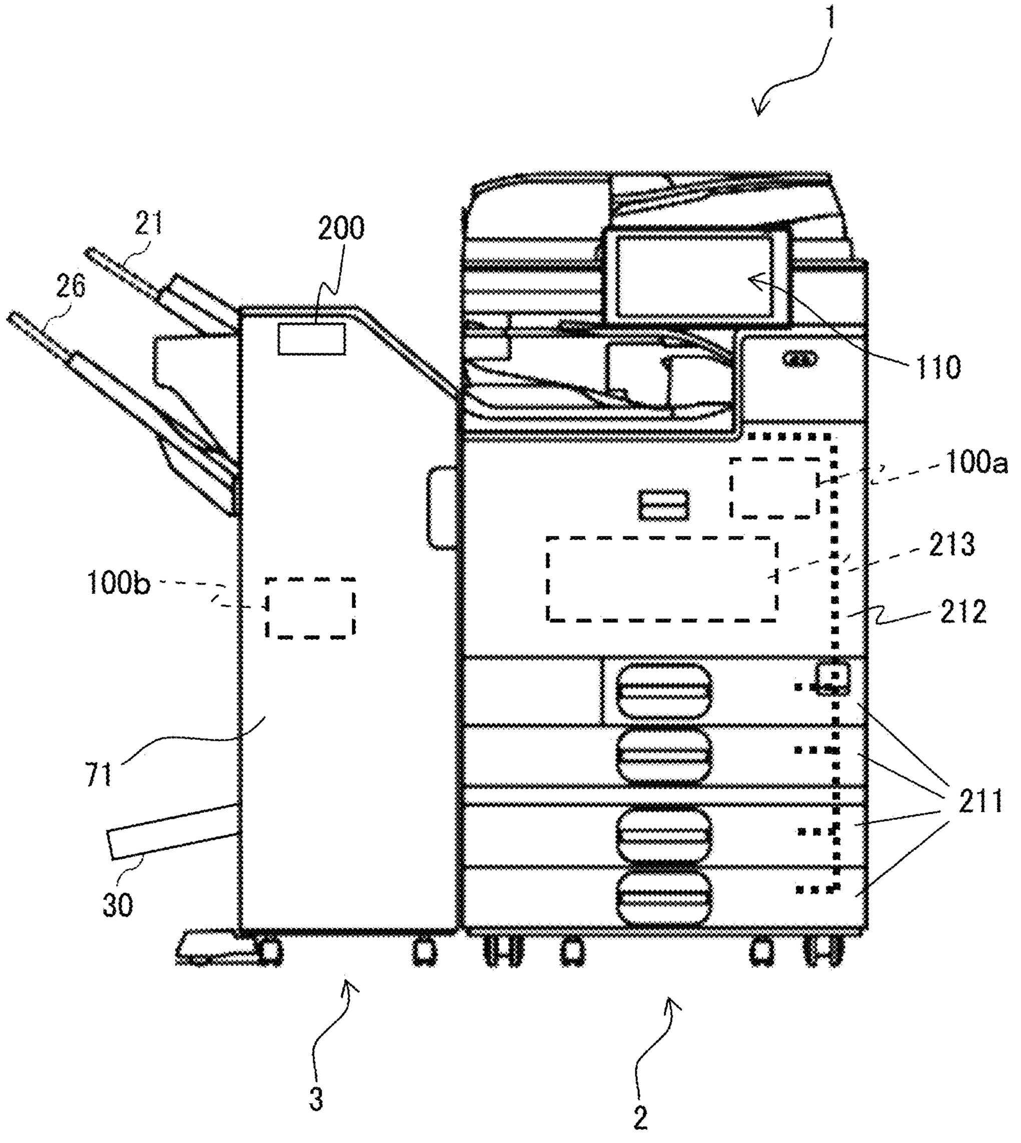
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Embodiment of Image Forming System 1

A description is given of an image forming system 1 according to an embodiment of the present disclosure, with reference to the drawings.

FIG. 1 is a diagram illustrating an overall configuration of the image forming system 1.

The image forming system 1 has a function of forming an image on a sheet P as a sheet medium and a function of performing a post-processing operation on the sheet P as a process after the image is formed on the sheet P. As illustrated in FIG. 1, the image forming system 1 includes an image forming apparatus 2 including the image forming function and a post-processing apparatus 3 serving as a medium processing apparatus including the post-processing function, according to an embodiment of the present disclosure. In the image forming system 1, the image forming apparatus 2 and the post-processing apparatus 3 operate in conjunction with each other.

In the present embodiment, the sheet-like medium to be processed in the image forming system 1 is described on the assumption that the medium is a sheet of "paper". The object to be processed according to the present embodiment is not limited to a paper. For example, any material or specification may be used as long as an image can be formed on a medium in a known image forming process and the medium is a target of the image forming process. The medium includes a medium which can be an object of the folding process or the binding process, and the material or the specification is not limited.

The image forming apparatus 2 forms an image on the sheet P and ejects the sheet P having the image to the post-processing apparatus 3. The image forming apparatus 2 includes a sheet tray 211 that accommodates the sheet P, a conveyor 212 that conveys the sheet P accommodated in the sheet tray 211, and an image former 213 that forms an image on the sheet P conveyed by the conveyor 212. The image former 213 may be an inkjet system that forms an image using ink or an electrophotographic system that forms an image using toner. The image forming apparatus 2 also includes a controller 100*a* that controls various operations of the conveyor 212 and the image former 213. Since the image forming apparatus 2 has a typical configuration, a detailed description of the configuration and functions of the image forming apparatus 2 are omitted.

Sheets of paper are widely known as an example of sheet-shaped media. Further, in the following description, a sheet-shaped medium as a medium to be processed is referred to as a "sheet P." Further, in the following description, a bundle of sheets of paper as a plurality of media is an example of a "sheet bundle Pb."

A description is given of the post-processing apparatus 3 according to a first embodiment of the present disclosure.

Figure 2:
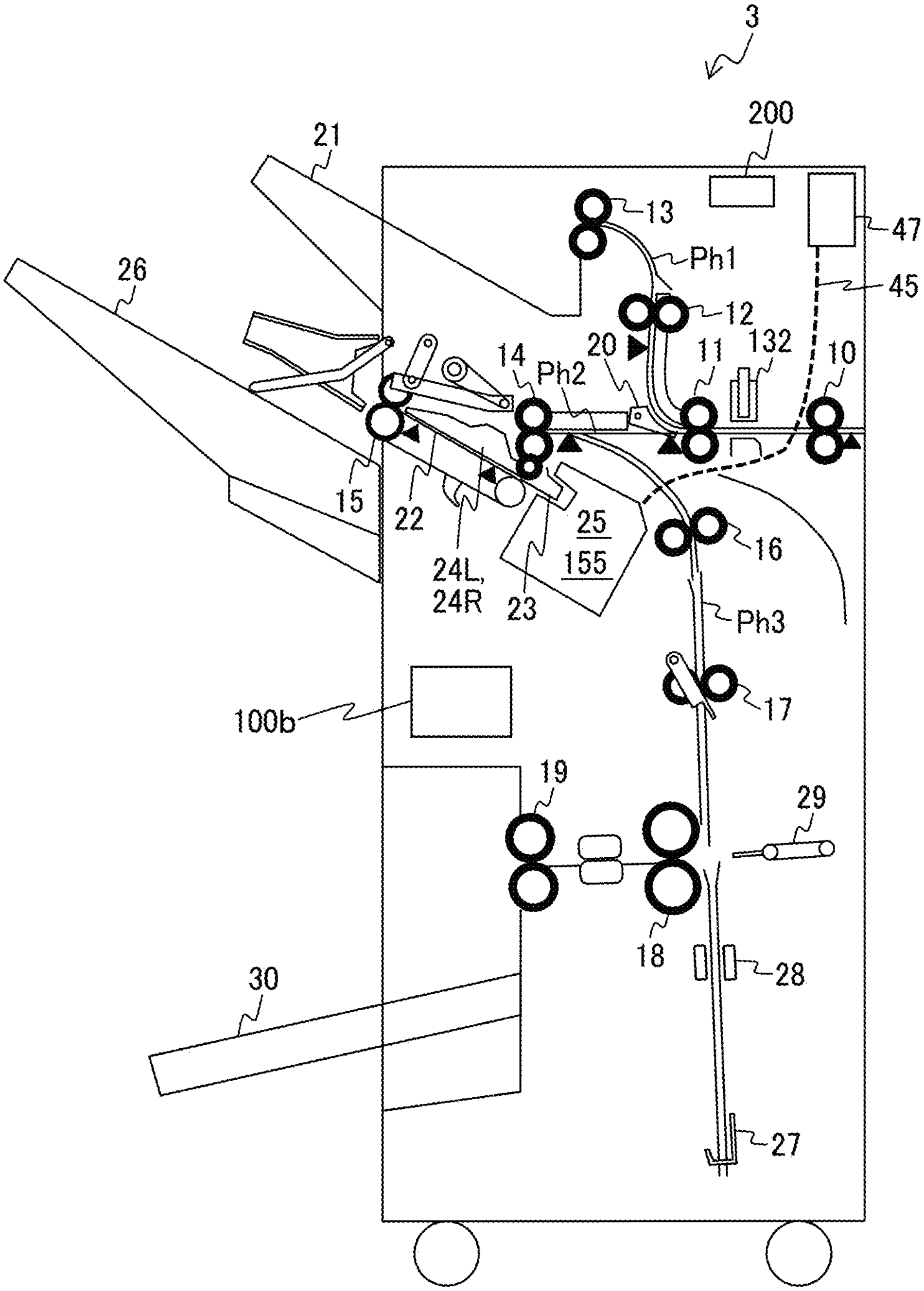
FIG. 2 is a diagram illustrating an internal configuration of a post-processing apparatus according to the present embodiment.

FIG. 2 is a diagram illustrating an internal configuration of the post-processing apparatus 3 according to the present embodiment of the present disclosure.

The post-processing apparatus 3 performs given post-processing on the sheet P on which an image is formed by the image forming apparatus 2. An example of the post-processing according to the present embodiment is a binding process as a "crimping process" that binds, without staples, a plurality of sheets P on each of which an image is formed as a bundle of sheets P, which may be referred to as a sheet bundle. Another example of the post-processing according to the present embodiment is a binding process as a "stapling process" that binds, with staples, a plurality of the sheets P on each of which an image is formed as a bundle of sheets P (i.e., sheet bundle). In the following description, the bundle of sheets P may be referred to as a "sheet bundle Pb" as a bundle of media.

In the present embodiment, a description is typically given of liquid application in a crimp binding process. However, the liquid application related to a stapling process is similar to the liquid application in the crimp binding process. In the following description, the term "binding process" indicates both the "crimp binding process" and the "stapling process", and is not limited to a binding method (whether a binding needle is used or pressure deformation is performed).

More specifically, the "crimp binding process" according to the present embodiment is a process called "crimp binding" to apply pressure to the binding position corresponding to a part of the sheet bundle Pb to deform (perform pressure deformation on) the binding position and bind the sheet bundle Pb. The binding that can be executed by the post-processing apparatus 3 includes edge binding and saddle binding. The edge binding is a process to bind an end (including an edge) of the sheet bundle Pb. The saddle binding is a process to bind the center of the sheet bundle Pb.

The post-processing apparatus 3 includes the conveyance roller pairs 10 to 19, each functioning as a conveyor, the switching member 20, and a controller 100*b* serving as a controller. The controller 100*b* controls the operations of, for example, the conveyance roller pairs 10 to 19 (conveyors), and the switching member 20. Details of the controller 100*b* will be described below. The conveyance roller pairs 10 to 19 convey, inside the post-processing apparatus 3, the sheet P supplied from the image forming apparatus 2. More specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3. A hole punch 132 is disposed between the conveyance roller pairs 10 and 11. The hole punch 132 performs punching on a sheet P conveyed by the conveyance roller pairs 10 and 11.

The first conveyance passage Ph1 is a passage extending to a first ejection tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to a second ejection tray 26 via an internal tray 22. The third conveyance passage Ph3 is a passage that branches off from the first conveyance passage Ph1 between the conveyance roller pairs 11 and 14 in the sheet conveyance direction and reaches to a third ejection tray 30.

The switching member 20 serving as a switcher is disposed at a branching position of the first conveyance passage Ph1 and the second conveyance passage Ph2.

Each of the switching member 20 can change the position between a first position and a second position. The switching member 20 at the first position guides the sheet P to be ejected to the first ejection tray 21 through the first conveyance passage Ph1. The switching members 20 at the second position guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in reverse to guide the sheet P to the third conveyance passage Ph3. The post-processing apparatus 3 further includes multiple sensors that detects the positions of the sheet P in the first conveyance passage Ph1, the second conveyance passage Ph2, and the third conveyance passage Ph3. Each of the multiple sensors is indicated by a black triangle in FIG. 2.

The post-processing apparatus 3 further includes the first ejection tray 21. The sheet P that is output through the first conveyance passage Ph1 is placed on the first ejection tray 21. Among the sheets P supplied from the image forming apparatus 2, a sheet P not subjected to the binding process is ejected to the first ejection tray 21.

The post-processing apparatus 3 further includes the internal tray 22 serving as a receptacle, an end fence 23, side fences 24L and 24R, an edge binder 25, a staple binder 155, and the second ejection tray 26. The internal tray 22, the end fence 23, the side fences 24L and 24R, the edge binder 25, and the staple binder 155 perform the edge binding on the sheet bundle Pb of a plurality of sheets P conveyed to the internal tray 22 from the second conveyance passage Ph2. Among the sheets P supplied from the image forming apparatus 2, the sheet bundle Pb subjected to the edge binding is ejected to the second ejection tray 26.

The "edge binding process" includes a binding process performed by the edge binder 25 and the staple binder 155. More specifically, the "edge binding process" includes "parallel binding process," "oblique binding process," and "vertical binding process." The "parallel binding process" is a process of binding the sheet bundle Pb along one side of the sheet bundle Pb parallel to the main scanning direction. The "oblique binding process" is a process of binding a corner of the sheet bundle Pb. The "vertical binding process" is a process of binding the sheet bundle Pb along one side of the sheet bundle Pb parallel to the conveyance direction.

In the following description, a direction in which the sheet P is conveyed from the conveyance roller pair 15 toward the end fence 23 is defined as a "conveyance direction." In other words, the "conveyance direction" herein corresponds to a direction in which the sheet P that has been output from the image forming apparatus 2 is moved toward the second ejection tray 26 by, for example, the conveyance roller pair 10, is changed to move toward the end fence 23 by the conveyance roller pair 15 in a direction different from the above-described direction. The direction that is orthogonal to the conveyance direction and a thickness direction of the sheet P is defined as a "main scanning direction" or a "width direction of the sheet P."

The sheets P that are sequentially conveyed through the second conveyance passage Ph2 are temporarily placed on the internal tray 22 serving as a placement tray. The end fence 23 aligns the position, in the conveyance direction, of the sheet P or the sheet bundle Pb placed on the internal tray 22. The side fences 24L and 24R align the position, in the main scanning direction, of the sheet P or the sheet bundle Pb placed on the internal tray 22. The edge binder 25 and the staple binder 155 perform edge binding on the sheet bundle Pb aligned by the end fence 23 and the side fences 24L and 24R. Then, the conveyance roller pair 15 ejects the sheet bundle Pb subjected to the edge binding to the second ejection tray 26.

The post-processing apparatus 3 further includes an end fence 27, a saddle binder 28, a sheet folding blade 29, and the third ejection tray 30. The end fence 27, the saddle binder 28, and the sheet folding blade 29 perform the saddle binding on the sheet bundle Pb including the sheets P that are conveyed through the third conveyance passage Ph3. Among the sheets P supplied from the image forming apparatus 2, the sheet bundle Pb subjected to the saddle binding is ejected to the third ejection tray 30.

The end fence 27 aligns the positions of the sheets P that are sequentially conveyed through the third conveyance passage Ph3, in a conveyance direction in which the sheets P are conveyed. The end fence 27 can move between a binding position where the end fence 27 causes the center of the sheet bundle Pb to face the saddle binder 28 and a folding position where the end fence 27 causes the center of the sheet bundle Pb to face the sheet folding blade 29. The saddle binder 28 binds the center of the sheet bundle Pb aligned by the end fence 27 at the binding position. The sheet folding blade 29 folds, in half, the sheet bundle Pb placed on the end fence 27 at the folding position and causes the conveyance roller pair 18 to nip the sheet bundle Pb. The conveyance roller pairs 18 and 19 eject the sheet bundle Pb subjected to the saddle binding to the third ejection tray 30.

The post-processing apparatus 3 includes, in the edge binder 25, a liquid application member 501 as a part of a liquid applier, a first liquid storage tank 44 serving as a first liquid storage unit, and a liquid supply member 50 as a part of a liquid applier. The first liquid storage tank 44 and the liquid supply member 50 are omitted in FIG. 2. The post-processing apparatus 3 further includes the liquid supply passage 45 as a part of a liquid supplier, a liquid supply pump 46 as a part of the liquid supplier, a second liquid storage tank 47 as a part of a second liquid storage, and a second liquid storage tank fixer 61 as a part of the second liquid storage, to replenish (supply) the first liquid storage tank 44 with liquid. The liquid that is stored in the second liquid storage tank 47 is supplied to the first liquid storage tank 44 via the second liquid storage tank fixer 61, the liquid supply pump 46, and the liquid supply passage 45.

In addition, as illustrated in FIGS. 1 and 2, the post-processing apparatus 3 includes a display 200 serving as a display for displaying the states of the operation of liquid application or the operation of binding. The display 200 includes, for example, a liquid crystal display on a portion of the exterior of the post-processing apparatus 3, and has the same function as the control panel 110 serving as a display included in the image forming apparatus 2.

A detailed description is given of the edge binder 25 according to an embodiment of the present disclosure.

Figure 3:
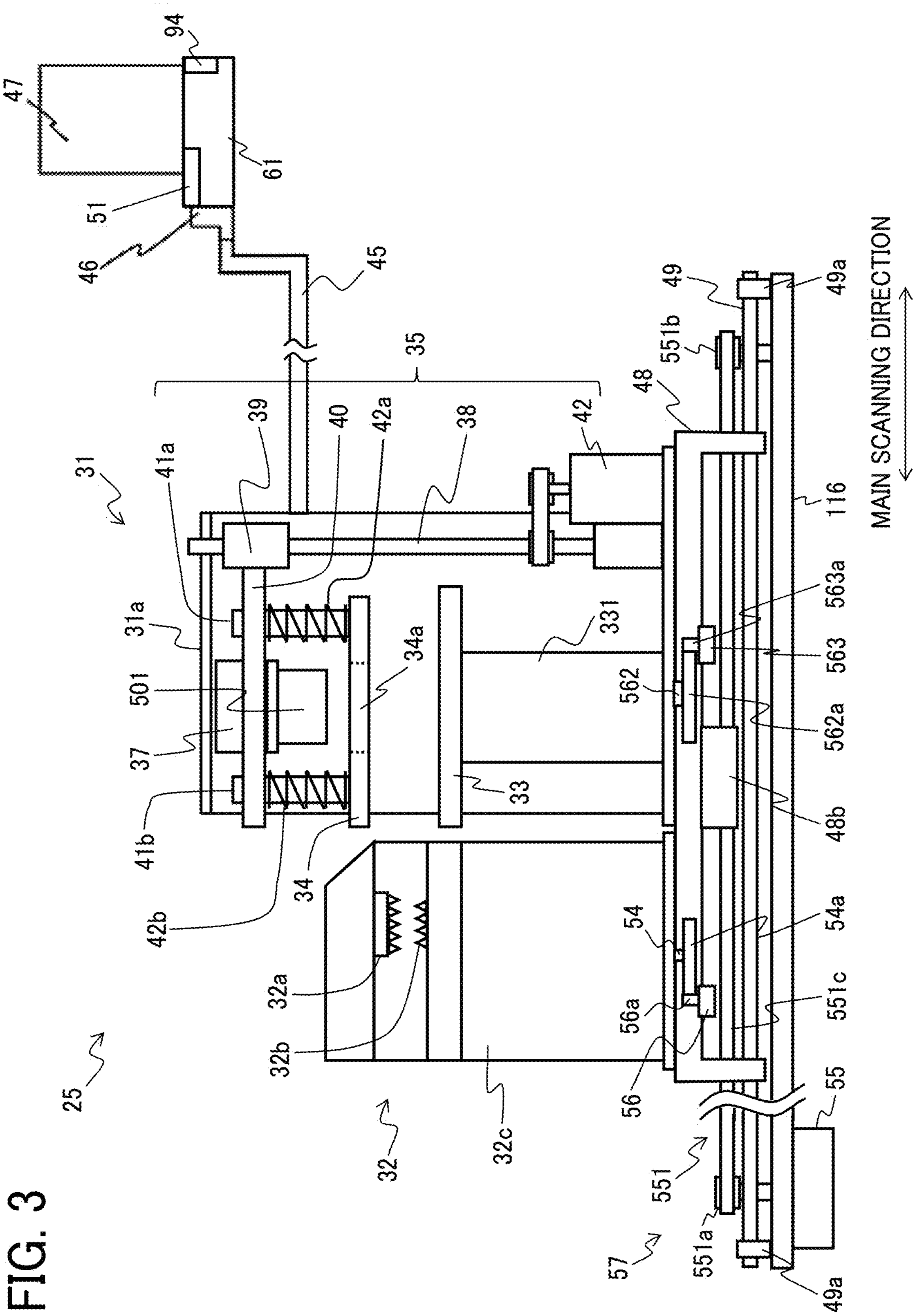
FIG. 3 is a diagram illustrating a schematic configuration of an edge binder according to the present embodiment, as viewed from an upstream side in a conveyance direction.

FIG. 3 is a schematic diagram illustrating an upstream side of the edge binder 25 in the conveyance direction.

The edge binder 25 performs liquid application and crimp binding illustrated in FIG. 2.

Figure 4:
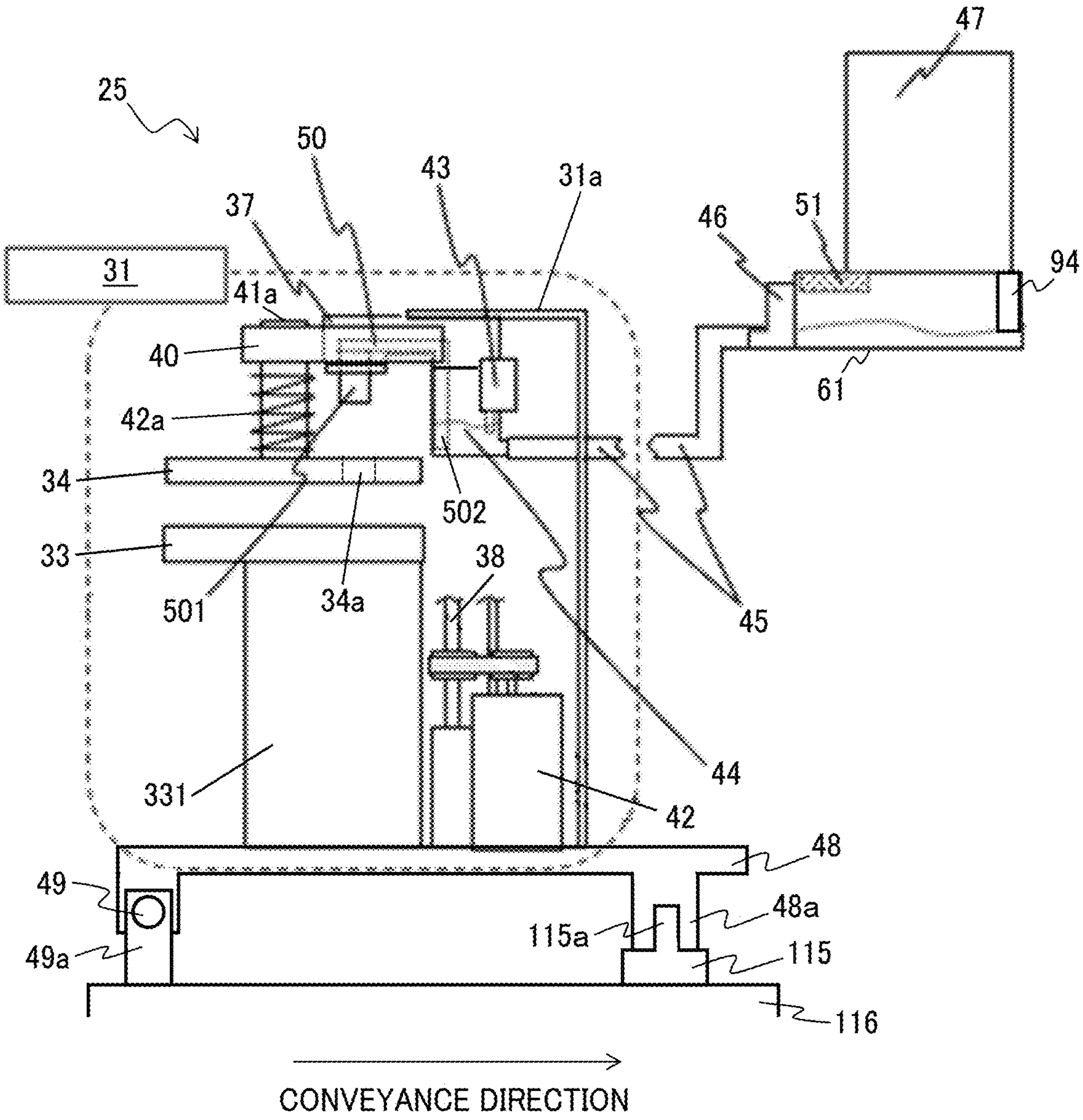
FIG. 4 is a diagram illustrating a schematic configuration of an edge binder according to the present embodiment, as viewed from a main scanning direction.

FIG. 4 is a schematic diagram illustrating a liquid applier 31 of the edge binder 25 when viewed from the main scanning direction.

As illustrated in FIG. 3, the edge binder 25 includes the liquid applier 31 and a crimper 32. The liquid applier 31 executes a processing operation related to the liquid application. The crimper 32 serves as a post-processing device and executes the crimp binding. The liquid applier 31 and the crimper 32 are disposed downstream from the internal tray 22 in the conveyance direction and adjacent to each other in the main scanning direction.

The liquid applier 31 applies liquid that is stored in the first liquid storage tank 44 to the sheet P or the sheet bundle Pb placed on the internal tray 22. The application of the liquid to the sheet P or the sheet bundle Pb by the liquid applier 31 and the operation of the liquid applier 31 in applying the liquid are referred to as "liquid application" below. The liquid applying operation of the liquid applier 31 involving control processing is referred to as a "liquid application process".

More specifically, the liquid that is stored in the first liquid storage tank 44 for the liquid application includes, as a main component, the liquid state of a compound of hydrogen and oxygen compound represented by the chemical formula H2O. The liquid hydrogen-oxygen compound is at any temperature. For example, the liquid hydrogen-oxygen compound may be so-called warm water or hot water.

The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid that is stored in the first liquid storage tank 44 may include an additive in addition to the main component. The liquid that is stored in the first liquid storage tank 44 may include residual chlorine used as tap water. Preferably, for example, the liquid that is stored in the first liquid storage tank 44 may include, as an additive, a colorant, a penetrant, a pH adjuster, a preservative such as phenoxyethanol, a drying inhibitor such as glycerin, or a combination thereof. Furthermore, because water is used as a component of ink used for inkjet printers or ink used for water-based pens, such water or ink may be used for the “liquid application”.

The water is not limited to the specific examples described above. The water may be water in a broad sense such as hypochlorous acid water or an ethanol aqueous solution diluted for disinfection. However, tap water may be used simply to enhance the binding strength after the binding process because tap water is easy to obtain and store. A liquid including water as a main component as exemplified above enhances the binding strength of the sheet bundle Pb, in comparison with a liquid of which the main component is not water.

As illustrated in FIGS. 3 and 4, the liquid applier 31 is movable in the main scanning direction together with the crimper 32 by a driving force transmitted from an edge binder movement motor 55. The liquid applier 31 includes a lower pressure plate 33 serving as a receptacle for the sheet P or the sheet bundle Pb, an upper pressure plate 34, and a liquid applier movement assembly 35. The components of the liquid applier 31 (the lower pressure plate 33, the upper pressure plate 34, the liquid applier movement assembly 35, and the liquid applier movement motor 42) are held by the liquid application frame 31*a* and the base 48.

A liquid applier shaft 562 including a drive transmission gear 562*a* is fixed to a bottom face of the liquid application frame 31*a* that holds the components of the liquid applier 31. The liquid applier shaft 562 and the drive transmission gear 562*a* are held by the base 48 on which the liquid application frame 31*a* is disposed, so as to be rotatable in the forward and reverse directions. The drive transmission gear 562*a* meshes with an output gear 563*a* of a liquid applier pivot motor 563. The liquid applier 31 can be rotated in the forward and reverse directions about the liquid applier shaft 562 on the base 48 by a driving force transmitted from the liquid applier pivot motor 563 to the liquid applier shaft 562 via the output gear 563*a* and the drive transmission gear 562*a*.

The lower pressure plate 33 and the upper pressure plate 34 are disposed downstream from the internal tray 22 in the conveyance direction. The sheets P or the sheet bundle Pb that is placed on the internal tray 22 is also placed on the lower pressure plate 33. The lower pressure plate 33 is provided on a lower pressure plate holder 331. The upper pressure plate 34 is movable in the thickness direction of the sheet P or the sheet bundle Pb at a position where the upper pressure plate 34 faces the sheet P or the sheet bundle Pb placed on the internal tray 22.

In other words, the lower pressure plate 33 and the upper pressure plate 34 are disposed to face each other in the thickness direction of the sheet P or the sheet bundle Pb with the sheet P or the sheet bundle Pb placed on the internal tray 22 and interposed between the lower pressure plate 33 and the upper pressure plate 34. In the following description, the thickness direction of the sheet P or the sheet bundle Pb may be referred to simply as “thickness direction.” Further, the upper pressure plate 34 has a through hole 34*a* penetrating in the thickness direction at a position facing the liquid application member 501 (one end portion of a liquid supply member 50 (liquid absorber) to be described below, which corresponds to a tip portion) held via a holder 37 attached to a base plate 40.

The liquid applier movement assembly 35 moves the upper pressure plate 34, the base plate 40, the holder 37, the liquid application member 501, the liquid supply member 50, and the first liquid storage tank 44 in the thickness direction of the sheet P or the sheet bundle Pb. The liquid applier movement assembly 35 according to the present embodiment moves the upper pressure plate 34, the base plate 40, the holder 37, the liquid application member 501, the liquid supply member 50, and the first liquid storage tank 44 in conjunction with each other with a single liquid applier movement motor 42. The liquid applier movement assembly 35 includes, for example, a liquid applier movement motor 42, a trapezoidal screw 38, a nut 39, the base plate 40, columns 41*a* and 41*b*, and coil springs 42*a* and 42*b*.

The liquid applier movement motor 42 generates a driving force to move the upper pressure plate 34, the base plate 40, the holder 37, the liquid application member 501, the liquid supply member 50, and the first liquid storage tank 44. The trapezoidal screw 38 extends in the thickness direction of the sheet P or the sheet bundle Pb and is provided with the liquid application frame 31*a* such that the trapezoidal screw 38 is rotatable in the forward and reverse directions. The trapezoidal screw 38 is coupled to an output shaft of the liquid applier movement motor 42 via, for example, a pulley and a belt. The nut 39 is screwed to the trapezoidal screw 38. The trapezoidal screw 38 is rotated in the forward and reverse directions by the driving force transmitted from the liquid applier movement motor 42. The rotation of the trapezoidal screw 38 causes the nut 39 to reciprocate on the trapezoidal screw 38.

The base plate 40 is positioned apart from the upper pressure plate 34. The base plate 40 holds the liquid application member 501 with the tip portion of the liquid application member 501 protruding from the base plate 40 toward the upper pressure plate 34. The base plate 40 is coupled to the trapezoidal screw 38 via the nut 39 such that base plate 40 can reciprocate along the trapezoidal screw 38 as the trapezoidal screw 38 rotates in the forward and reverse directions. The position of the base plate 40 in the vertical direction is detected by a movement sensor 40*a* (see FIG. 8).

The columns 41*a* and 41*b* project from the base plate 40 toward the upper pressure plate 34 around the tip portion of the liquid application member 501. The columns 41*a* and 41*b* can relatively move with respect to the base plate 40 in the thickness direction. The columns 41*a* and 41*b* hold the upper pressure plate 34 with the respective tip ends closer to the lower pressure plate 33 than the other ends of the columns 41*a* and 41. The other ends of the columns 41*a* and 41 opposite the ends closer to the lower pressure plate 33 are provided with stoppers that prevent the columns 41*a* and 41*b* from being removed from the base plate 40.

The coil springs 42*a* and 42*b* are fitted around the columns 41*a* and 41*b*, respectively, between the base plate 40 and the upper pressure plate 34. The coil springs 42*a* and 42*b* bias the upper pressure plate 34 and the columns 41*a* and 41*b* toward the lower pressure plate 33 with respect to the base plate 40.

The liquid applier 31 applies liquid to the sheet P or the sheet bundle Pb placed on the internal tray 22. Specifically, the liquid applier 31 brings the liquid application member 501 into contact with the sheet P or the sheet bundle Pb to apply the liquid to at least one sheet P of the sheet bundle Pb.

The liquid applier 31 includes the first liquid amount detection sensor 43 (serving as a first liquid detector), the first liquid storage tank 44, the liquid application member 501, the liquid supply member 50, and the holder 37. The first liquid storage tank 44 stores the liquid to be applied to the sheet P or the sheet bundle Pb. The amount of liquid that is stored in the first liquid storage tank 44 is detected by the first liquid amount detection sensor 43. The first liquid storage tank 44 is coupled to the base plate 40 via the holder 37.

The liquid application member 501, the liquid supply member 50 disposed in close contact with the liquid application member 501, and the first liquid storage tank 44 are held by the holder 37. The holder 37 is held by the base plate 40. The liquid supply member 50 has a first end in close contact with the liquid application member 501 and a second end immersed in the liquid stored in the first liquid storage tank 44. In other words, the second end of the liquid supply member 50 corresponds to a liquid immersion portion 502 that sucks up the liquid and supplies the liquid to the liquid application member 501. The liquid application member 501 and the liquid supply member 50 are made of a material (e.g., sponge or fiber) having a high liquid absorption rate, such as an elastic resin formed of open cells. However, at least one of the liquid application member 501 or the liquid supply member 50 is not limited to a particular kind as long as the at least one of the liquid application member 501 or the liquid supply member 50 is made of a material having a property of absorbing and holding the liquid and has a property of being crushable in accordance with a pressing force applied when the at least one of the liquid application member 501 or the liquid supply member 50 is in contact with the sheet P. In other words, the material may be any material as long as the material can suck up liquid by capillary action.

Accordingly, when the other end portion (the liquid immersion portion 502) of the liquid supply member 50 is immersed in the liquid stored in the first liquid storage tank 44, the liquid supply member 50 sucks up the liquid by capillary action. In other words, the liquid stored in the first liquid storage tank 44 is sucked up from the liquid immersion portion 502 of the liquid supply member 50, and the sucked liquid is supplied to the liquid application member 501 that is coupled to the tip portion via the liquid supply member 50. Then, the liquid stored in the first liquid storage tank 44 is sucked up to the liquid application member 501 in close contact with one end portion of the liquid supply member 50, and thus the liquid level (stored liquid amount) of the liquid stored in the first liquid storage tank 44 detected by the first liquid amount detection sensor 43 is lowered. As a result, the liquid is supplied from the second liquid storage tank 47 to the first liquid storage tank 44 by the liquid supply pump 46.

Although the case where the liquid supply member 50 and the liquid application member 501 are separate bodies has been described above, the liquid supply member 50 and the liquid application member 501 may be integrally formed of a material having the same properties (for example, a material having a high liquid absorption rate). In other words, the liquid application member 501 may be part of the liquid supply member 50. In such a case, liquid can be supplied from the liquid supply member 50 to the liquid application member 501 more smoothly by the capillary action and a reduction in cost can be achieved.

The edge binder 25 or the post-processing apparatus 3 is coupled to the second liquid storage tank 47. The second liquid storage tank 47 is detachably attached to the second liquid storage tank fixer 61 (a part of the second liquid storage unit) included in the edge binder 25 or the post-processing apparatus 3, as illustrated in FIG. 12(A). The second liquid storage tank 47 is fixed (set) to the second liquid storage tank fixer 61 (a part of the second liquid storage unit) at a given position. By so doing, the liquid already stored in the second liquid storage tank 47 can be supplied to the first liquid storage tank 44.

The operation to supply liquid from the second liquid storage tank 47 to the first liquid storage tank 44 by the liquid supply pump 46 is executed in response to a decrease in the stored liquid amount (liquid level) in the first liquid storage tank 44. The stored liquid amount (liquid level) of the first liquid storage tank 44 is reduced by the liquid being consumed by liquid application by the liquid applier 31. In other words, the operation to supply liquid from the second liquid storage tank 47 to the first liquid storage tank 44 corresponds to the liquid supply operation in accordance with the execution of the job including liquid application by the liquid applier 31.

When the second liquid storage tank 47 is set in the second liquid storage tank fixer 61, the second liquid storage tank fixer 61 is filled with a certain amount of the liquid in the second liquid storage tank 47. The second liquid storage tank fixer 61 includes a setting detection sensor 51 (serving as a set detector) as illustrated in FIG. 12(B). When the setting detection sensor 51 detects the set state of the second liquid storage tank 47 to the second liquid storage tank fixer 61, as illustrated in FIG. 12(C), a signal indicating the set state is transmitted to the controller 100*b*. Thus, the controller 100*b* detects whether the second liquid storage tank 47 is mounted to the second liquid storage tank fixer 61. Details of the second liquid storage tank 47 will be described below.

The first liquid storage tank 44 and the second liquid storage tank 47 are coupled to each other by the liquid supply passage 45. The liquid supply pump 46 is disposed near the second liquid storage tank fixer 61. As the liquid supply pump 46 is driven, the liquid stored in the second liquid storage tank 47 is supplied (replenished) to the first liquid storage tank 44 via the liquid supply passage 45. Accordingly, the second liquid storage tank fixer 61 is a component of the liquid supply member that executes a liquid supply operation to supply liquid from the second liquid storage tank 47 to the first liquid storage tank 44. The liquid supply passage 45 includes a flexible material. According to such a configuration, even if the first liquid storage tank 44 is moved by the liquid applier movement assembly 35, liquid can be supplied from the second liquid storage tank 47 to the first liquid storage tank 44.

The supply of liquid from the second liquid storage tank 47 to the first liquid storage tank 44 can be controlled in accordance with the detection result of the first liquid amount detection sensor 43. In other words, the controller 100*b*, which is described below, determines whether the stored liquid amount (liquid level) in the first liquid storage tank 44 based on the detection result of the first liquid amount detection sensor 43. In accordance with the determined stored liquid amount (liquid level) of the first liquid storage tank 44, the controller 100*b* controls the operation speed and time of the liquid supply pump 46. By so doing, the controller 100*b* can adjust the amount of liquid to be replenished (supplied) to the first liquid storage tank 44 to maintain the stored liquid amount (liquid level) in the first liquid storage tank 44 at a constant level of liquid.

A description is given of the configuration of the crimper 32 according to an embodiment of the present disclosure.

The crimper 32 serving as a post-processing device presses and deforms a portion of the sheet bundle Pb by serrated upper crimping teeth 32*a* and lower crimping teeth 32*b*, and crimps the sheets P of the portion to bind the sheet bundle Pb. In other words, the crimper 32 can bind the sheet bundle Pb without staples. The components of the crimper 32 such as the upper crimping teeth 32*a* and the lower crimping teeth 32*b* are disposed on a crimping frame 32*c*. In the following description, such pressure deformation on a given position on the sheet bundle Pb to bind the sheet bundle Pb may be referred to as "crimping." In other words, the crimper 32 crimps the sheet bundle Pb or performs crimping on the sheet bundle Pb. The crimping and binding operation of the crimper 32 that involves control processing is referred to as "crimp binding process".

Figure 5A:
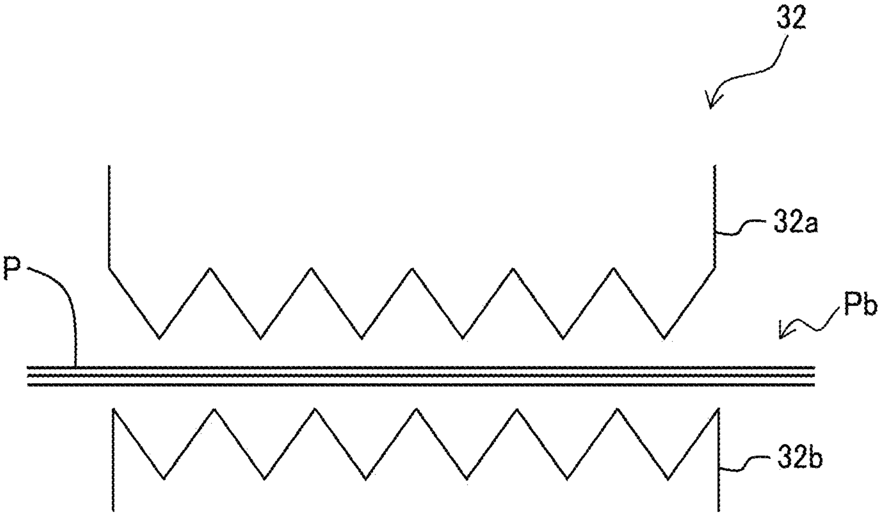
FIGS. 5A and 5B are diagrams each illustrating a schematic configuration of a crimper of the edge binder of FIG. 3.
Figure 5B:

FIGS. 5A and 5B are schematic diagrams illustrating the configuration of the crimper 32.

As illustrated in FIGS. 5A and 5B, the crimper 32 includes the upper crimping teeth 32*a* and the lower crimping teeth 32*b*. The upper crimping teeth 32*a* and the lower crimping teeth 32*b* are disposed to face each other in the thickness direction of the sheet bundle Pb to sandwich the sheet bundle Pb placed on the internal tray 22. The upper crimping teeth 32*a* and the lower crimping teeth 32*b* have respective serrate faces facing each other. The serrate face of each of the upper crimping teeth 32*a* and the lower crimping teeth 32*b* includes concave portions and convex portions alternately formed. The concave portions and the convex portions of the upper crimping teeth 32*a* are shifted from those of the lower crimping teeth 32*b* such that the upper crimping teeth 32*a* are engaged with the lower crimping teeth 32*b*. The upper crimping teeth 32*a* and the lower crimping teeth 32*b* are brought into contact with and separated from each other by the driving force of a contact-separation motor 32*d* illustrated in FIG. 8.

In the process of supplying the sheets P of the sheet bundle Pb to the internal tray 22, the upper crimping teeth 32*a* and the lower crimping teeth 32*b* are separated from each other as illustrated in FIG. 5A. When all the sheets P of the sheet bundle Pb are placed on the internal tray 22, the upper crimping teeth 32*a* and the lower crimping teeth 32*b* are engaged with each other as illustrated in FIG. 5B by the driving force of the contact-separation motor 32*d* to press and deform the sheet bundle Pb in the thickness direction. As a result, the sheet bundle Pb that has been placed on the internal tray 22 is crimped and bound. The sheet bundle Pb thus crimped and bound is ejected to the second ejection tray 26 by the conveyance roller pair 15.

The configuration of the crimper 32 as a crimping assembly is not limited to the configuration of a moving assembly exemplified in the present embodiment, and may be any other suitable structure in which the upper crimping teeth 32*a* and the lower crimping teeth 32*b* of the crimping assembly engage with each other. For example, the crimping assembly may bring the upper crimping teeth 32*a* and the lower crimping teeth 32*b* into contact with each other and separate the upper crimping teeth 32*a* and the lower crimping teeth 32*b* from each other with a link mechanism and a driving source that simply rotates forward or that rotates forward and backward (e.g., the crimping assembly disclosed in Japanese Patent No. 6057167). Alternatively, the crimping assembly may employ a linear motion system to linearly bring the upper crimping teeth 32*a* and the lower crimping teeth 32*b* into contact with each other and separate the upper crimping teeth 32*a* and the lower crimping teeth 32*b* from each other with a screw assembly that converts the forward and backward rotational motions of a driving source into linear reciprocating motion.

As illustrated in FIG. 3, the edge binder 25 includes an edge binder movement assembly 57.

The edge binder movement assembly 57 moves the edge binder 25 (in other words, the liquid applier 31 and the crimper 32) in the main scanning direction along the downstream end of the sheet P, which is placed on the internal tray 22, in the conveyance direction. The edge binder movement assembly 57 includes, for example, the base 48, a guide shaft 49, the edge binder movement motor 55, and a driving force transmission assembly 551 that transmits the driving force of the edge binder movement motor 55 to the base 48, and a standby position sensor 540 (see FIG. 8).

The liquid applier 31 and the crimper 32 are attached to the base 48 such that the liquid applier 31 and the crimper 32 are adjacent to each other in the main scanning direction. As illustrated in FIG. 4, the guide shaft 49 is held by multiple guide shaft brackets 49*a* disposed in the main scanning direction at a position on the upstream side of a binding assembly base 116 in the conveyance direction of the sheet P. As illustrated in FIG. 3, the guide shaft 49 extends in the main scanning direction on the binding assembly base 116. The guide rail 115 is disposed in the main scanning direction on the downstream side of the binding assembly base 116 in the conveyance direction of the sheet P. As illustrated in FIG. 4, the guide rail 115 includes a fitting target portion 115*a* that fits to a fitting portion 48*a* of the base 48 in the main scanning direction. In other words, the base 48 is movably held by the guide shaft 49 and the guide rail 115 in the main scanning direction on the binding assembly base 116.

The edge binder movement motor 55 generates a driving force to move the edge binder 25. The driving force transmission assembly 551 transmits the driving force of the edge binder movement motor 55 to the base 48 via pulleys 551*a* and 551*b*, a timing belt 551*c*, and a fastening portion 48*b* that fastens the base 48 and the timing belt 551*c*. As a result, the liquid applier 31 and the crimper 32 integrated by the base 48 move in the main scanning direction along the guide shaft 49.

The edge binder movement motor 55 according to the present embodiment is, for example, a servo motor that can stop the edge binder 25 at a target position (for example, a binding position B1 described below) without returning the edge binder 25 to an origin position (for example, a standby position HP described below) every time the edge binder 25 is moved.

Figure 8:
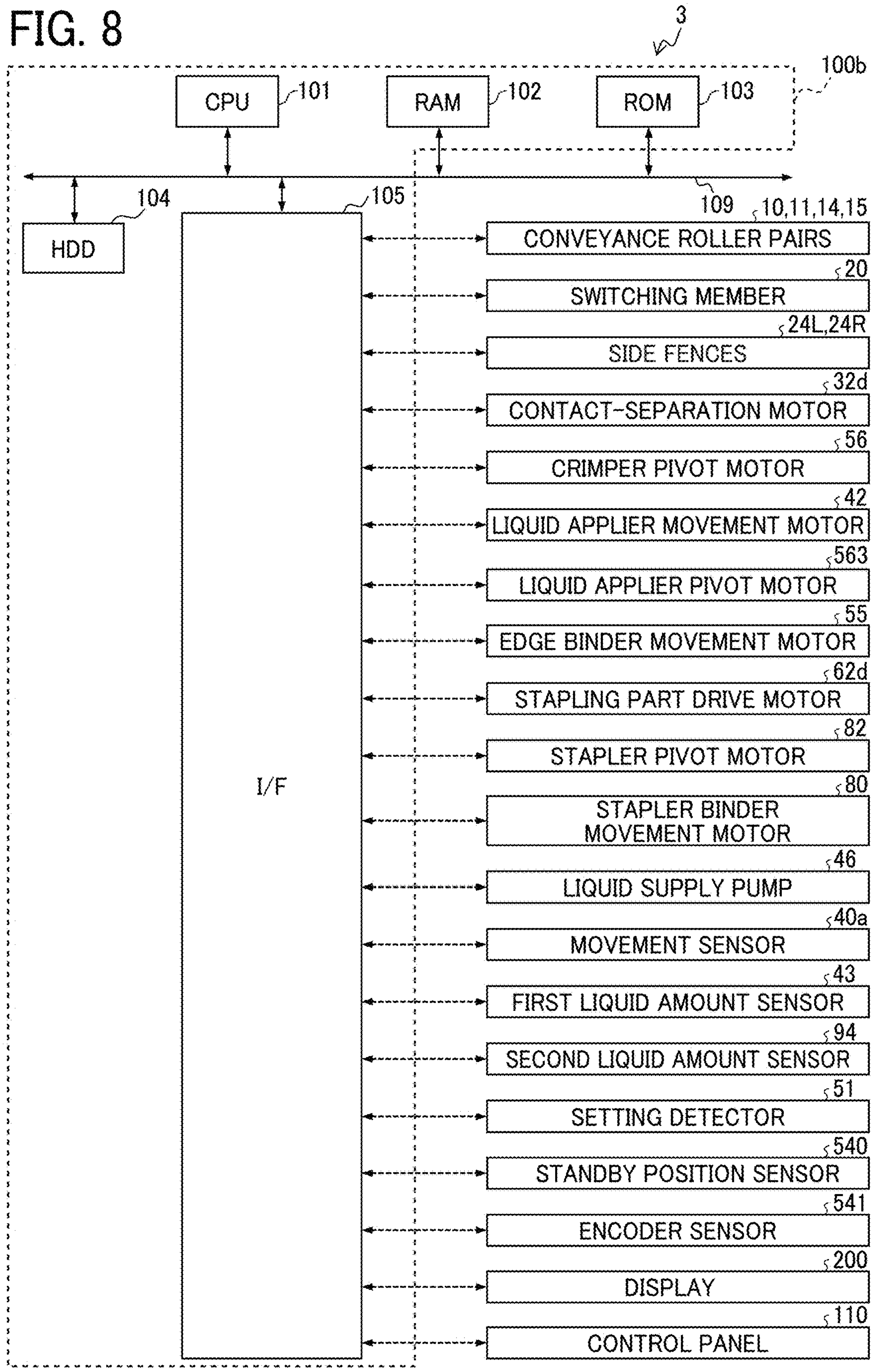
FIG. 8 is a control block diagram illustrating a hardware configuration of the post-processing apparatus according to the present embodiment, to control the post-processing apparatus.

The post-processing apparatus 3 further includes a standby position sensor 540 (for example, a light-shielding optical sensor, see FIG. 8) and an encoder sensor 541 (see FIG. 8). The standby position sensor 540 detects a standby position HP at which the edge binder 25 reaches the standby position HP (see FIG. 10A). The encoder sensor 541 is attached to an output shaft of the edge binder movement motor 55. The controller 100*b*, which will be described below, detects that the edge binder 25 has reached the standby position HP, based on a detection result of the standby position sensor 540. The controller 100*b* also counts pulse signals output from the encoder sensor 541 to ascertain the current position of the edge binder 25 moved from the standby position HP.

However, a specific instruction of stopping the edge binder 25 at the target position without returning the edge binder 25 to the standby position HP is not limited to the aforementioned example. As another example, the post-processing apparatus 3 may include a sensor that detects the arrival of the edge binder 25 at a given target position.

A crimper shaft 54 including a drive transmission gear 54*a* is fixed to a bottom face of the crimping frame 32*c* that holds the components of the crimper 32. The crimper shaft 54 and the drive transmission gear 54*a* are held by the base 48 on which the crimping frame 32*c* is disposed, so as to be rotatable in the forward and reverse directions. The drive transmission gear 54*a* meshes with an output gear 56*a* of a crimper pivot motor 56. The crimper 32 can be rotated in the forward and reverse directions about the crimper shaft 54 on the base 48 by a driving force transmitted from the crimper pivot motor 56 to the crimper shaft 54 via the output gear 56*a* and the drive transmission gear 54*a*.

In the above description, the edge binder 25 has a configuration of moving along the guide shaft 49 with the crimper 32 and the liquid applier 31 being integrated, the embodiments of the present disclosure are not limited to the above-described configuration. For example, the crimper 32 and the liquid applier 31 may have a configuration of moving separately from each other.

A description is given of a staple binder 155.

Specifically, a detailed description is now given of the staple binder 155 having a function of executing a stapling process.

Figure 6:
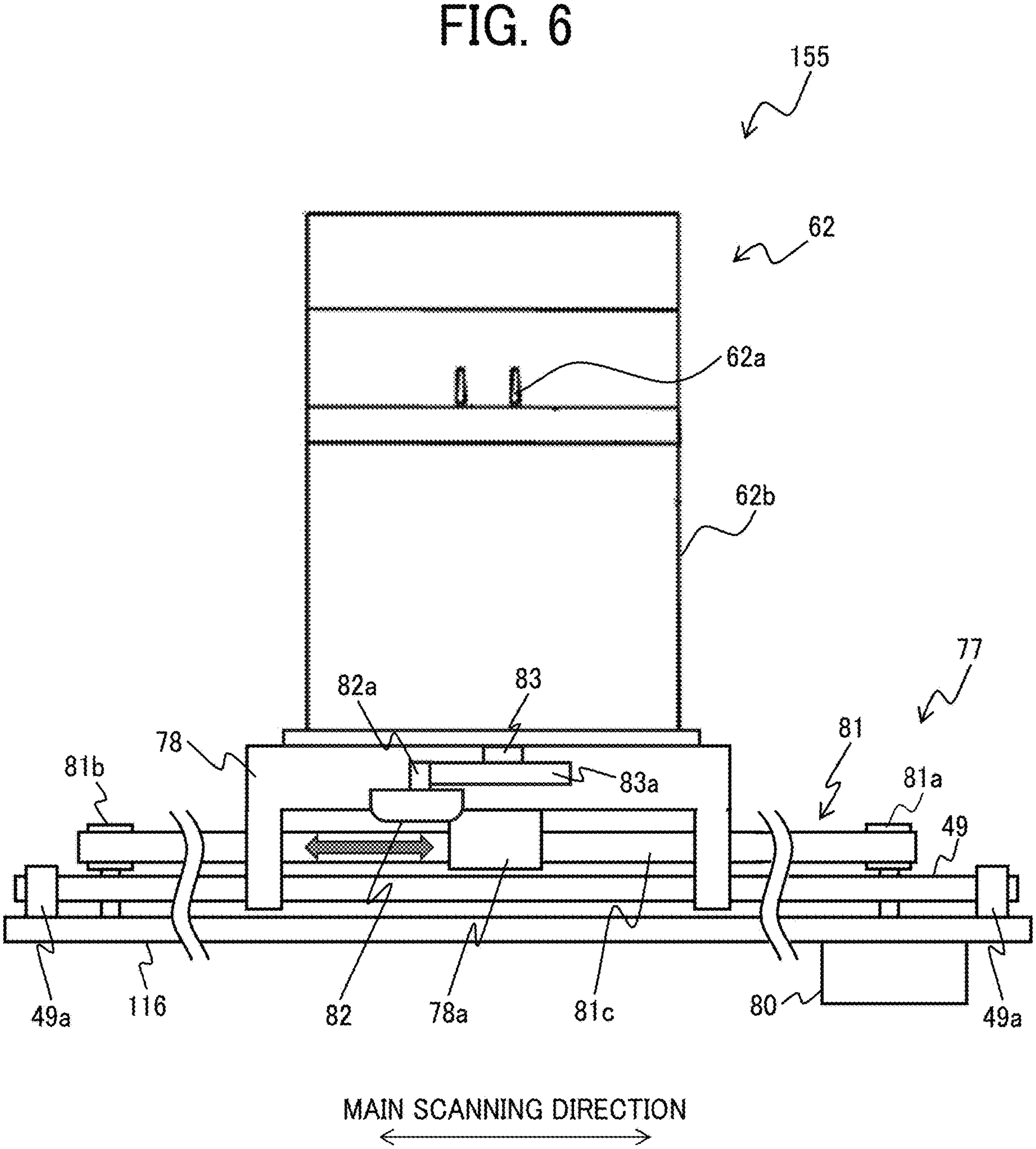
FIG. 6 is a schematic diagram illustrating a staple binder, viewed from an upstream side of the staple binder in the conveyance direction.

FIG. 6 is a schematic diagram illustrating the staple binder 155, viewed from the upstream side of the staple binder 155 in the conveyance direction.

The staple binder 155 includes a stapler 62 that binds the sheet bundle Pb with staples. The stapler 62 is disposed downstream from the internal tray 22 in the conveyance direction of the sheet P and spaced apart from the edge binder 25 in the main scanning direction.

The stapler 62 serving as a post-processing device has a configuration of performing so-called "stapling" (i.e., stapling process) to bind a sheet bundle Pb with a staple or staples. To be more specific, the stapler 62 includes a stapling-part drive motor 62*d* illustrated in FIG. 8. The stapling-part drive motor 62*d* drives a stapling part 62*a*. The driving force of the stapling-part drive motor 62*d* causes a staple loaded in the stapling part 62*a* to penetrate through a sheet bundle Pb, so that the stapling part 62*a* binds the sheet bundle Pb. Since the stapler 62 has a typical configuration, a detailed description of the stapler 62 will be omitted unless otherwise required.

As illustrated in FIG. 6, the staple binder 155 includes a staple binder movement assembly 77. The staple binder movement assembly 77 moves the staple binder 155 in the main scanning direction along a downstream end in the conveyance direction of the sheet P or the sheet bundle Pb placed on the internal tray 22. The staple binder movement assembly 77 includes, for example, a base 78, the guide shaft 49, a staple binder movement motor 80, and a driving force transmission assembly 81. The driving force transmission assembly 81 transmits a driving force of the staple binder movement motor 80 to the base 78 via pulleys 81*a* and 81*b*, a timing belt 81*c*, and a fastening portion 78*a* that fastens the base 78 and the timing belt 81*c*. A stapler shaft 83 including a drive transmission gear 83*a* is fixed to a bottom face of a stapling frame 62*b* that holds the components of the stapler 62.

The stapler shaft 83 and the drive transmission gear 83*a* are held by the base 78 on which the stapling frame 62*b* is disposed, so as to be rotatable in the forward and reverse directions. Further, the drive transmission gear 83*a* is meshed with the output gear 82*a* of the staple binder pivot motor 82. The stapler 62 is rotatable in the forward and reverse directions about the stapler shaft 83 on the base 78 by a driving force transmitted from the stapler pivot motor 82 to the stapler shaft 83 via an output gear 82*a* and the drive transmission gear 83*a*.

The edge binder 25 and the staple binder 155 are supported by the common guide shaft 49. In other words, the edge binder movement assembly 57 and the staple binder movement assembly 77 move the edge binder 25 and the staple binder 155 in the main scanning direction along the common guide shaft 49. Further, the edge binder movement assembly 57 and the staple binder movement assembly 77 can move the edge binder 25 and the staple binder 155 separately.

Figure 7:
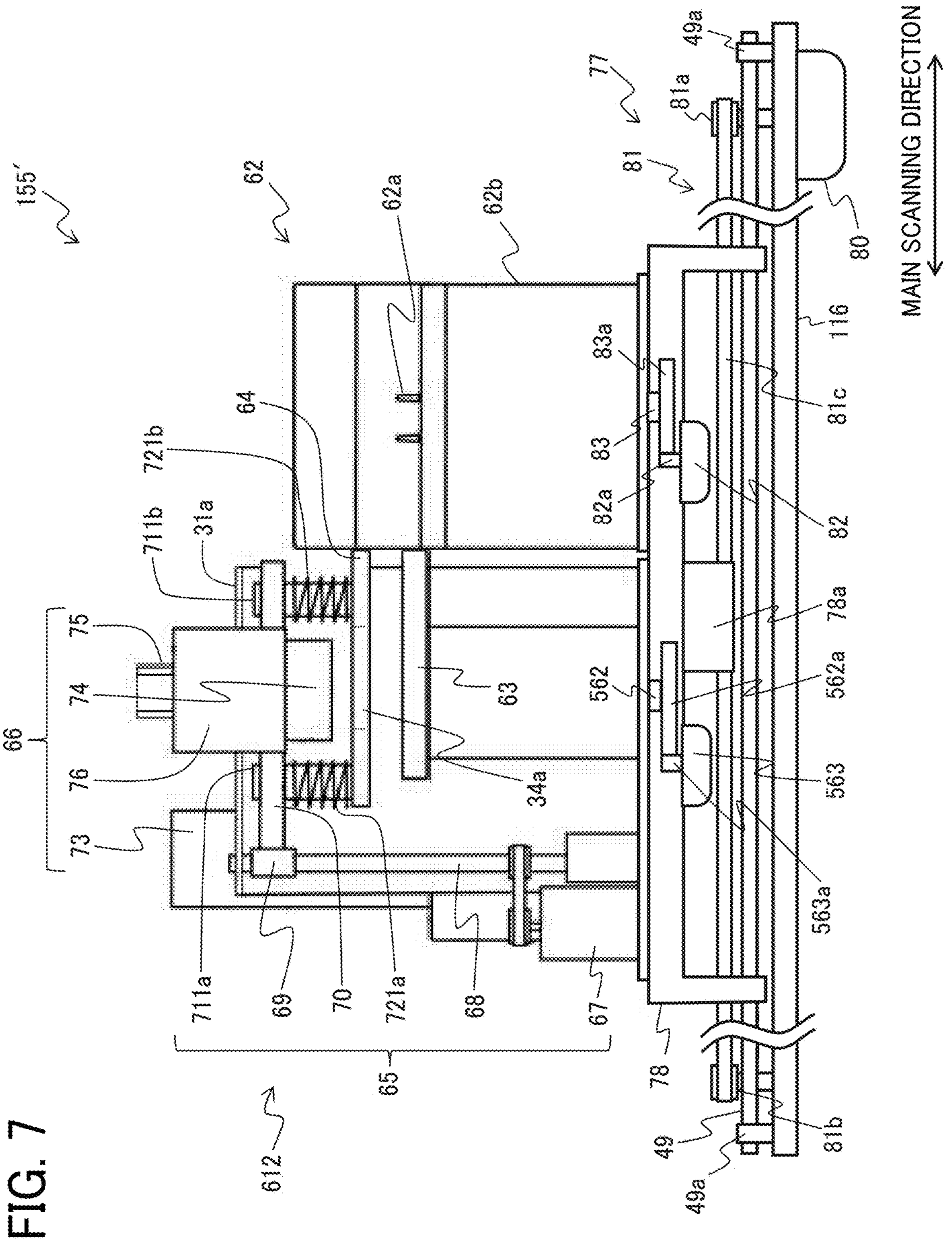
FIG. 7 is a diagram of a schematic configuration of a staple binder according to a modification of the above embodiments of the present disclosure, viewed from an upstream side of the staple binder in the conveyance direction.

FIG. 7 illustrates a staple binder 155' as a modification of the staple binder 155. More specifically, FIG. 7 is a schematic diagram illustrating of the staple binder 155' as viewed from the upstream side in the conveyance direction.

The staple binder 155' is different from the staple binder 155 in that the staple binder 155' includes a second liquid applier 612 in addition to the stapler 62. As illustrated in FIG. 7, the staple binder 155' includes the second liquid applier 612 and the stapler 62. The second liquid applier 612 and the stapler 62 are disposed downstream from the internal tray 22 in the conveyance direction of the sheet P and adjacent to each other in the main scanning direction.

The second liquid applier 612 executes "liquid application" of applying liquid stored in a third liquid storage tank 73 to the sheet P or the sheet bundle Pb placed on the internal tray 22. A given area including a position to which the liquid is applied on the sheet P or the sheet bundle Pb by the second liquid applier 612 corresponds to a binding position to be stapled by the stapler 62. As illustrated in FIG. 7, the second liquid applier 612 includes a second lower pressure plate 63, a second upper pressure plate 64, a second liquid applier movement assembly 65, and a second liquid application assembly 66. The second liquid applier movement assembly 65 includes, for example, a second liquid applier movement motor 67, a second trapezoidal screw 68, a second nut 69, a second base plate 70, second columns 711*a* and 711*b*, and second coil springs 721*a* and 721*b*.

The second liquid application assembly 66 includes the third liquid storage tank 73, a second liquid supply portion 75, a second liquid application member 74, and a second joint 76. Since the second liquid application assembly 66 and the liquid application assembly of the liquid applier 31 (including the first liquid storage tank 44, the liquid supply member 50, the liquid application member 501, and the holder 37) illustrated in FIGS. 3 and 4 have common configurations, redundant descriptions thereof will be omitted unless otherwise required. Since the configuration of the stapler 62 illustrated in FIG. 6 is like the configuration of the stapler 62 illustrated in FIG. 7, a detailed description thereof is omitted below unless otherwise required. Since the second liquid applier 612 and the liquid applier 31 that are illustrated in FIG. 3 have common pivot mechanisms, redundant descriptions thereof will be omitted unless otherwise required. The pivot mechanism of the second liquid applier 612 includes a liquid applier pivot motor 563, an output gear 563*a*, drive transmission gear 562*a*, and a liquid applier shaft 562.

In the stapling process, the staple binder 155' that is illustrated in FIG. 7 performs the liquid application process on the sheet P to loosen and soften the binding position, allowing the staple to easily pass through the sheet bundle Pb. As a result, the number of sheets to be bound per sheet bundle Pb can be increased as compared with a case where the stapling process is performed without applying the liquid.

A description is given of a control block of the post-processing apparatus 3.

A description is given below of a control block of the post-processing apparatus 3, with reference to FIG. 8.

FIG. 8 is a block diagram illustrating a hardware configuration for executing control processing in the post-processing apparatus 3.

As illustrated in FIG. 8, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected each other via a common bus 109.

The CPU 101 is an arithmetic unit and controls the operation of the overall operation of the post-processing apparatus 3.

The RAM 102 is a volatile storage medium that allows data to be read and written at high speed. The CPU 101 uses the RAM 102 as a work area for data processing.

The ROM 103 is a read-only non-volatile storage medium that stores programs such as firmware.

The HDD 104 is a non-volatile storage medium that allows data to be read and written and has a relatively large storage capacity. The HDD 104 stores, e.g., an operating system (OS), various control programs, and application programs.

The post-processing apparatus 3 processes, by an arithmetic function of the CPU 101, e.g., a control program stored in the ROM 103 and an information processing program (or application program) loaded into the RAM 102 from a storage medium such as the HDD 104. Such processing configures a software controller including various functional modules of the post-processing apparatus 3. The software controller that is thus configured cooperates with hardware resources of the post-processing apparatus 3 to construct functional blocks that implement functions of the post-processing apparatus 3. In other words, the CPU 101, the RAM 102, the ROM 103, the HDD 104, and the I/F 105 constitute at least part of a controller 100B serving as a control device that controls the operation of the post-processing apparatus 3.

The I/F 105 is an interface that connects the conveyance roller pairs 10, 11, 14, and 15, the switching member 20, the side fences 24L and 24R, the contact-separation motor 32*d*, the crimper pivot motor 56, the liquid applier pivot motor 563, the liquid applier movement motor 42, the edge binder movement motor 55, the stapling-part drive motor 62*d*, the stapler pivot motor 82, the staple binder movement motor 80, the liquid supply pump 46, the first liquid amount detection sensor 43, the second liquid amount detection sensor 94 serving as a second liquid amount detector, the setting detection sensor 51, the standby position sensor 540, the encoder sensor 541, the display 200, and a control panel 110 to the common bus 109.

The controller 100*b* controls, via the I/F 105, the operations of the conveyance roller pairs 10, 11, 14, and 15, the switching member 20, the side fences 24L and 24R, the contact-separation motor 32*d*, the crimper pivot motor 56, the liquid applier movement motor 42, the liquid applier pivot motor 563, the edge binder movement motor 55, the stapling-part drive motor 62*d*, the stapler pivot motor 82, the staple binder movement motor 80, and the liquid supply pump 46. The controller 100*b* acquires detection results from the movement sensor 40*a*, the first liquid amount detection sensor 43, the second liquid amount detection sensor 94, the setting detection sensor 51, the standby position sensor 540, and the encoder sensor 541. Although FIG. 8 illustrates only the components related to the edge binder 25 and the staple binder 155 that perform the edge binding, the components related to the saddle binder 28 that performs the saddle binding are also controlled by the controller 100*b*.

As illustrated in FIG. 1, the image forming apparatus 2 includes the control panel 110. The control panel 110 includes an operation device that receives instructions from a user and a display serving as a notifier that notifies the user of information. The operation unit includes, for example, hard keys and a touch panel superimposed on a display. The control panel 110 acquires information from the user through the operation unit and provides the information to the user through the display. A specific example of the notification unit is not limited to the display and may be a light emitting diode (LED) lamp or a speaker. The post-processing apparatus 3 may include a control panel 110 similar to the above-described control panel 110 of the image forming apparatus 2.

As illustrated in FIG. 2, the post-processing apparatus 3 includes the display 200. The display 200 outputs a display indicating that the remaining amount of the liquid for crimp binding is low, and prompts the user to replenish the liquid. The display of the display 200 may be notified to the image forming apparatus 2 by using a communication unit, and may be displayed on the control panel 110 of the image forming apparatus 2 (see FIGS. 21, 22A and 22B). In this case, the display 200 of the post-processing apparatus 3 is omitted.

As described above, the post-processing apparatus 3 implements the function of performing operation control related to the liquid application by software (control programs) executed by the CPU 101 with hardware resources included in the controller 100*b*.

In some embodiments, the liquid application performed by the post-processing apparatus 3 may be performed in a form in which the staple binder 155 is provided with only the stapler 62 and the liquid application is performed using the liquid applier 31 of the edge binder 25. Conversely, the edge binder 25 may include only the crimper 32, and the liquid application may be performed in a mode in which the second liquid applier 612 is used. In other words, the post-processing apparatus 3 may have a configuration in which only one of the liquid applier 31 and the second liquid applier 612 performs the liquid application, regardless of the type of the binding process.

In the above description, the staple binder 155' has a configuration of moving along the guide shaft 49 with the stapler 62 and the second liquid applier 612 being integrated, the embodiments of the present disclosure are not limited to the above-described configuration. For example, the stapler 62 and the second liquid applier 612 may have a configuration of moving separately from each other.

A description is given of a binding process according to an embodiment of the present disclosure.

A description is given below of the binding process executed by the edge binder 25 included in the post-processing apparatus 3.

Figure 9:
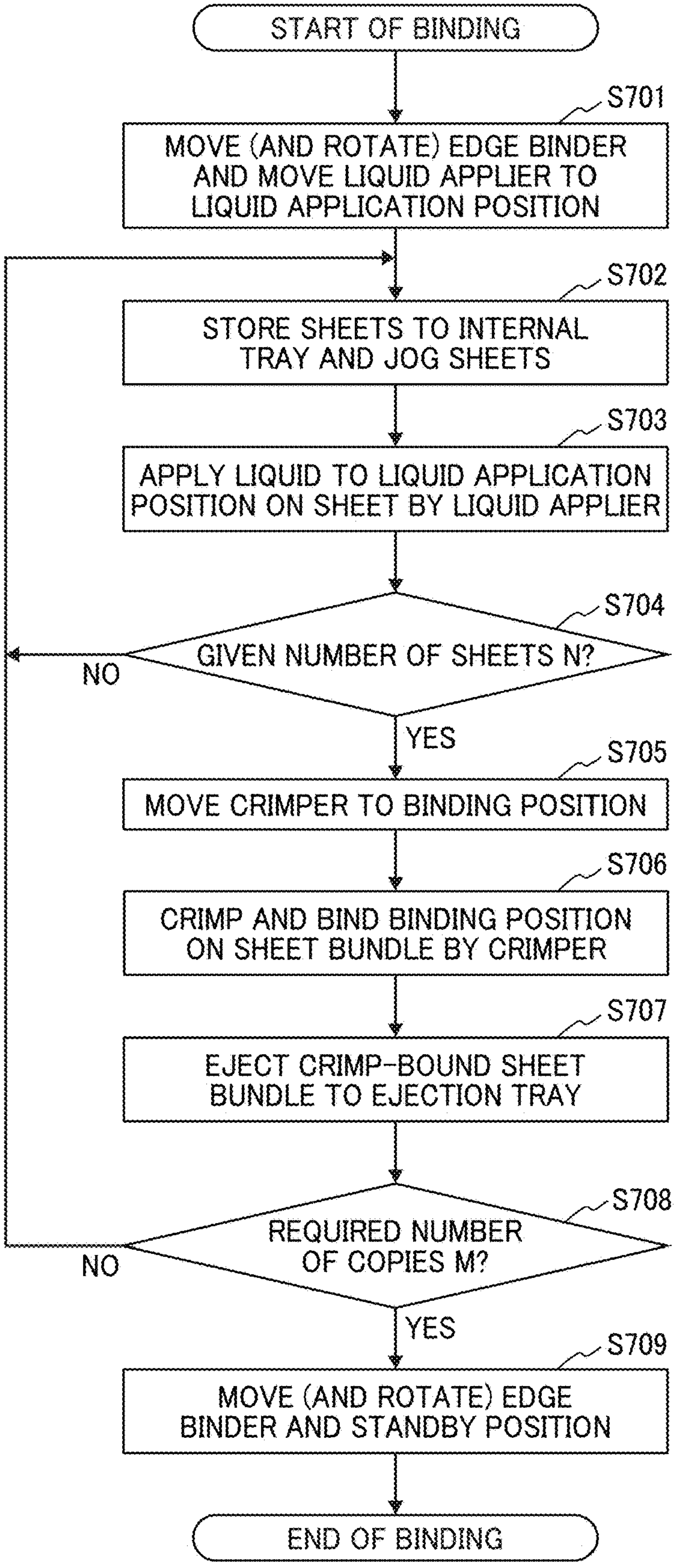
FIG. 9 is a flowchart of a binding process according to an embodiment of the present disclosure.

FIG. 9 is a flowchart of the binding process for executing a single binding process.

Figure 10C:
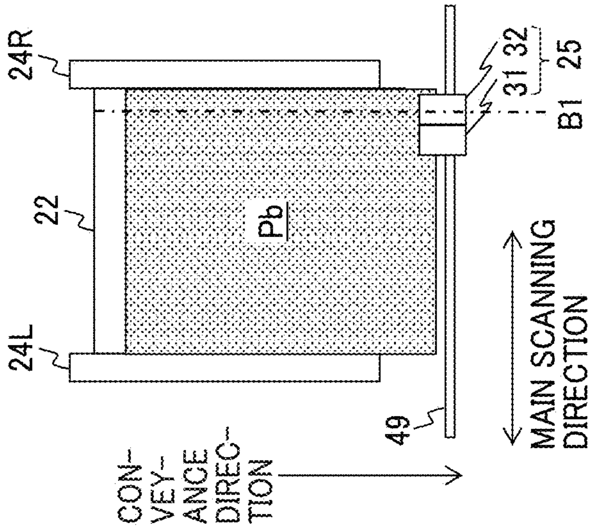
FIGS. 10A, 10B, and 10C are diagrams each illustrating the positions of a liquid applier and a crimper during the binding process by the edge binder.
Figure 10B:
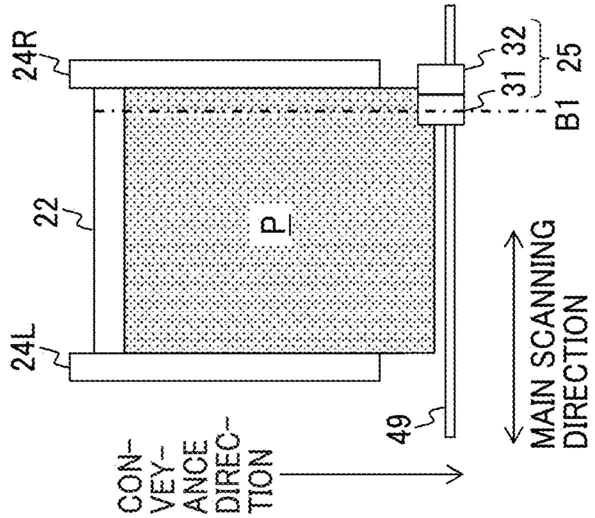
Figure 10A:
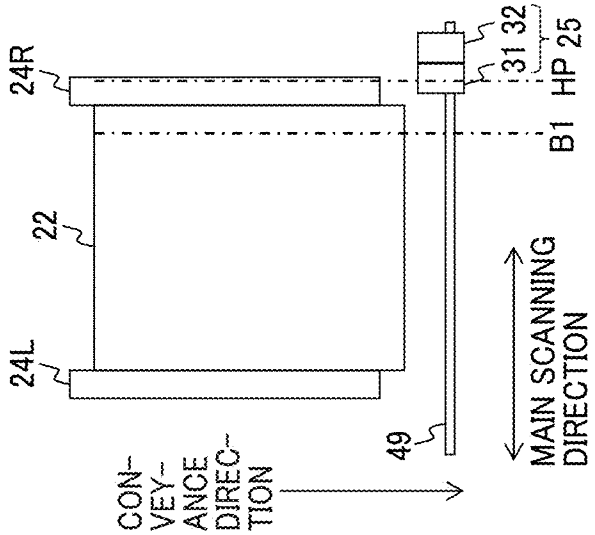

FIGS. 10A, 10B, and 10C are diagrams illustrating the transition of the positions of the edge binder 25 (the liquid applier 31 and the crimper 32) during the single binding process of FIG. 9.

FIGS. 10A, 10B, and 10C do not illustrate changes in the postures of the liquid applier 31 and the crimper 32.

The liquid application position to which liquid is applied on a sheet P or a sheet bundle Pb by the liquid applier 31 corresponds to the binding position on the sheet bundle Pb to be crimped and bound by the crimper 32. For this reason, in the following description, the liquid application position and the binding position are denoted by the same reference sign (B1).

For example, the controller 100*b* starts the binding process illustrated in FIG. 9 when the controller 100*b* acquires an instruction to execute the binding process from the image forming apparatus 2. In the following description, the instruction to execute the binding process may be referred to as a "binding command."

The binding command includes, for example, the type of the sheet P (i.e., information affecting the spread of liquid, such as the thickness of the material), the number of sheets P of the sheet bundle Pb, the number of sheet bundles Pb to be bound, the binding position on the sheet bundle Pb, and the binding posture of the edge binder 25. In the following description, the number of sheets P of the sheet bundle Pb may be referred to as "given number of sheets N" whereas the number of sheet bundles Pb to be bound may be referred to as "requested number of copies M." The liquid applier 31 and the crimper 32 are assumed to be in a parallel binding posture and located at a standby position HP (FIG. 10A) that is a position shifted in the width direction from the sheets P placed on the internal tray 22 at the start of the binding process.

When the posture that is instructed by the binding command is the "oblique binding posture," the controller 100*b* drives the liquid applier pivot motor 563 and the crimper pivot motor 56 to rotate the liquid applier 31 and the crimper 32 of the edge binder 25 into the oblique binding posture (step S701). Alternatively, when the posture that is instructed by the binding command is the "oblique binding posture," the crimper 32 alone may be rotated to the oblique binding posture while the liquid applier 31 may not be rotated. As a result, the driving assembly may be simplified as compared with a case where both the liquid applier 31 and the crimper 32 are rotated in the forward and reverse directions, and thus effects of cost reduction, downsizing of the apparatus, and reduction of failure of the device are exhibited.

On the other hand, when the posture that is instructed by the binding command is the "parallel binding posture," the controller 100*b* omits the aforementioned operation of rotating the liquid applier 31 and the crimper 32 of the edge binder 25 to the oblique binding posture.

The controller 100*b* drives the edge binder movement motor 55 to move the edge binder 25 in the main scanning direction so that the liquid applier 31 faces the liquid application position B1 instructed by the binding command (step S701). The controller 100*b* executes the operation of step S701 before a first sheet P is conveyed to the internal tray 22 by the conveyance roller pairs 10, 11, 14, and 15.

The controller 100*b* then rotates the conveyance roller pairs 10, 11, 14, and 15 to store the sheet P, on which the image has been formed by the image forming apparatus 2, onto the internal tray 22 (step S702). The controller 100*b* moves the side fences 24L and 24R to align the position of the sheet P or the sheet bundle Pb placed on the internal tray 22 in the main scanning direction (step S702). In short, the controller 100*b* performs so-called jogging.

Subsequently, the controller 100*b* causes the liquid applier 31 facing the liquid application position B1 to perform liquid application, on the basis of pre-adjusted liquid application control data, in the liquid application position B1 on the sheet P, which has been placed on the internal tray 22 in the immediately preceding step S702 (step S703). In other words, the controller 100*b* drives the liquid applier movement motor 42 to bring the liquid application member 501 into contact with the liquid application position B1 on the sheet P placed on the internal tray 22 (see FIG. 10B). In the liquid application process in step S703, the controller 100*b* adjusts the position at which the liquid application member 501 applies liquid to the sheet P in accordance with the type of the sheet P and the binding position included in the binding command. The controller 100*b* adjusts the amount of pressing the liquid application member 501 against the sheet P. In other words, the controller 100*b* controls the driving of the liquid applier movement motor 42 based on the adjusted control data, and adjusts the amount of movement of the liquid application member 501 with respect to the liquid application position B1 of the sheet P placed on the internal tray 22.

The controller 100*b* determines whether the number of sheets P placed on the internal tray 22 has reached the given number of sheets N instructed by the binding command (step S704). When the controller 100*b* determines that the number of sheets P placed on the internal tray 22 has not reached the given number of sheets N (NO in step S704), the controller 100*b* executes the operations of steps S702 to S704 again until the number of sheets P placed on the internal tray 22 reaches the given number of sheets N (YES in step S704). In other words, the controller 100*b* executes the processing of steps S702 to S704 each time the sheet P is conveyed to the internal tray 22 by the conveyance roller pairs 10, 11, 14, and 15. The liquid application by the liquid applier 31 may be performed on each of the sheets P of the sheet bundle Pb.

When the controller 100*b* determines that the number of sheets P placed on the internal tray 22 has reached the given number of sheets N (YES in step S704), in step S705, the controller 100*b* drives the edge binder movement motor 55 to move the edge binder 25 in the main scanning direction such that the crimper 32 faces the binding position B1 as illustrated in FIG. 10C.

The controller 100*b* causes the crimper 32 to crimp and bind the sheet bundle Pb placed on the internal tray 22 (step S706). The controller 100*b* causes the conveyance roller pair 15 to eject the sheet bundle Pb thus crimped and bound by the crimper 32 to the second ejection tray 26 (step S707). Specifically, the controller 100*b* drives the contact-separation motor 32*d* to cause the upper crimping teeth 32*a* and the lower crimping teeth 32*b* to pinch the binding position B1 on the sheet bundle Pb placed on the internal tray 22. The sheet bundle Pb is pressed and deformed between the upper crimping teeth 32*a* and the lower crimping teeth 32*b*. Thus, the crimper 32 crimps the sheet bundle Pb. Then, the controller 100*b* rotates the conveyance roller pair 15 to eject the sheet bundle Pb thus crimped and bound to the second ejection tray 26.

The sheet bundle Pb placed on the internal tray 22 has a crimping area (corresponding to the binding position B1) pinched between the upper crimping teeth 32*a* and the lower crimping teeth 32*b* in step S706. The crimping area overlaps a liquid application area (corresponding to the liquid application position B1) contacted by a distal end (tip portion) of the liquid application member 501 in step S703. In other words, the crimper 32 crimps an area to which liquid is applied by the liquid applier 31 on the sheet bundle Pb placed on the internal tray 22. The crimping area that is pinched by the upper crimping teeth 32*a* and the lower crimping teeth 32*b* may completely or partially overlaps the liquid application area contacted by the distal end (tip portion) of the liquid application member 501, to obtain a sufficient binding strength.

The controller 100*b* determines whether the number of sheet bundles Pb thus ejected to the second ejection tray 26 has reached the requested number of copies M indicated by the binding command (step S708). When the controller 100*b* determines that the number of sheet bundles Pb thus ejected has not reached the requested number of copies M (NO in step S708), the controller 100*b* executes the operations of step S702 and the following steps again. In other words, when the controller 100*b* determines that the number of sheet bundles Pb thus ejected has not reached the requested number of copies M (NO in step S708), the controller 100*b* repeats the operations of steps S702 to S708 until the number of sheet bundles Pb ejected to the second ejection tray 26 reaches the requested number of copies M.

On the other hand, when the controller 100*b* determines that the number of sheet bundles Pb output to the second ejection tray 26 has reached the requested number of copies M (YES in step S708), the controller 100*b* drives the edge binder movement motor 55 to move the edge binder 25 (the liquid applier 31 and the crimper 32) to the standby position HP as illustrated in FIG. 10A (step S709) When the posture that is instructed by the binding command is the "oblique binding posture," the controller 100*b* drives the liquid applier pivot motor 563 and the crimper pivot motor 56 to rotate the liquid applier 31 and the crimper 32 into the parallel binding posture (step S709). On the other hand, when the posture that is instructed by the binding command is the "parallel binding posture," the controller 100*b* skips the aforementioned operation of rotating the liquid applier 31 and the crimper 32 to the parallel binding posture. As a result, the edge binder 25 (the liquid applier 31 and the crimper 32) returns to the standby position HP position illustrated in FIG. 10A. In steps S701 and S709, the execution order of the movement in the main scanning direction and the rotation in the forward and reverse directions of the liquid applier 31 and the crimper 32 is not limited to the aforementioned order and may be reversed.

A detailed description is given below of a second liquid storage tank 47 according to an embodiment of the present disclosure.

Figure 11A:
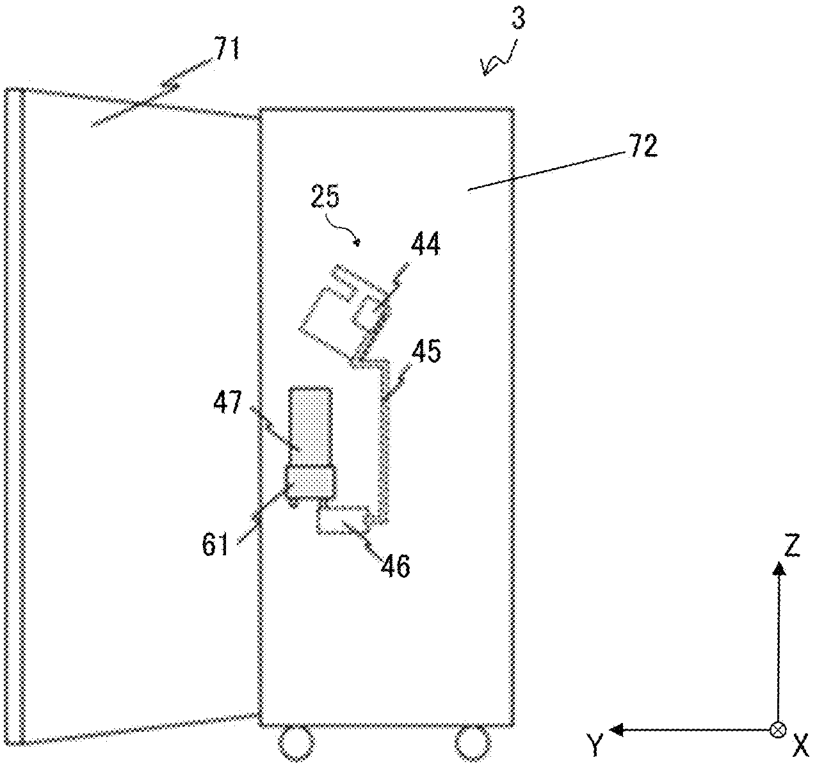
FIGS. 11A and 11B are diagrams each illustrating the location and configuration of a second liquid storage tank in the post-processing apparatus.
Figure 11B:
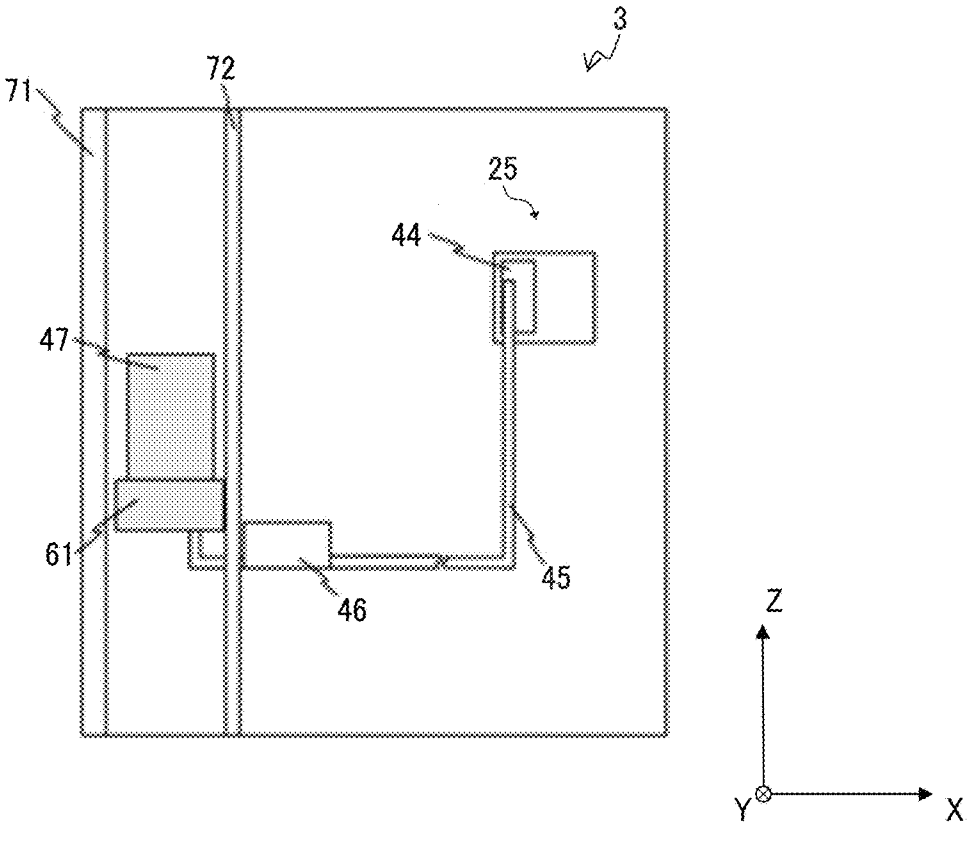
Figure 12:
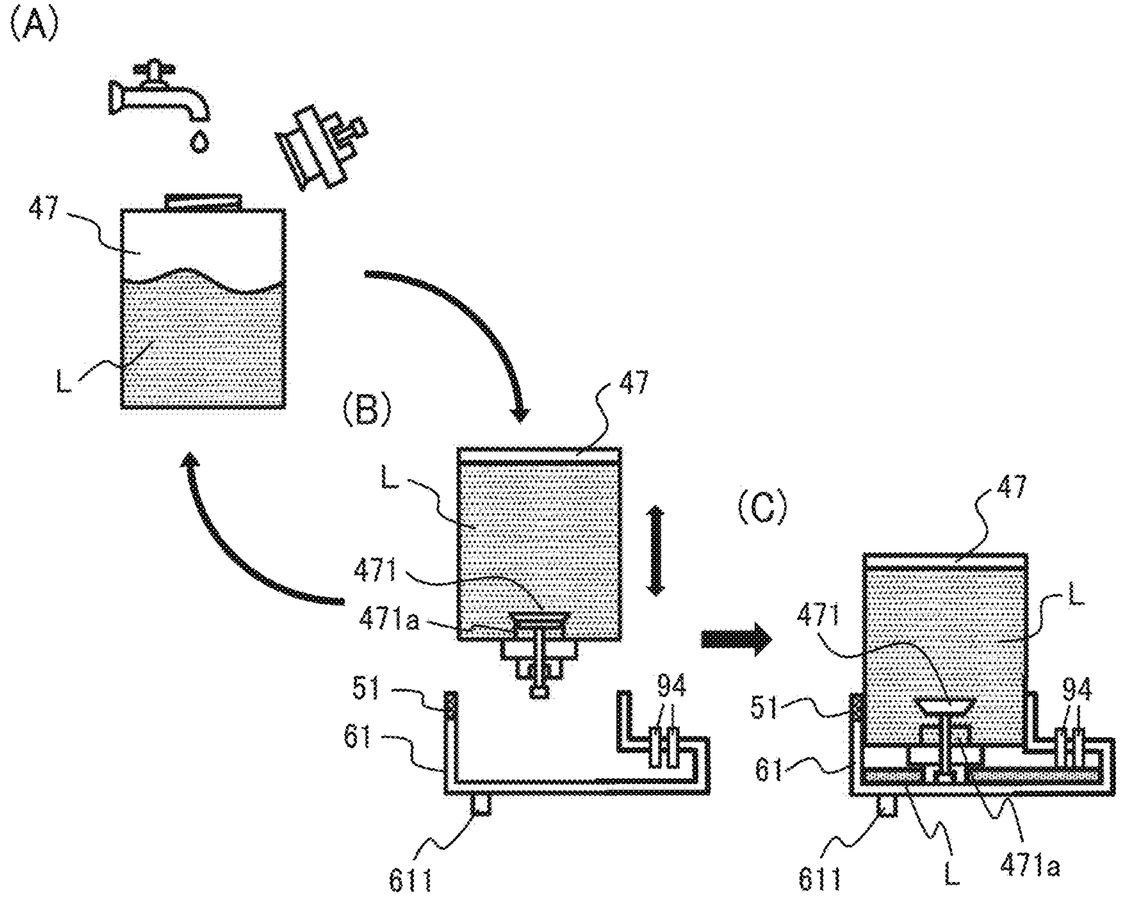
FIG. 12 including

Referring now to FIGS. 11A, 11B, and 12, a description is given of the arrangement and configuration of the second liquid storage tank 47 in the post-processing apparatus 3.

FIGS. 11A and 11B illustrate example location and configuration of the second liquid storage tank 47 as the main tank.

FIG. 11A illustrates the post-processing apparatus 3 with a cover 71 opened. FIG. 11B is a cross-sectional side view of the post-processing apparatus 3, illustrating the post-processing apparatus 3 with the cover 71 closed.

As illustrated in FIGS. 11A and 11B, the second liquid storage tank 47 is located so as to be accessible when the cover 71 of the post-processing apparatus 3 is opened.

As illustrated in FIG. 11B, the second liquid storage tank 47 and the second liquid storage tank fixer 61 are disposed on the near side in a depth direction (X direction) of the post-processing apparatus 3. The first liquid storage tank 44 is disposed on the far side in the depth direction (X direction) of the post-processing apparatus 3. A main body side plate 72 of the post-processing apparatus 3 is disposed between the arrangement position of the second liquid storage tank 47 and the second liquid storage tank fixer 61 and the arrangement position of the first liquid storage tank 44. The second liquid storage tank fixer 61 is attached to the main body side plate 72 of the post-processing apparatus 3.

FIG. 12 including FIGS. 12(A), 12(B), and 12(C) each illustrates the second liquid storage tank 47 attachable to and detachable from the second liquid storage tank fixer 61 and a state where liquid is replenished (supplied) to the second liquid storage tank 47.

As illustrated in FIG. 12(A), the second liquid storage tank 47 is detachably attached to the first liquid storage tank 44 so that the second liquid storage tank 47 can replenish (supply) the liquid to the first liquid storage tank 44. As illustrated in FIG. 12(B), the second liquid storage tank fixer 61 is provided with the setting detection sensor 51 serving as a setting detector that detects that the second liquid storage tank 47 is set in the second liquid storage tank fixer 61.

When the setting detection sensor 51 detects the set state of the second liquid storage tank 47 to the second liquid storage tank fixer 61 (see FIG. 12(C)), a signal indicating the set state is transmitted to the controller 100*b*. Thus, the controller 100*b* detects whether the second liquid storage tank 47 is mounted to the second liquid storage tank fixer 61.

The second liquid amount detection sensor 94 (serving as second liquid detector) that detects the amount of liquid L to be stored in the second liquid storage tank 47 is disposed in the second liquid storage tank fixer 61. The output value (voltage) of the second liquid amount detection sensor 94 is notified to the controller 100*b*. The controller 100*b* determines the output value (voltage) of the second liquid amount detection sensor 94 to determine whether the amount of liquid stored in the second liquid storage tank fixer 61 is a required amount of liquid. When the controller 100*b* determines that the second liquid storage tank 47 is in the mount state based on the output signal of the setting detection sensor 51, the controller 100*b* turns on the second liquid amount detection sensor 94 such that the remaining amount of liquid (the amount of the liquid stored) in the second liquid storage tank fixer 61 can be detected.

When the second liquid storage tank 47 is not mounted on the second liquid storage tank fixer 61, an outlet of the second liquid storage tank 47 is closed by a liquid supply valve 471 so that the liquid does not leak. As illustrated in FIG. 12(C), when the second liquid storage tank 47 is mounted on the second liquid storage tank fixer 61, the liquid supply valve 471 is pushed up to open a liquid discharge port 471*a* of the second liquid storage tank 47. By so doing, the liquid is flow out from the second liquid storage tank 47 to the second liquid storage tank fixer 61. As a result, the liquid stored in the second liquid storage tank 47 flows out to the second liquid storage tank fixer 61. The liquid flown from the second liquid storage tank 47 is temporarily stored in the second liquid storage tank fixer 61.

As a measurement to prevent the liquid from being frozen during maintenance of the post-processing apparatus 3, a liquid draining process may be performed to drain the liquid in the post-processing apparatus 3. In the liquid draining process, the liquid remaining in the first liquid storage tank 44 and the liquid supply passage 45 is supplied by the liquid supply pump 46 to the second liquid storage tank fixer 61 via the liquid supply passage 45 in the reverse direction. In order to deal with such a situation, the second liquid storage tank fixer 61 is set to the amount to sufficiently store liquid in the first liquid storage tank 44 and the liquid supply passage 45. The second liquid storage tank fixer 61 has a liquid drain plug 611.

After the liquid remaining in the first liquid storage tank 44 and the liquid supply passage 45 is reversely fed by the liquid supply pump 46 to the second liquid storage tank fixer 61, the liquid drain plug 611 is opened to discharge the liquid stored in the second liquid storage tank fixer 61 from the inside of the post-processing apparatus 3.

A description is given of a liquid storage unit according to a first embodiment of the present disclosure.

A description is given below of the first liquid storage tank 44 serving as a liquid storage unit according to the first embodiment of the present disclosure and the configuration to replenish (supply) liquid to the first liquid storage tank 44.

Figure 13:
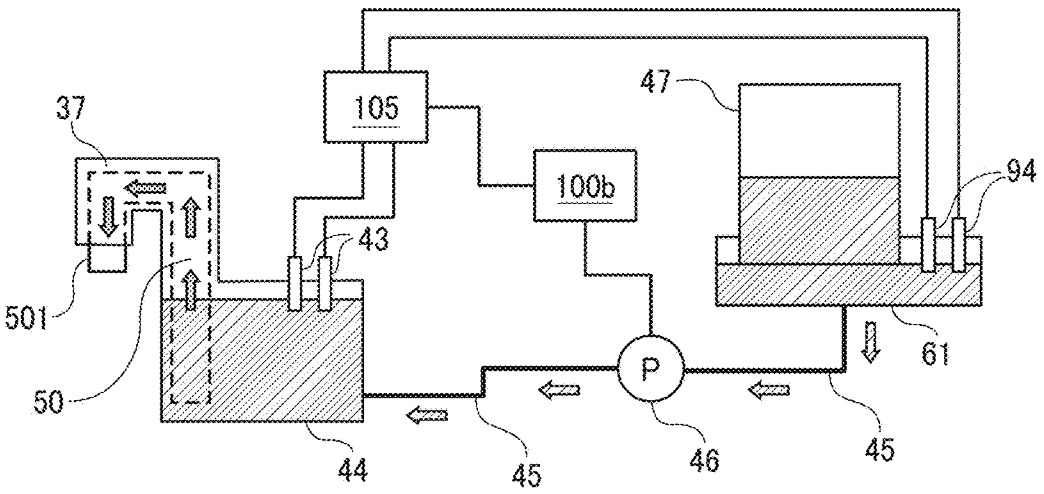
FIG. 13 is a diagram illustrating a first example of the position and configuration of a liquid storage unit included in the post-processing apparatus according to a first embodiment.

FIG. 13 is a diagram illustrating the liquid storage configuration and the liquid replenishing (supplying) configuration, including the first liquid storage tank 44.

Specifically, FIG. 13 is a diagram illustrating the position and configuration of the first liquid storage tank 44 included in the post-processing apparatus 3.

The amount of liquid (liquid level) stored in the first liquid storage tank 44 is detected by the first liquid amount detection sensor 43. The first liquid amount detection sensor 43 is, for example, an electrode sensor having a pair of electrodes. By applying a voltage to the pair of electrodes, the remaining amount of the liquid (the stored liquid amount) with respect to the position of the electrodes can be acquired by a voltage fluctuation. This voltage fluctuation is transmitted to the controller 100*b* via the I/F 105. The controller 100*b* determines whether or not the position (reference liquid level) of the liquid surface in the first liquid storage tank 44 has reached a given position by determining whether or not the voltage fluctuation exceeds a given threshold value.

In other words, the controller 100*b* acquires a value of an output value (voltage) output when the first liquid amount detection sensor 43 detects the liquid in the first liquid storage tank 44, and determines whether the liquid is left (the stored liquid amount) in the first liquid storage tank 44. Whether the liquid is left (the amount of the liquid stored) in the first liquid storage tank 44 is determined based on whether the output value (voltage) from the first liquid amount detection sensor 43 exceeds a first liquid detection threshold value (e.g., a first threshold value such as the output voltage V1) that is set in advance.

The second liquid storage tank 47 that stores liquid to be replenished (supplied) to the first liquid storage tank 44 includes a second liquid amount detection sensor 94 that detects the amount (level) of the liquid in the second liquid storage tank 47. Similar to the first liquid amount detection sensor 43, the second liquid amount detection sensor 94 can use an electric sensor. For this reason, the second liquid amount detection sensor 94 can determine whether the liquid level (liquid amount) is at or above the given position (reference liquid level) as the controller 100*b* determines the fluctuation of the applied voltage.

In other words, the controller 100*b* acquires a value of an output value (voltage) output when the second liquid amount detection sensor 94 detects the liquid in the second liquid storage tank 47, and determines whether the liquid is left (the stored liquid amount) in the second liquid storage tank 47. Whether the liquid is left (the stored liquid amount) in the second liquid storage tank 47 is determined based on whether the output value (voltage) from the second liquid amount detection sensor 94 exceeds a second liquid detection threshold value (e.g., a second threshold value such as the output voltage V2) that is set in advance.

The electrode sensor is described as an example of the first liquid amount detection sensor 43 and the second liquid amount detection sensor 94 in the present embodiment. However, embodiments of the present disclosure are not limited to the electrode sensor, and any other instruction may be used. For example, a float sensor or a capacitance sensor may be used to detect the presence or absence of the liquid. Further, the first liquid amount detection sensor 43 and the second liquid amount detection sensor 94 are not limited to a sensor that detects the liquid levels (the surface of the liquid) of the liquid in the first liquid storage tank 44 and the second liquid storage tank 47, and may be any sensor that can detect whether liquid is left in the first liquid storage tank 44 and the second liquid storage tank 47 (the stored liquid amount).

When the controller 100*b* determines that the liquid level (liquid amount) in the first liquid storage tank 44 is not at or above the given position (reference liquid level), the controller 100*b* causes the liquid supply pump 46 to start the operation. The liquid supply pump 46 is disposed in the liquid supply passage 45 that couples the first liquid storage tank 44 and the second liquid storage tank 47 to each other and is used to supply liquid from the second liquid storage tank 47 to the first liquid storage tank 44. When the liquid supply pump 46 is operated, liquid is supplied (replenished) from the second liquid storage tank 47 to the first liquid storage tank 44. As a result, when the controller 100*b* determines that the liquid level (liquid amount) in the first liquid storage tank 44 is increased to be above the given position (reference liquid level) of the liquid in the first liquid storage tank 44 based on the output value (voltage) from the second liquid amount detection sensor 94, the controller 100*b* causes the liquid supply pump 46 to stop the operation to end the supply operation of liquid from the second liquid storage tank 47 to the first liquid storage tank 44.

The liquid stored in the first liquid storage tank 44 is sucked up by the capillary action of the liquid supply member 50 and moves to the liquid application member 501. In response to the contact of the liquid application member 501 storing the liquid to the sheet P, the liquid applier 31 executes liquid application.

Figure 14:
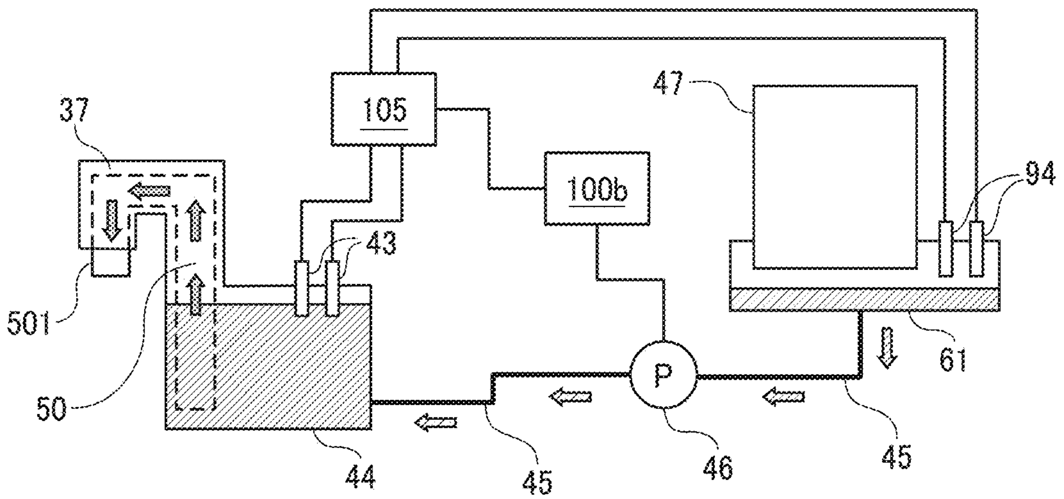
FIG. 14 is a diagram illustrating the first example, subsequent to FIG. 13, of the position and configuration of the liquid storage unit included in the post-processing apparatus according to the first embodiment.

FIG. 14 illustrates a part of the post-processing apparatus 3 when the liquid level (liquid amount) of the liquid in the second liquid storage tank 47 falls below the given position (reference liquid level).

In other words, FIG. 14 is a diagram illustrating the position and configuration of the first liquid storage tank 44 included in the post-processing apparatus 3, subsequent to the operation in FIG. 13. In other words, FIG. 14 illustrates the state where the controller 100*b* determines that the liquid in the second liquid storage tank 47 is “empty”. As the controller 100*b* determines that the voltage value that is applied to the second liquid amount detection sensor 94 is changed to a value different from the value when the liquid is in the second liquid storage tank 47, the controller 100*b* determines that the liquid in the second liquid storage tank 47 is “empty”.

When the liquid in the second liquid storage tank 47 reaches this state, the controller 100*b* outputs, to the display 200 or the control panel 110, a display indicating that the remaining amount of the liquid for crimp binding is low, to prompt the user to replenish (supply) the liquid. This display may be notified to the image forming apparatus 2 by using a communication unit, and may be displayed on the control panel 110 of the image forming apparatus 2.

Figure 15:
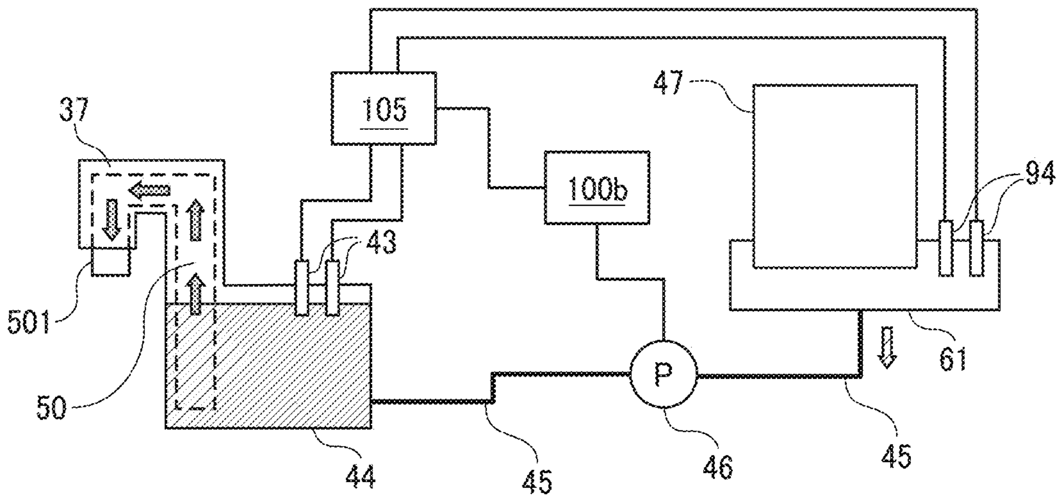
FIG. 15 is a diagram illustrating the first example, subsequent to FIG. 14, of the position and configuration of the liquid storage unit included in the post-processing apparatus according to the first embodiment.

FIG. 15 illustrates a part of the post-processing apparatus 3 when the liquid in the second liquid storage tank 47 is empty and the first liquid amount detection sensor 43 detects the liquid in the first liquid storage tank 44 from the “liquid remaining” state to the “no liquid remaining” state in response to the reduction in liquid in the first liquid storage tank 44.

In other words, FIG. 15 is a diagram illustrating the position and configuration of the first liquid storage tank 44 included in the post-processing apparatus 3, subsequent to the operation in FIG. 14. The state in FIG. 15 is a trigger in the present embodiment that the controller 100*b* determines that the liquid storing state in the post-processing apparatus 3 is the "no liquid remaining" state.

As illustrated in FIG. 15, even when the controller 100*b* determines that the liquid storing state in the post-processing apparatus 3 is the "no liquid remaining" state, there is liquid remaining in the first liquid storage tank 44, and thus liquid can be applied to the sheet P by the liquid applier 31. At this time, the number of times of liquid application by the liquid applier 31 corresponds to a given number of times of liquid application to be performed and a given number of sheets P on which liquid application is to be performed.

In other words, even when the first liquid amount detection sensor 43 does not detect liquid and the controller 100*b* determines that the liquid storing state in the post-processing apparatus 3 is in the "no liquid remaining" state, the crimp binding process with liquid application can be continued without stopping conveyance of the sheet P on which the crimp binding process with liquid application is to be performed, from the image forming apparatus 2 toward the post-processing apparatus 3. By so doing, even when the conveyance of the sheet P from the image forming apparatus 2 to the post-processing apparatus 3 is stopped due to, for example, a paper jam of the sheet P in the conveyance passage in the image forming apparatus 2, the crimp binding process with liquid application in the post-processing apparatus 3 does not need to be stopped each time, and thus the convenience of the user can be enhanced.

A description is given below of the liquid storage units according to a second embodiment of the present disclosure.

Specifically, a description is given below of the first liquid storage tank 44 serving as a liquid storage unit according to the second embodiment of the present disclosure and the configuration to replenish (supply) liquid to the first liquid storage tank 44.

Figure 16:
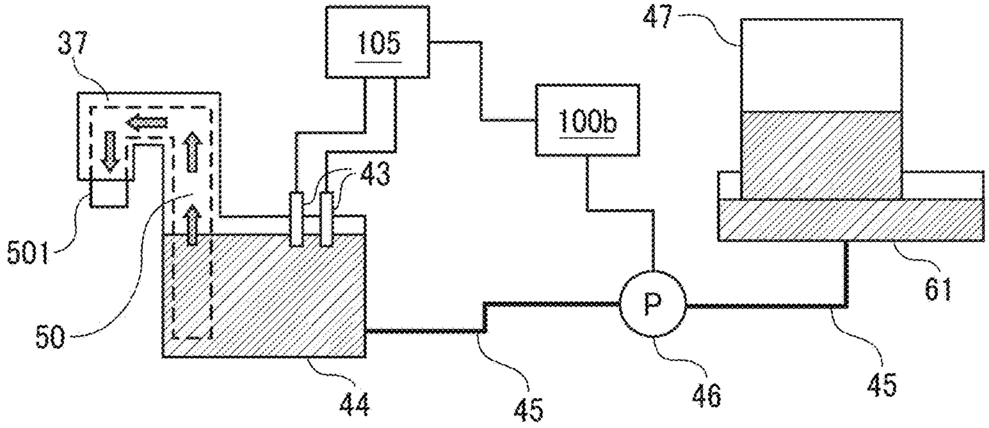
FIG. 16 is a diagram illustrating a second example of the position and configuration of a liquid storage unit included in the post-processing apparatus according to a second embodiment.

FIG. 16 is a diagram illustrating the liquid storage configuration and the liquid replenishing (supplying) configuration, including the first liquid storage tank 44. Specifically, FIG. 16 is a diagram illustrating the position and configuration of the first liquid storage tank 44 included in the post-processing apparatus 3.

Figure 17:
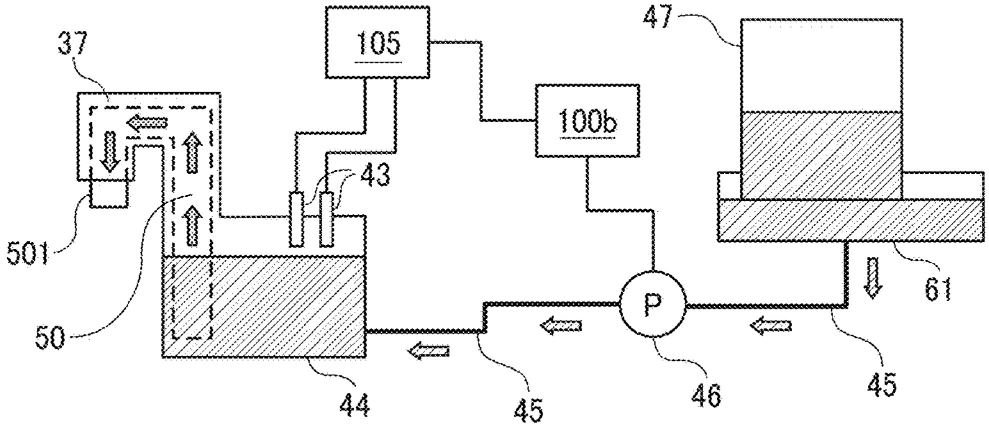
FIG. 17 is a diagram illustrating the second example, subsequent to FIG. 16, of the position and configuration of the liquid storage unit included in the post-processing apparatus according to the second embodiment.

FIG. 17 is a diagram illustrating the liquid storage condition and the liquid replenishing (supplying) configuration, including the first liquid storage tank 44.

Specifically, FIG. 17 is a diagram illustrating the position and configuration of the first liquid storage tank 44 included in the post-processing apparatus 3.

Figure 18:
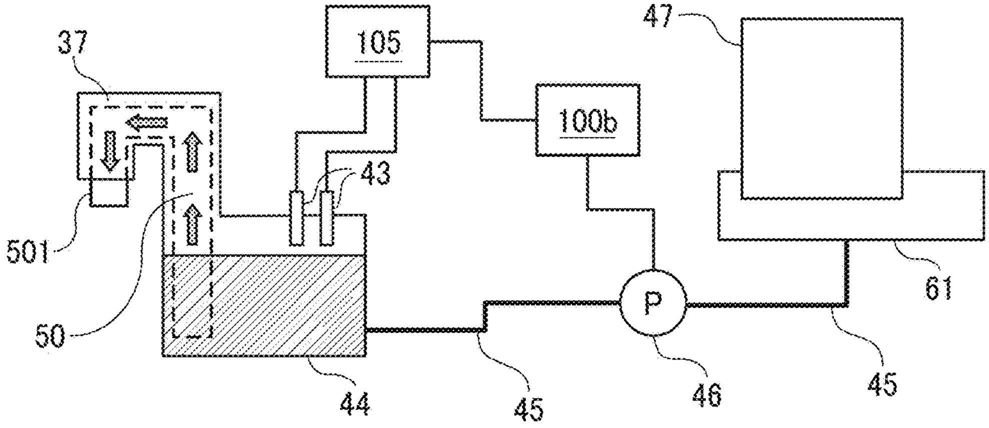
FIG. 18 is a diagram illustrating the second example, subsequent to FIG. 17, of the position and configuration of the liquid storage unit included in the post-processing apparatus according to the second embodiment.

As illustrated in FIGS. 16 to 18, the liquid detector may be disposed only in the first liquid storage tank 44. As illustrated in FIGS. 16 to 18, when the first liquid amount detection sensor 43 detects, based on the result of liquid application by the liquid applier 31, that the liquid in the first liquid storage tank 44 is in the "no liquid remaining" state, the controller 100*b* operates the liquid supply pump 46 to supply the liquid in the second liquid storage tank 47 to the first liquid storage tank 44. When the first liquid amount detection sensor 43 detects that the liquid in the first liquid storage tank 44 is in the "liquid remaining" state or when a given time has elapsed, the controller 100*b* causes the liquid supply pump 46 to stop the operation.

FIG. 18 illustrates a part of the post-processing apparatus 3 when the first liquid amount detection sensor 43 fails to detect the liquid even if the liquid supply pump 46 is operated for a given time in the state of FIG. 17.

In other words, FIG. 18 is a diagram illustrating the position and configuration of the first liquid storage tank 44 included in the post-processing apparatus 3, subsequent to the operation in FIG. 17. The state in FIG. 18 is a trigger in the present embodiment that the controller 100*b* determines that the liquid storing state in the post-processing apparatus 3 is the "no liquid remaining" state.

A description is given below of the flow of the liquid application determination process.

A description is given below of the first liquid storage tank 44 according to the first and second embodiments and the flow of the liquid application determination process (the "liquid application determination process" flow) performed in the configuration for replenishing (supplying) liquid to the first liquid storage tank 44, with reference to the flowchart of FIG. 19.

The liquid application determination process is a process to be executed in units of sheets P of the sheet bundle Pb when the crimp binding process with liquid application is performed and a process to determine whether liquid application is executable on a single sheet P.

The liquid application determination process corresponds to a process determined by the controller 100*b* of the post-processing apparatus 3 before the sheet P to which liquid is applied in the post-processing apparatus 3 starts to be fed from the sheet tray 211 of the image forming apparatus 2. The liquid application determination process is performed in units of sheets P. In other words, the liquid application determination process corresponds to a process to determine whether liquid application is executable on a sheet P to be conveyed from the image forming apparatus 2 to the post-processing apparatus 3 at the timing immediately before the sheet P starts to be fed from the sheet tray 211 of the image forming apparatus 2.

Figure 19:
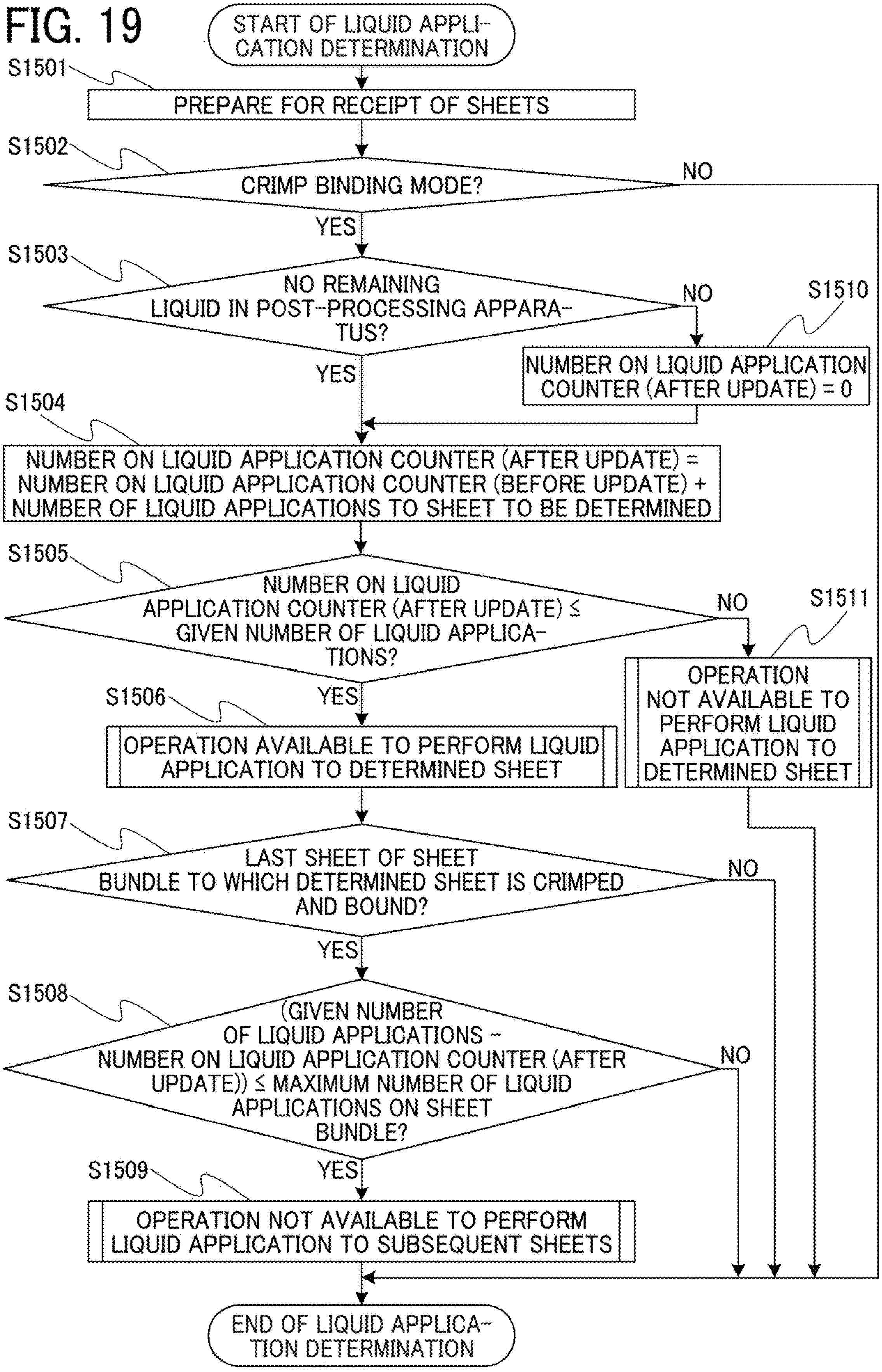
FIG. 19 is a flowchart of a liquid application determination process according to the present embodiment.

As illustrated in FIG. 19, as the liquid application determination process flow starts, the controller 100*b* executes a sheet receipt preparation in which information regarding a sheet P to be ejected from the image forming apparatus 2 (sheet information) is notified to the post-processing apparatus 3 (step S1501). The sheet information notification is performed in units of sheets P, for example, at a timing immediately before the sheet P starts to be fed from the sheet tray 211 of the image forming apparatus 2. The "sheet information" includes information of the size of the sheet P (the size of the medium), information of the kind of the sheet P (the type of the medium), information of the thickness of the sheet P (the thickness of the medium), and information designating the kind of post-processing on the sheet P (staple binding, crimp binding, edge binding, or saddle binding; the kind of the binding position; the kind of binding such as parallel binding or oblique binding), and the number of times of binding). The information designating the kind of post-processing on the sheet P corresponds to binding mode information.

The controller 100*b* then refers to the "binding mode information" included in the sheet information notified by the image forming apparatus 2. To be more specific, the controller 100*b* determines whether the content of the binding mode information is a "crimp binding mode" that indicates the sheet P is the object on which the crimp binding process with liquid application is performed (step S1502). In step S1502, when the controller 100*b* determines that the content of the binding mode information is a "crimp binding mode" (YES in step S1502), the controller 100*b* moves to step S1503 to determine whether liquid application is executable. On the other hand, when the content of the binding mode information is not a "crimp binding mode" (NO in step S1502), the controller 100*b* ends the flow of the liquid application determination process.

Subsequently, in step S1503, the controller 100*b* determines whether the remaining amount of liquid (the stored liquid amount) of each of the first liquid storage tank 44 and the second liquid storage tank 47 based on the output value (voltage) of a corresponding one of the first liquid amount detection sensor 43 and the second liquid amount detection sensor 94 and determines whether the liquid storing state in the post-processing apparatus 3 is in the "no liquid remaining" state. When the first liquid amount detection sensor 43 and the second liquid amount detection sensor 94 do not detect any liquid in the first liquid storage tank 44 and the second liquid storage tank 47, the controller 100*b* determines that the liquid storing state in the post-processing apparatus 3 is the "no liquid remaining" state (YES in step S1503). Subsequently, the controller 100*b* adds the number of executions of liquid application on the sheet P regarding which the sheet information is notified (the number of times of liquid application) in step S1501, to the current liquid application counter NL (before update) (step S1504). The number of executions of liquid application on the sheet P (e.g., the number of times of liquid application) is the number of times set in advance based on, for example, the "binding position" and the "thickness of recording medium" in the sheet information setting table D16 illustrated in FIG. 20.

The determination condition in step S1503 is now described in more detail. For example, the remaining amount of liquid (stored liquid amount) in the first liquid storage tank 44 is the "no liquid remaining" state in the determination based on the detection result of the first liquid amount detection sensor 43, and the remaining amount of liquid (stored liquid amount) in the second liquid storage tank 47 is also the "no liquid remaining" state in the determination based on the detection result of the second liquid amount detection sensor 94. In this case, the controller 100*b* determines that the liquid storing state in the post-processing apparatus 3 is the "no liquid remaining" state (YES in step S1503).

The value set in advance (the number of times of liquid application) based on the binding mode information (including the information indicating the binding position) included in the sheet information and the information such as the size of the medium, the kind of the medium, and the thickness of the medium is applied to the number of times of liquid application on a single sheet P. For example, the value is based on information stored in a table structure data format illustrated in FIG. 20. It is assumed that the sheet information setting table D16 illustrated in FIG. 20 is stored in advance in a storage unit (e.g., the ROM 103 illustrated in FIG. 8) of the controller 100*b*.

Then, the controller 100*b* selects the number of times of liquid information based on, for example, the kind of the binding position and the thickness of the medium included in the binding mode information stored in the sheet information setting table D16 illustrated in FIG. 20. The sheet information setting table D16 illustrated in FIG. 20 is an example of the configuration including only the binding mode information (the kind of the binding position) and the thickness of the medium among the information items included in the sheet information. The sheet information setting table D16 according to the present embodiment is not limited to this example and an appropriate number of times of liquid application, including the size of the medium size and the kind of the medium, may be distinguished and set in the sheet information setting table.

For the determination condition in step S1503, a determination based on another condition being satisfied may also be applicable. For example, a description is given below of a case where the controller 100*b* determines that the remaining amount of liquid (the stored liquid amount) in the first liquid storage tank 44 is in the "liquid remaining" state based on the detection result of the first liquid amount detection sensor 43 and the remaining amount of liquid (the stored liquid amount) in the second liquid storage tank 47 is in the "liquid remaining" state based on the detection result of the second liquid amount detection sensor 94. In this case, the controller 100*b* determines that the liquid storing state in the post-processing apparatus 3 is the "liquid remaining" state (NO in step S1503).

Further, a description is given below of another case where the controller 100*b* determines that the remaining amount of liquid (the stored liquid amount) in the first liquid storage tank 44 is in the "liquid remaining" state based on the detection result of the first liquid amount detection sensor 43 and the remaining amount of liquid (the stored liquid amount) in the second liquid storage tank 47 is in the "no liquid remaining" state based on the detection result of the second liquid amount detection sensor 94. In this case, the controller 100*b* determines that the liquid storing state in the post-processing apparatus 3 is the "liquid remaining" state (NO in step S1503).

Further, when the remaining amount of liquid (the stored liquid amount) in the first liquid storage tank 44 is in the "no liquid remaining" state and the remaining amount of liquid (the stored liquid amount) in the second liquid storage tank 47 is in the "liquid remaining" state, the liquid supply pump 46 can supply (replenish) the liquid in the second liquid storage tank 47 to the first liquid storage tank 44. For this reason, the controller 100*b* determines that the liquid storing state in the post-processing apparatus 3 is the "liquid remaining" state (NO in step S1503).

In other words, only in a case where, in the determination based on the detection result of the first liquid amount detection sensor 43, the liquid storing state of the first liquid storage tank 44 is in the "no liquid remaining" state and the liquid storing state of the second liquid storage tank 47 is also in the "no liquid remaining" state, the controller 100*b* determines that the liquid storing state in the post-processing apparatus 3 is in the "no liquid remaining" state (YES in step S1503).

In cases other than the above-described case, the controller 100*b* determines that the liquid storing state in the post-processing apparatus 3 is not in the "no liquid remaining" state (NO in step S1503). In this case, the remaining amount of liquid in the first liquid storage tank 44, the second liquid storage tank 47, or both are above the minimum remaining amount (reference liquid level) detectable by either one or both of the first liquid amount detection sensor 43 and the second liquid amount detection sensor 94. Thus, the controller 100*b* resets the current liquid application counter NL (before update), in other words, the controller 100*b* sets the liquid application counter NL after update to zero (step S1510).

When the controller 100*b* determines that the liquid storing state in the post-processing apparatus 3 is in the "no liquid remaining" state (YES in step S1503), the controller 100*b* adds the number of executions of liquid application on the sheet P regarding which the sheet information is notified (the number of times of liquid application) in step S1501, to the current liquid application counter NL (before update) (step S1504). After step S1504, the controller 100*b* determines the liquid application counter NL (after update) (step S1505).

In step S1505, the controller 100*b* determines whether the liquid application counter NL (after update) is equal to or smaller than the given number of times of liquid application.

When the liquid application counter NL (after update) is equal to or smaller than the given number of times of liquid application (YES in step S1505), the controller 100*b* determines that liquid application by the liquid applier 31 can be performed, and then cause the liquid applier 31 to perform liquid application (step S1506).

On the other hand, in step S1505, the controller 100*b* determines that the liquid application counter NL (after update) exceeds the given number of times of liquid application (NO in step S1505), the controller 100*b* determines that liquid application by the liquid applier 31 cannot be performed. Then, the controller 100*b* does not cause the liquid applier 31 to continue to perform liquid application and causes the display 200 or the control panel 110 to output information notifying the user that the "remaining liquid amount is low" in the post-processing apparatus 3 (step S1511).

The above-described given number of times of liquid application is set to be equal to or greater than the "maximum number of times of liquid application (maximum number of times) of the sheet bundle Pb" obtained by the following mathematical expression (1). By setting the given number of times of liquid application is set to be equal to or greater than the maximum number of times of liquid application of the sheet bundle Pb, the liquid storing state in the post-processing apparatus 3 is prevented from being the "no liquid remaining" state before the liquid application on the sheet P of one sheet bundle Pb is completed in the middle of the crimp binding process with liquid application on multiple sheet bundles Pb. In other words, the post-processing apparatus 3 can be prevented from being short of liquid in the middle of the operation of forming one sheet bundle Pb.

The minimum remaining liquid amount detectable by the remaining liquid amount detector (either one or both of the first liquid amount detection sensor 43 and the second liquid amount detection sensor 94) is the remaining liquid amount in accordance with the given number of times of liquid application. For example, the given number of times of liquid application is set to 100 times.

Maximum number of times of liquid application to the sheet bundle *Pb*=Maximum number of sheets *P* per sheet bundle *Pb* to be subjected to crimp binding×Maximum number of times of liquid application to one sheet *P*. Mathematical Expression (1):

The maximum number of sheets P per sheet bundle Pb to be subjected to crimp binding with liquid application is, for example, twenty (20).

In addition, the maximum number of times of liquid application to one sheet P is, for example, four (4) times in a case where the crimp binding with liquid application is performed at two points (see the "number of times of liquid application" in the sheet information setting table D16 of FIG. 20 for a case where the "binding position" is "double binding").

In other words, in the case of the above numerical example, the maximum number of times of liquid application per sheet bundle Pb is 80 times. In this case, the "given number of times of liquid application" is set to 80 times or more, for example, 100 times as described above.

The "liquid application counter NL (after update)" used in steps S1504 and S1505 may be replaced by a sheet number counter that counts the number of sheets P (the number of sheets). Similarly, the "given number of times of liquid application" may be replaced by the given number of sheets. If the "given number of times of liquid application" is replaced to the "given number of sheets", the remaining liquid amount in the post-processing apparatus 3 may be less accurately estimated. However, the remaining liquid amount can be managed by the number of sheets P. For this reason, the predicting process of the remaining liquid amount in the post-processing apparatus 3 can be simplified.

In the determination process of step S1505, when the given number of times of liquid application is infinite, liquid application by the liquid applier 31 can be performed regardless of the detection result of the remaining liquid amount in the post-processing apparatus 3 in step S1503. In this case, the liquid stored in the first liquid storage tank 44 and the second liquid storage tank 47 can be used up. When the liquid is used up, the liquid applier 31 cannot perform the subsequent liquid application, and the strength of the crimp binding is reduced. However, the sheet bundle Pb can be bound at the same binding strength as the crimp binding without liquid application.

Figure 21:
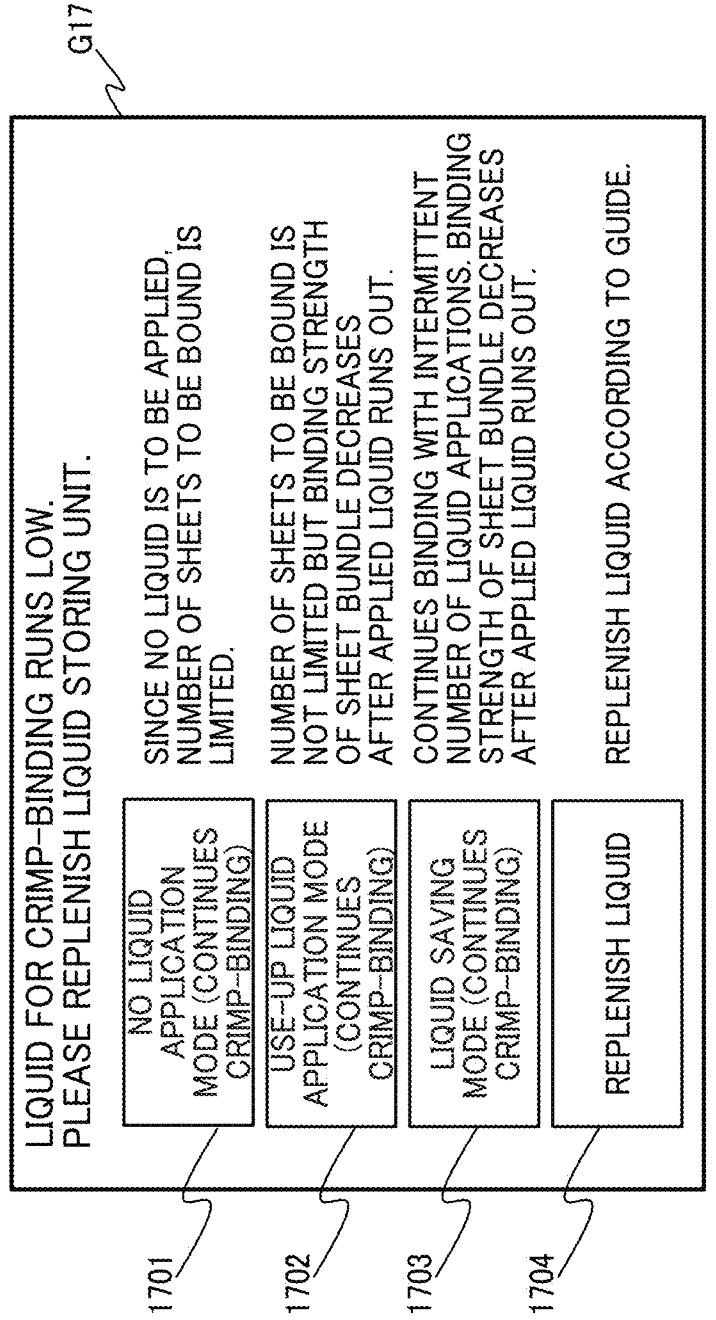
FIG. 21 is a diagram illustrating an example of a mode setting screen according to the present embodiment.

Even when the controller 100*b* determines, in step S1505, that liquid application by the liquid applier 31 can be performed, there may be a case where liquid application is not performed by the liquid applier 31 in accordance with the liquid application operation mode in step S1506. Due to, for example, where a "liquid saving mode 1703" in FIG. 21 is set, in other words, where the number of sheets P on which liquid application is performed is reduced to such an extent that the crimp binding strength is not impaired when the remaining liquid amount is low in the post-processing apparatus 3, when the controller 100*b* determines that the sheet P to be subjected to a binding process is not a sheet P on which liquid application is not to be performed, the controller 100*b* does not perform liquid application by the liquid applier 31.

In S1506, after the controller 100*b* determines that the liquid application by the liquid applier 31 can be performed and the liquid application is then performed by the liquid applier 31, the controller 100*b* determines whether the sheet P to be subjected to the binding process corresponds to the last sheet P of the sheet bundle Pb to be crimped and bound with liquid application (step S1507). When the sheet P to be subjected to the binding process is the final sheet (YES in S1507), the controller 100*b* then compares the "value obtained by subtracting the liquid application counter (after update) from the given number of times of liquid application" with the "maximum number of times of liquid application of the sheet bundle Pb." When the "value obtained by subtracting the liquid application counter (after update) from the given number of times of liquid application" is equal to or less than the maximum number of times of liquid application of the sheet bundle Pb" (YES in S1508), there is the possibility that the liquid storing state in the post-processing apparatus 3 changes to the "no liquid remaining" state during the process on the subsequent sheet bundle Pb.

In this case, assuming that liquid application cannot be performed from a subsequent sheet (subsequent sheet Pa) to be conveyed to the post-processing apparatus 3 after the sheet P to be subjected to the current binding process, the controller 100*b* causes the display 200 or the control panel 110 to output information notifying the user that the "remaining liquid amount is low" in the post-processing apparatus 3 (step S1509) (see FIGS. 21, 22A, and 22B), and ends the flow of the liquid application determination process.

When the sheet P is not the last sheet of the sheet bundle Pb (NO in S1507), the controller 100*b* ends the flow of the liquid application determination process. Alternatively, the controller 100*b* compares the "value obtained by subtracting the liquid application counter (after update) from the given number of times of liquid application" with the "maximum number of times of liquid application of the sheet bundle Pb." When the "value obtained by subtracting the liquid application counter (after update) from the given number of times of liquid application" is greater than the "maximum number of times of liquid application of the sheet bundle Pb" (NO in S1508), the controller 100*b* ends the flow of the liquid application determination process.

A description is given of a display example of the control panel 110, the display 200, or both.

To be more specific, a description is given of an example of a display screen on the control panel 110, the display 200, or both, when liquid application on the subsequent sheet Pa and the sheets following the subsequent sheet Pa is not available, in step S1509.

FIG. 21 is an example of the liquid application operation mode selection screen G17 (serving as a liquid application operation mode selection unit).

On the liquid application operation mode selection screen G17, the selection buttons are displayed so that any of "no liquid application mode 1701", "use-up liquid application mode 1702", "liquid saving mode 1703", and "replenish liquid 1704" is selectable. The control panel 110, the display 200, or both employ a touch-screen display. By so doing, the user can perform a desired selection operation by touching any of these selection buttons.

Selecting the "no liquid application mode 1701" brings the state to be available to execute the crimp binding by the liquid applier 31 without executing liquid application before liquid is replenished (supplied) to the liquid storage unit (e.g., the first liquid storage tank 44, the second liquid storage tank 47, or both). In this case, the number of crimp-bound sheets, in other words, the number of crimp-bound sheet bundles Pb is sometimes limited up to the number of sheets with which the binding strength of the sheet bundles Pb can be obtained even without liquid application.

Selecting the "use-up liquid application mode 1702" causes the state to transit to a state of performing liquid application by the liquid applier 31 regardless of the liquid application counter NL (after update). In the "use-up liquid application mode 1702", the determination in step S1505 is invalidated, the state where liquid can be applied is set in step S1506, and the determination results in steps S1507 and S1508 are invalidated. As a result, the liquid application by the liquid applier 31 after a sheet P conveyed subsequent to the sheet P that is the current determination object (in other words, a subsequent sheet Pa) can be continued.

Selecting the "liquid saving mode 1703" reduces the number of sheets P on which the liquid application is performed by the liquid applier 31, among the multiple sheets P of the sheet bundle Pb, to such an extent that the crimp binding strength is not impaired, as described above. Similar to the "use-up liquid application mode 1702", in addition to performing the liquid application by the liquid applier 31 regardless of the liquid application counter NL (after update), the number of times of the actual liquid application is partially omitted to perform liquid application by the liquid applier 31 even when it is determined that the liquid application by the liquid applier 31 can be performed (step S1506).

In other words, the binding process is continued by reducing the number of times of liquid application by the liquid applier 31.

Selecting the "replenish liquid 1704" causes the control panel 110, the display 200, or both to display the description of the instruction of replenishing (supplying) liquid to the second liquid storage tank 47. As a result, the user can be prompted to replenish (supply) liquid at a suitable time. The description of the method of replenishing liquid (the supplying method of liquid) is expressed using, for example, explanatory sentences, illustrations, and animations. In other words, the description of the method of replenishing liquid can be continuously displayed on the control panel 110, the display 200, or both.

The liquid operation modes that are set in the selection of the "no liquid application mode 1701", the "use-up liquid application mode 1702", and the "liquid saving mode 1703" may be selected, respectively, by the user in advance through a liquid application operation mode setting unit (for example, the control panel 110, the display 200, or both display the liquid application operation mode selection screen G17 illustrated in FIG. 21). When the liquid applier 31 is not available to perform liquid application on the subsequent sheet Pa and the following sheets (step S1509), the liquid application operation mode may automatically transit to a liquid application operation mode that is selected.

Figure 22A:
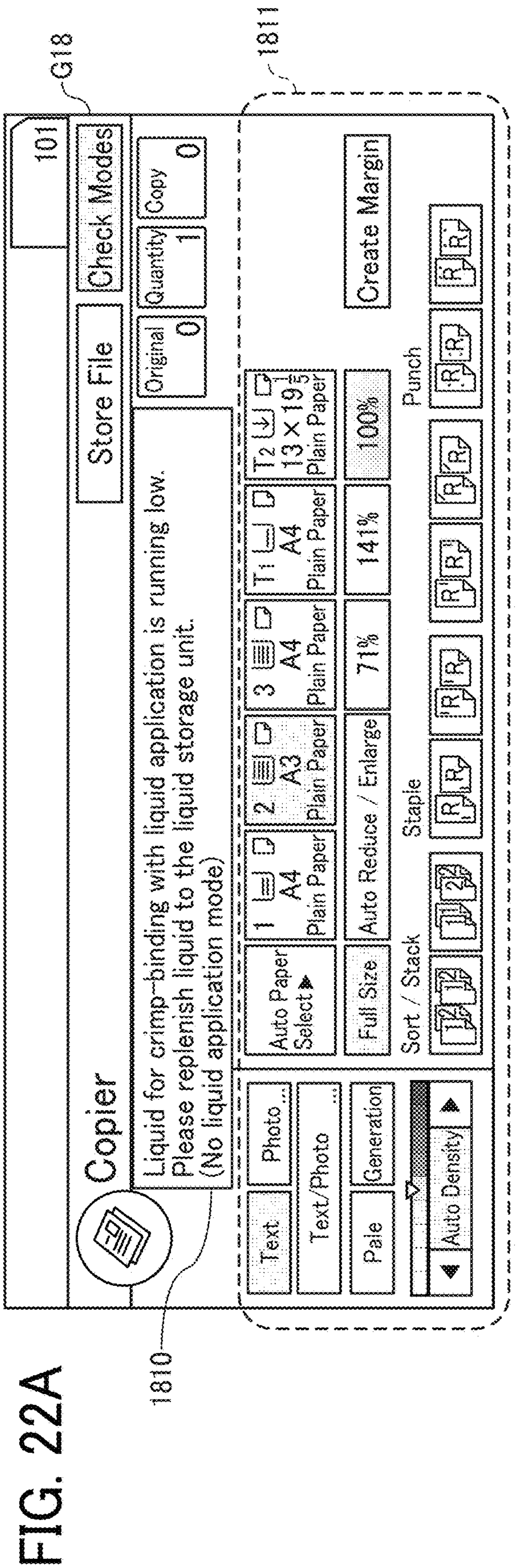
FIGS. 22A and 22B are diagrams each illustrating an example of a job setting screen according to the present embodiment.
Figure 22B:
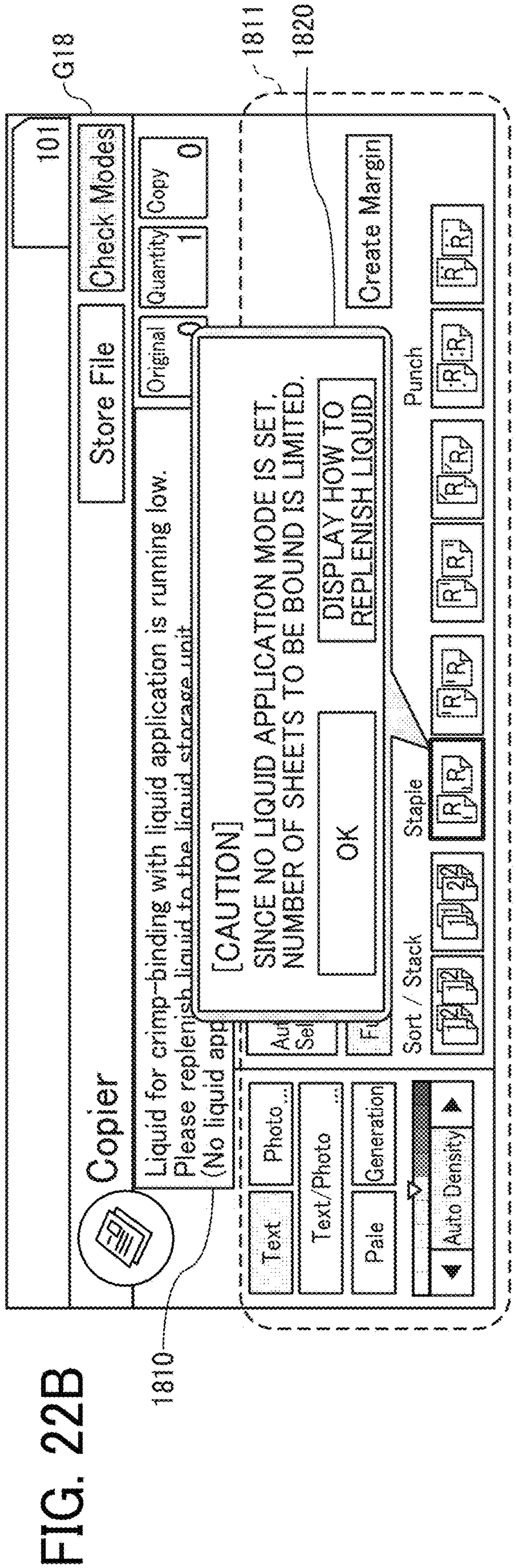

FIGS. 22A and 22B illustrate a job setting screen G18 (as a process mode setting unit) as an example of a setting screen after the "no liquid application mode 1701" is selected on the liquid application operation mode selection screen G17 of FIG. 21 or when the liquid application by the liquid applier 31 on the subsequent sheet Pa and the sheets P after the subsequent sheet Pa is not available with the "no liquid application mode 1701" being set in advance (step S1509).

As illustrated in FIG. 22A, a banner display 1810 on the job setting screen G18 notifies the user that the state where the remaining amount of liquid in the post-processing apparatus 3 is low and the current liquid application operation mode (i.e., the "no liquid application mode 1701"). Similarly, when another liquid application operation mode (for example, the "use-up liquid application mode 1702" or the "liquid saving mode 1703" in FIG. 21) is selected, a message corresponding to each liquid application operation mode notifies the user on the banner display 1810.

FIG. 22B illustrates an example of a case where the user operates the binding mode setting part 1811 on the job setting screen G18 serving as a process mode setting unit to select the crimp binding mode ("Staple" in FIG. 22B).

When the crimp binding is selected during the operation in the "no liquid application mode 1701", a warning message 1820 is displayed on the job setting screen G18 to notify the user that the number of sheets to be bound (the number of sheet bundles Pb) is limited, as illustrated in FIG. 22B. Similarly, when another liquid application operation mode (for example, the "use-up liquid application mode 1702" or the "liquid saving mode 1703" in FIG. 21) is selected, a message corresponding to each liquid application operation mode is displayed as the warning message 1820.

According to the embodiments described above, in the post-processing apparatus 3, even when the liquid storage unit (the first liquid storage tank 44, the second liquid storage tank 47, or both) needs to be replenished with liquid, the liquid application is executable by the liquid applier 31 for a certain number of times. As a result, the downtime of the binding operation with the liquid application is reduced and the convenience for the user can be enhanced.

As described above, the control instruction by the controller 100*b* described above is implemented by cooperation between hardware resources of a computer and a program as computer software. In other words, the control instruction may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

Figure 32A:
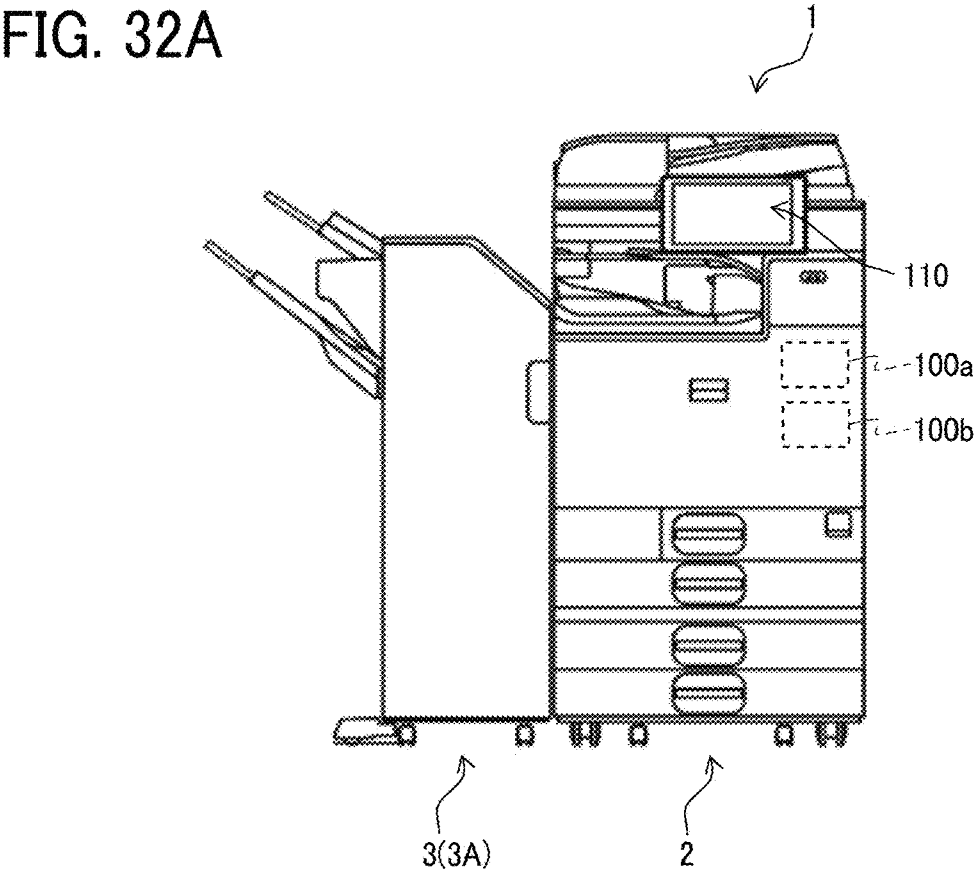
FIGS. 32A and 32B are diagrams each illustrating a post-processing apparatus including controllers as a first modification of the present embodiment.
Figure 32B:
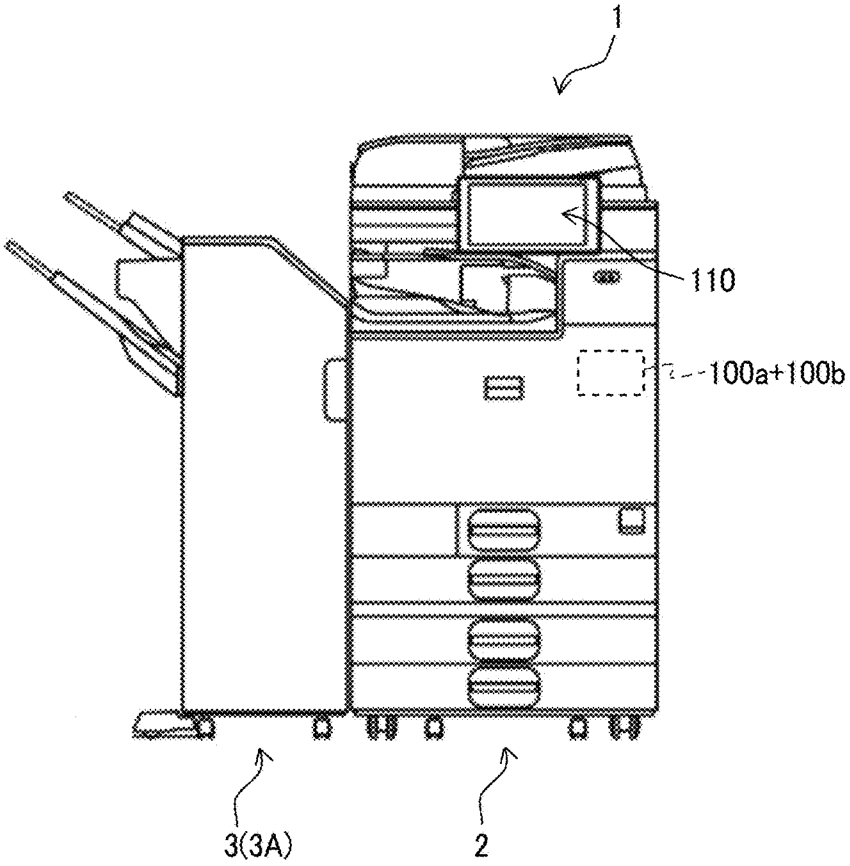

In the above description, the controller 100*b* of the post-processing apparatus 3 is provided separately from the controller 100*a* of the image forming apparatus 2 as illustrated in FIG. 1. However, embodiments of the present disclosure are not limited to the above-described configuration. For example, as illustrated in FIG. 32A, the controller 100*b* of the post-processing apparatus 3 may be disposed in the image forming apparatus 2. Further, as illustrated in FIG. 32B, the controller 100*b* of the post-processing apparatus 3 may be integrated with the controller 100*a* of the image forming apparatus 2.

Figure 33A:
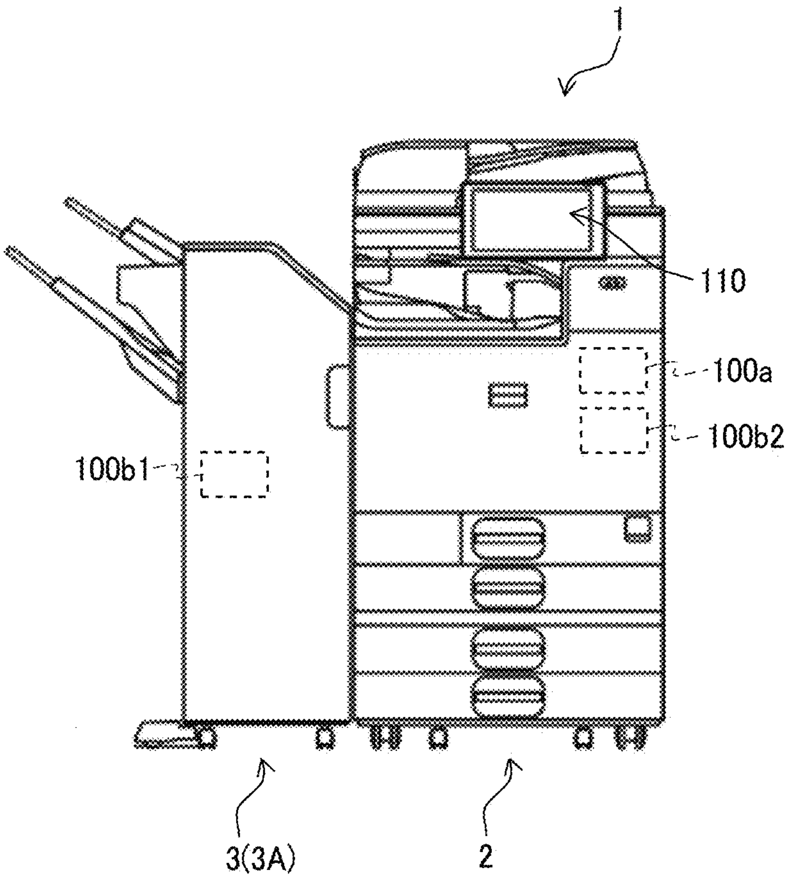
FIGS. 33A and 33B are diagrams each illustrating a post-processing apparatus including controllers as a second modification of the present embodiment.
Figure 33B:
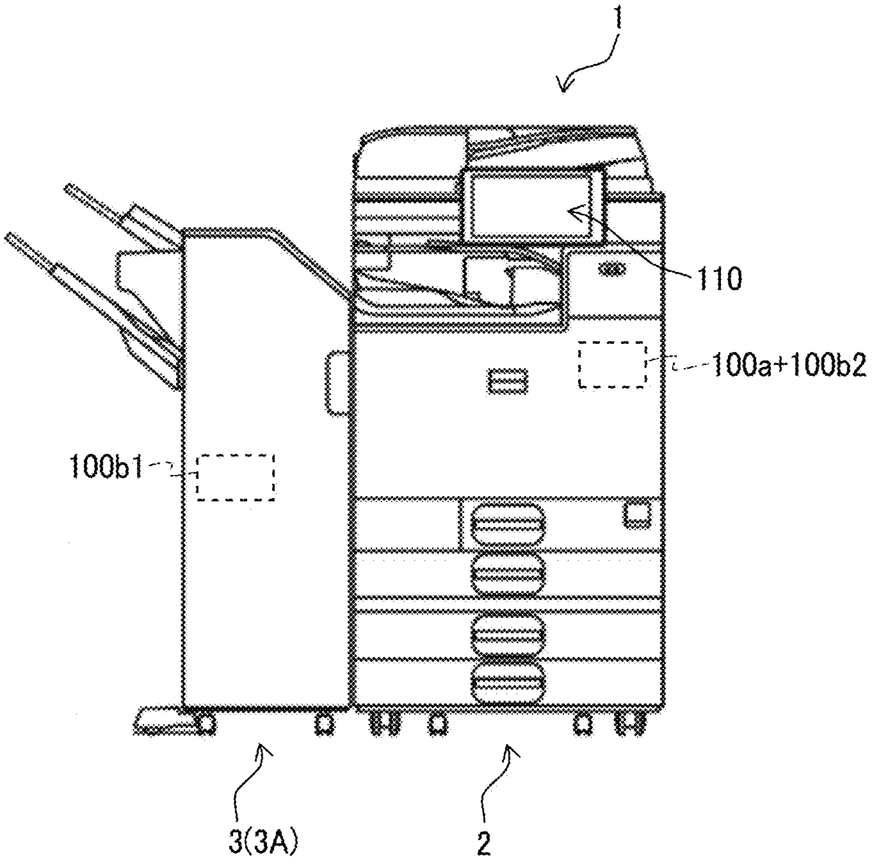

As illustrated in FIG. 33A, the controller 100*b* of the post-processing apparatus 3 may be divided into a controller 100*b*1 (e.g., a drive unit such as a motor) and a controller 100*b*2 (a detector such as a sensor) according to the function, and the controller 100*b*2 of the post-processing apparatus 3 may be disposed in the image forming apparatus 2. Further, as illustrated in FIG. 33B, the controller 100*b*2 of the post-processing apparatus 3 disposed in the image forming apparatus 2 may be integrated with the controller 100*a* of the image forming apparatus 2.

A description is given of the post-processing apparatus 3 according to another embodiment of the present disclosure.

Referring now to FIGS. 23 to 31, a description is given of a post-processing apparatus 3A according to another embodiment of the present disclosure.

In the following description, components like those of the above-described post-processing apparatus 3 are denoted by like reference numerals, and detailed descriptions thereof may be omitted.

The post-processing apparatus 3A according to another embodiment includes an edge binder 251. The edge binder 251 is different from the edge binder 25 of the post-processing apparatus 3 according to the first embodiment, in which the liquid applier 31 and the crimper 32 are arranged side by side, in that the edge binder 251 includes a crimper 32' and a liquid applier 131 is disposed at an upstream position of a conveyance passage in a direction in which a sheet P is conveyed. Such a configuration allows a given number of sheets P to be stacked after the liquid application process and conveyed to the crimper 32' of the edge binder 251 disposed at a downstream position of the conveyance passage in the direction in which the sheet P is conveyed. Accordingly, the productivity of the binding process performed by the crimper 32' is enhanced.

Since the direction in which the conveyance roller pairs 10, 11, and 14 convey the sheet P is opposite to the "conveyance direction" defined above, the direction in which the conveyance roller pairs 10, 11, and 14 convey the sheet P is defined as an "opposite conveyance direction" in the following description. A direction that is orthogonal to both the opposite conveyance direction and the thickness direction of the sheet P is defined as the "main scanning direction" or the "width direction of the sheet P." The liquid application position to which liquid is applied on a sheet P or a sheet bundle Pb by the liquid applier 31 corresponds to the binding position on the sheet bundle Pb to be crimped by the crimper 32'. For this reason, in the following description, the liquid application position and the binding position are denoted by the same reference sign (B1).

Figure 23:
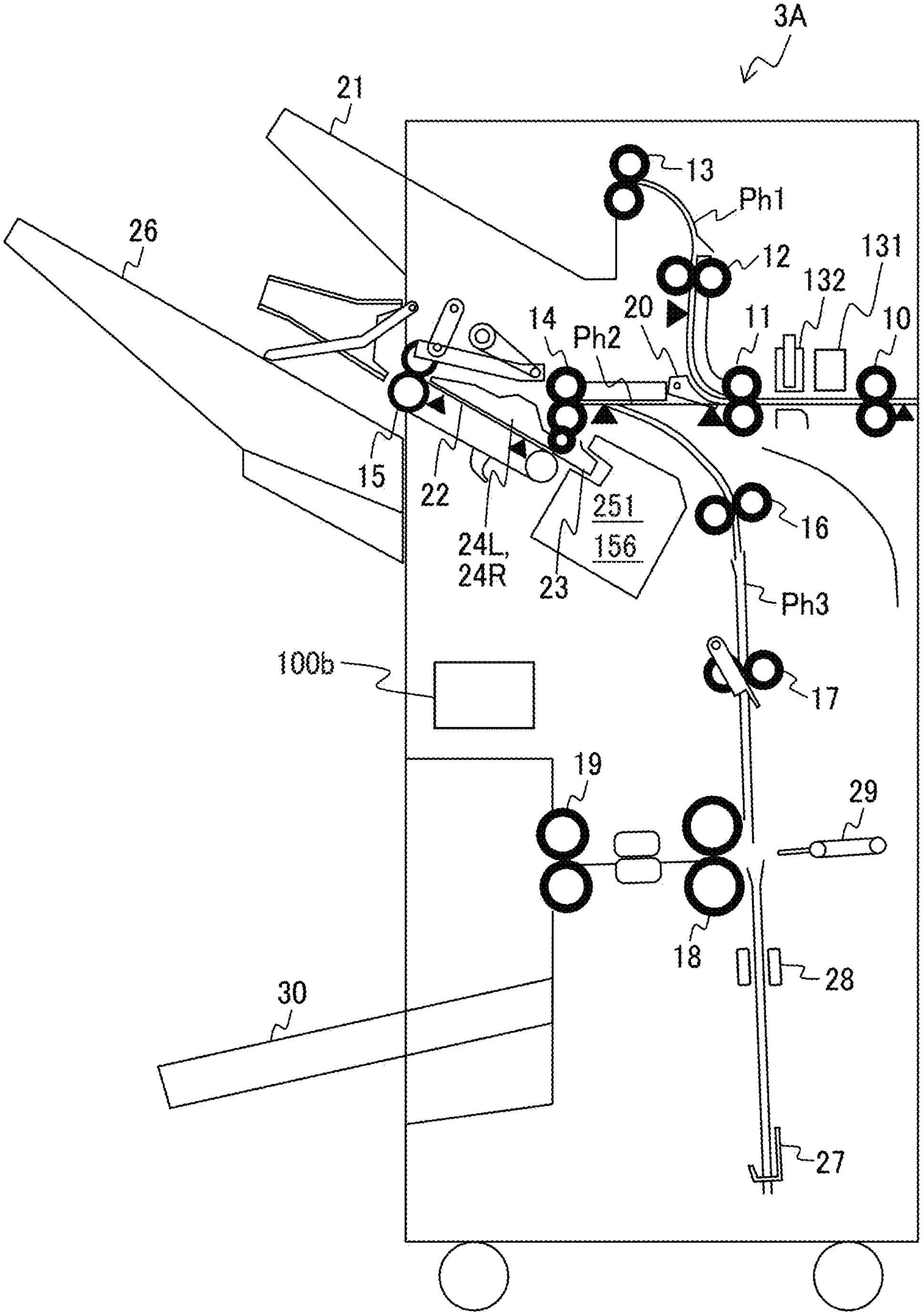
FIG. 23 is a diagram illustrating the internal configuration of a post-processing apparatus according to another embodiment of the present disclosure.

FIG. 23 is a diagram illustrating an internal configuration of the post-processing apparatus 3A according to another embodiment of the present disclosure.

Figure 24A:
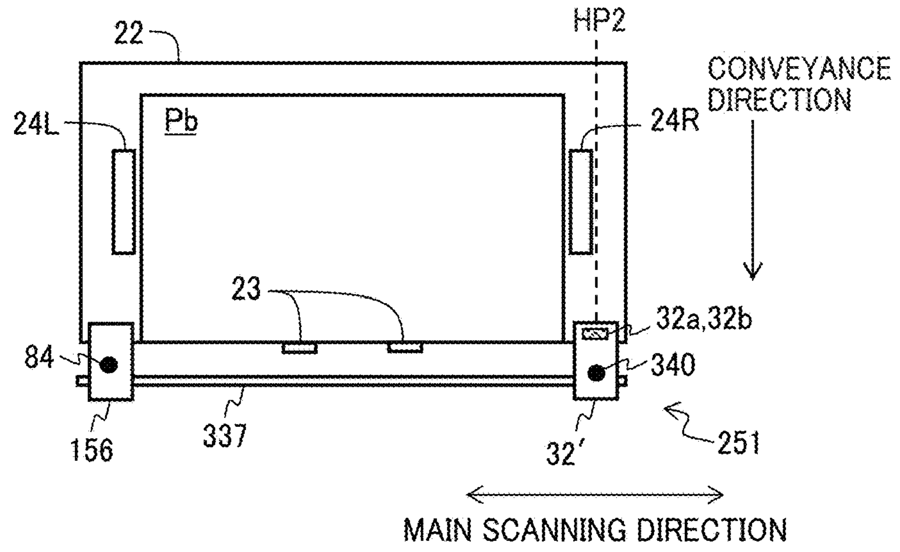
FIGS. 24A, 24B, and 24C are diagrams each illustrating an internal tray of the post-processing apparatus according to another embodiment, viewed from a thickness direction of a sheet.
Figure 24B:
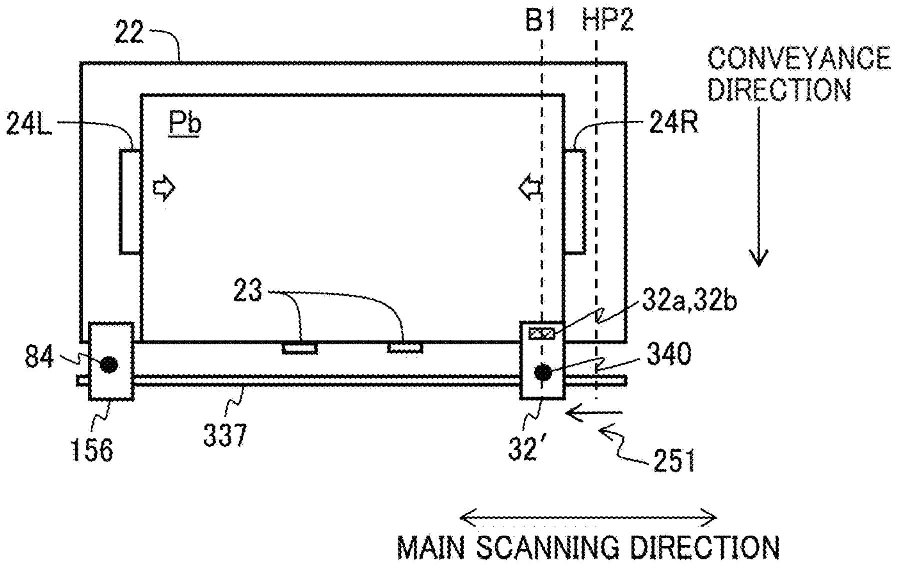
Figure 24C:
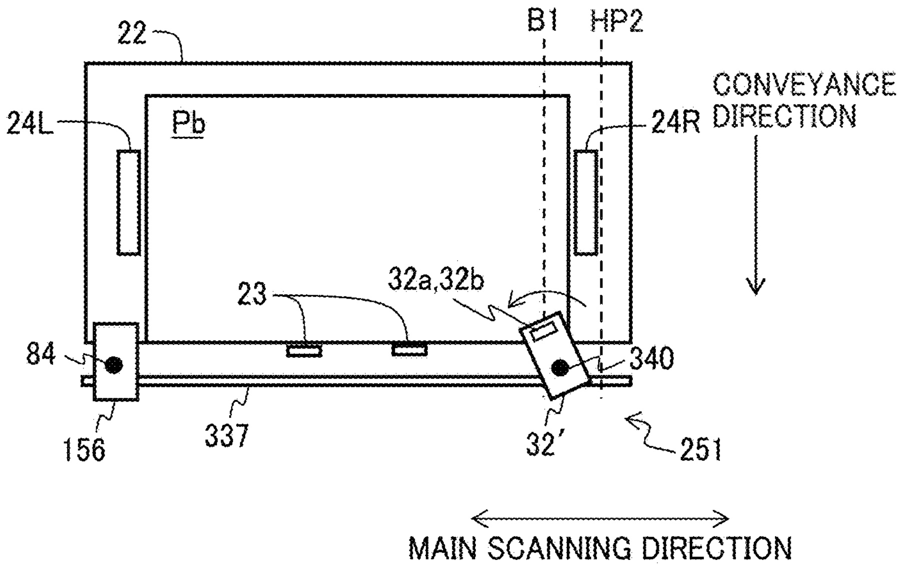

As illustrated in FIGS. 24A, 24B, and 24C, the edge binder 251 includes the crimper 32' alone. As illustrated in FIG. 24, the crimper 32' and the staple binder 156 are disposed downstream from the internal tray 22 in the conveyance direction. In addition, the crimper 32' and the staple binder 156 are located to face a downstream end, in the conveyance direction, of the sheet bundle Pb placed on the internal tray 22 and is movable in the main scanning direction. Further, the crimper 32' and the staple binder 156 are respectively rotatable in the forward and reverse directions about a crimper shaft 340 and a stapler shaft 84 both extending in the thickness direction of the sheet bundle Pb placed on the internal tray 22. In other words, the crimper 32' and the staple binder 156 bind, at a desired angle, a desired position in the main scanning direction on the sheet bundle Pb placed on the internal tray 22 in, for example, corner oblique binding, parallel one-point binding, or parallel two-point binding.

The crimper 32' presses and deforms the sheet bundle Pb with the serrate upper crimping teeth 32*a* and the serrate lower crimping teeth 32*b* to bind the sheet bundle Pb. In the following description, such a binding way may be referred to as "crimping." In other words, the crimper 32' crimps and binds the sheet bundle Pb or performs the crimping on the sheet bundle Pb. On the other hand, the staple binder 156 passes the staple through a binding position on the sheet bundle Pb placed on the internal tray 22 to staple the sheet bundle Pb.

FIGS. 24A, 24B, and 24C are diagrams each illustrating the internal tray 22 of the post-processing apparatus as viewed from the thickness direction of the sheet bundle Pb.

Figure 25:
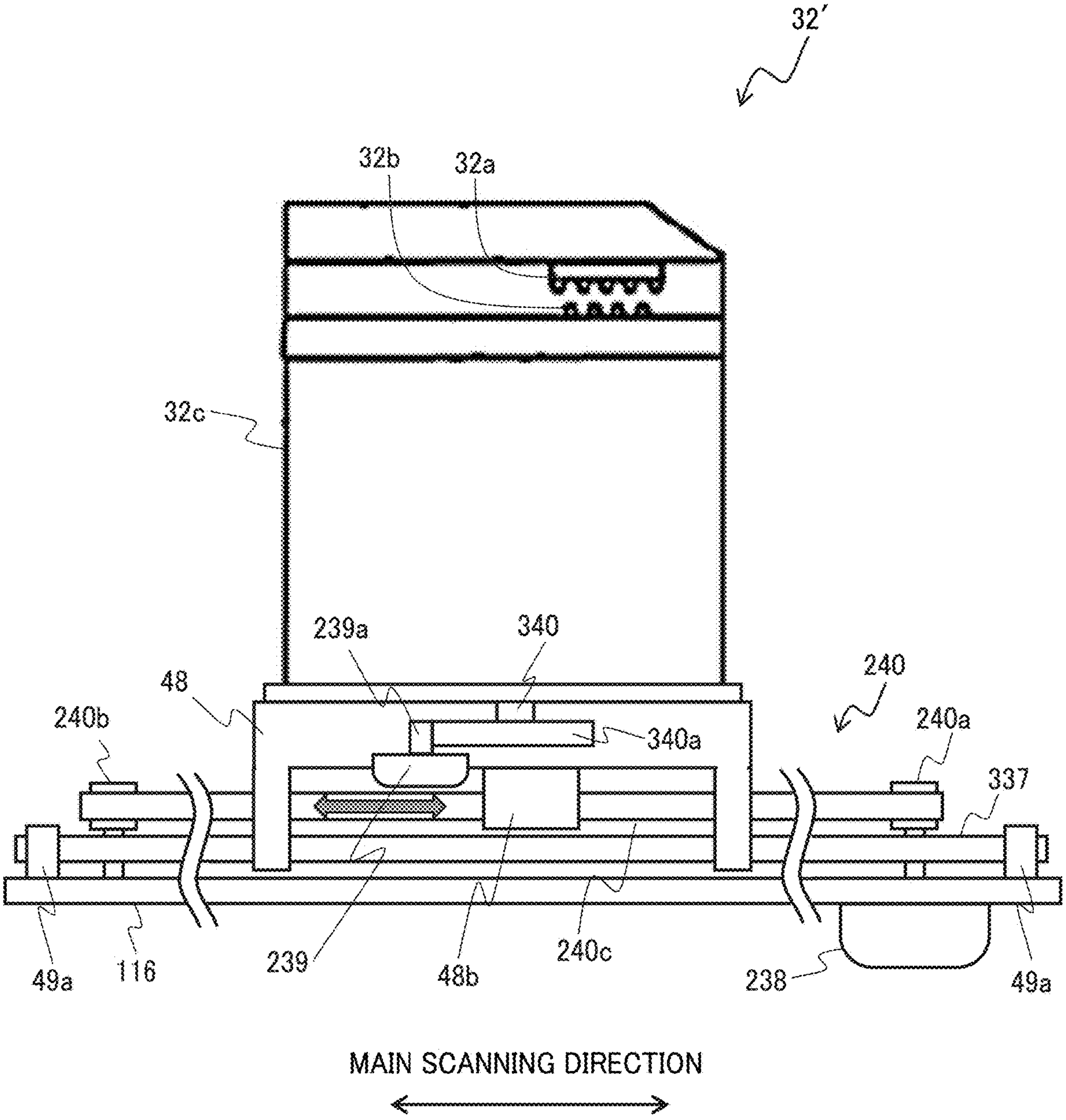
FIG. 25 is a schematic diagram illustrating a downstream side of the crimper of the post-processing apparatus according to another embodiment in the conveyance direction.

FIG. 25 is a schematic diagram illustrating the crimper 32' as viewed from the downstream side in the conveyance direction.

As illustrated in FIGS. 24A, 24B, and 24C, the crimper 32' and the staple binder 156 are disposed downstream from the internal tray 22 in the conveyance direction. The crimper 32' is movable in the main scanning direction along the surface of the sheet bundle Pb placed on the internal tray 22. Further, the crimper 32' is rotatable in the forward and reverse directions about a crimper shaft 340 extending in the thickness direction of the sheet bundle Pb placed on the internal tray 22. Similarly, the staple binder 156 is movable in the main scanning direction of the sheet bundle Pb. Further, the staple binder 156 is rotatable in the forward and reverse directions about a stapler shaft 84 extending in thickness direction of the sheet bundle Pb. The other components of the staple binder 156 are similar to, even if not the same as, those of the staple binder 155 (see FIG. 6) of the post-processing apparatus 3 according to the first embodiment. For this reason, a detailed description thereof is omitted.

As illustrated in FIG. 25, the crimper 32' includes a guide rail 337 extending in the main scanning direction at a position downstream from the internal tray 22 in the conveyance direction. The crimper 32' includes a crimper movement motor 238 as a driving source. The base 48 supporting the crimping frame 32*c* has a fastening portion 48*b* for fastening the timing belt 240*c* at the bottom of the base 48. The driving force of the crimper movement motor 238 is transmitted to the base 48 by the drive transmission assembly 240 that includes the pullies 240*a* and 240*b*, the timing belt 240*c*, and the fastening portion 48*b*. By so doing, the crimper 32' is moved in the main scanning direction along the surface of the sheet bundle Pb placed on the internal tray 22, in other words, along the guide rail 337. A crimper shaft 340 including a drive transmission gear 340*a* is fixed to a bottom face of the crimping frame 32*c* that holds the components of the crimper 32. The crimper shaft 340 and the drive transmission gear 340*a* are held by the base 48 on which the crimping frame 32*c* is disposed, so as to be rotatable in the forward and reverse directions. The drive transmission gear 340*a* meshes with an output gear 239*a* of a crimper pivot motor 239. When the driving force of the crimper pivot motor 239 is transmitted to the crimper shaft 340 via the output gear 239*a* and the drive transmission gear 340*a*, the crimper 32' rotates in the forward and reverse directions on the base 48 about the crimper shaft 340 extending in the thickness direction of the sheet P placed on the internal tray 22. The guide rail 337, the crimper movement motor 238, the crimper pivot motor 239, the crimper shaft 340, and the drive transmission assembly 240 constitute at least part of a driving assembly of the crimper 32' according to the present embodiment.

The crimper 32' is movable between a standby position HP2 illustrated in FIG. 24A and a position where the crimper 32' faces the first binding position B1 illustrated in FIGS. 24B and 24C. The standby position HP2 is away in the main scanning direction from the sheet bundle Pb placed on the internal tray 22. For example, in FIGS. 21A to 21C, the standby position HP is distanced to the right of the sheet bundle Pb along the main scanning direction. The binding position B1 is a position on the sheet bundle Pb placed on the internal tray 22. However, the specific position of the binding position B1 is not limited to the position illustrated in FIGS. 24B and 24C. The binding position B1 may be one or more positions along the main scanning direction at the downstream end, in the conveyance direction, of the sheet P.

The posture of the crimper 32' changes or is pivoted between a parallel binding posture illustrated in FIG. 24B and an oblique binding posture illustrated in FIG. 24C. In other words, the crimper 32' is rotatable in the forward and reverse directions about the crimper shaft 340. The parallel binding posture is a posture of the crimper 32' in which the longitudinal direction of the upper crimping teeth 32*a* and the lower crimping teeth 32*b* (in other words, a rectangular crimp binding trace) is along the main scanning direction. The oblique binding posture is a posture of the crimper 32' in which the longitudinal direction of the upper crimping teeth 32*a* and the lower crimping teeth 32*b* (i.e., the rectangular crimp binding trace) is inclined with respect to the main scanning direction.

The rotational angle, which is an angle of the upper crimping teeth 32*a* and the lower crimping teeth 32*b* with respect to the main scanning direction, in the oblique binding posture is not limited to the angle illustrated in FIG. 24C. The rotational angle in the oblique binding posture may be any angle provided that the upper crimping teeth 32*a* and the lower crimping teeth 32*b* face the sheet bundle Pb placed on the internal tray 22.

The post-processing apparatus 3A includes the liquid applier 131 and a hole punch 132 serving as a processor. The liquid applier 131 and the hole punch 132 are disposed upstream from the internal tray 22 in the opposite conveyance direction. In addition, the liquid applier 131 and the hole punch 132 are disposed at different positions in the opposite conveyance direction to simultaneously face one sheet P that is conveyed by the conveyance roller pairs 10 to 19.

Figure 31:
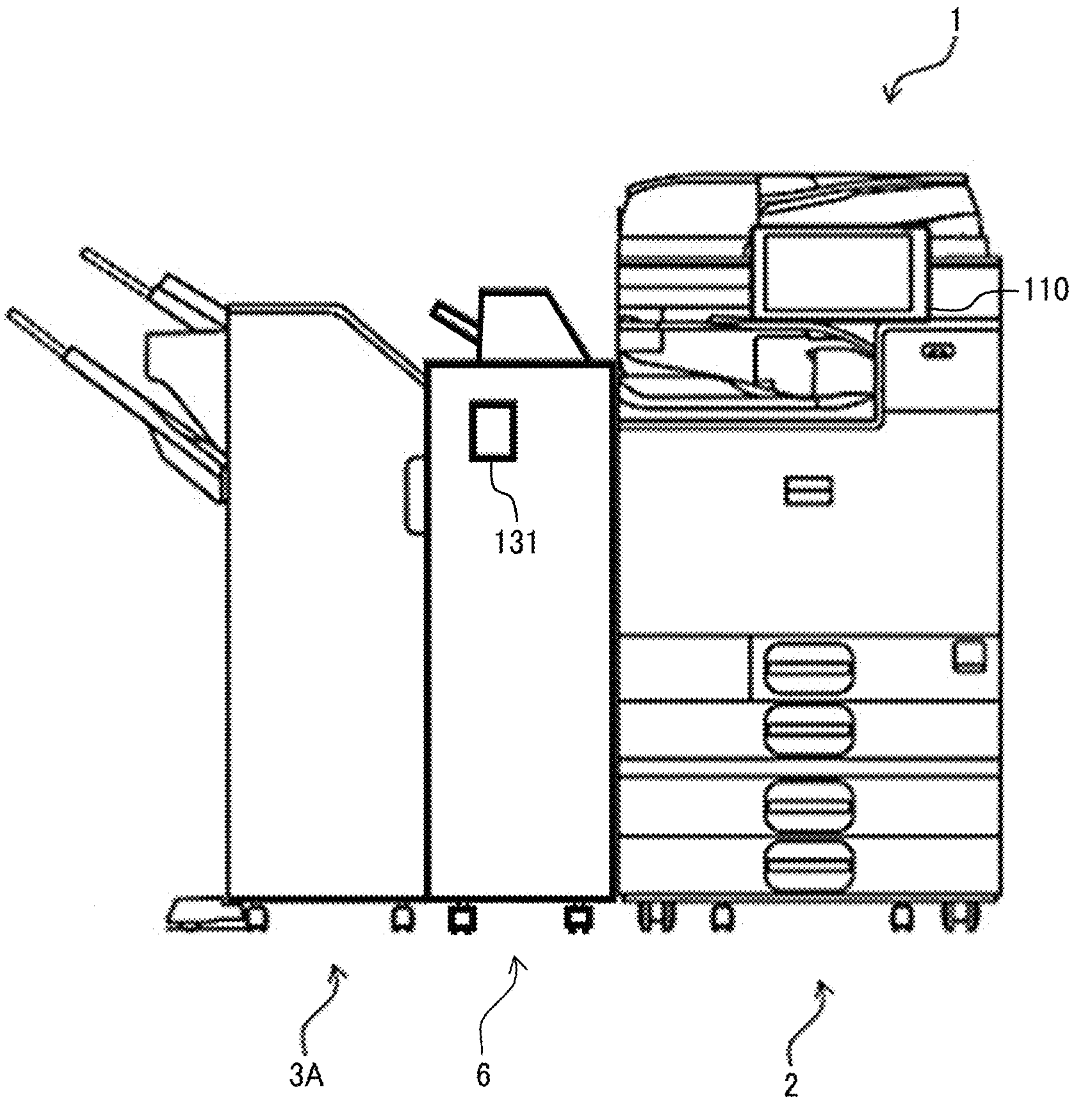
FIG. 31 is a diagram illustrating an overall configuration of an image forming system according to a modification of the present embodiment.

The liquid applier 131 and the hole punch 132 according to the present embodiment are disposed between the conveyance roller pairs 10 and 11. However, the arrangement of the liquid applier 131 is not limited to the example of FIG. 23. For example, in a case where an inserter 6 is disposed between the image forming apparatus 2 and the post-processing apparatus 3A as illustrated in FIG. 31, the liquid applier 131 may be disposed inside the inserter 6 located upstream from the post-processing apparatus 3A in a direction in which the sheet P is conveyed from the image forming apparatus 2 to the post-processing apparatus 3A. Examples of the inserter 6 include, but are not limited to, an apparatus that allows a pre-printed medium, which is to be conveyed to the post-processing apparatus 3A together with the sheet P conveyed from the image forming apparatus 2, to be fed as a cover sheet, an insertion sheet, or a partition sheet without passing through the image forming apparatus 2.

Figure 26A:
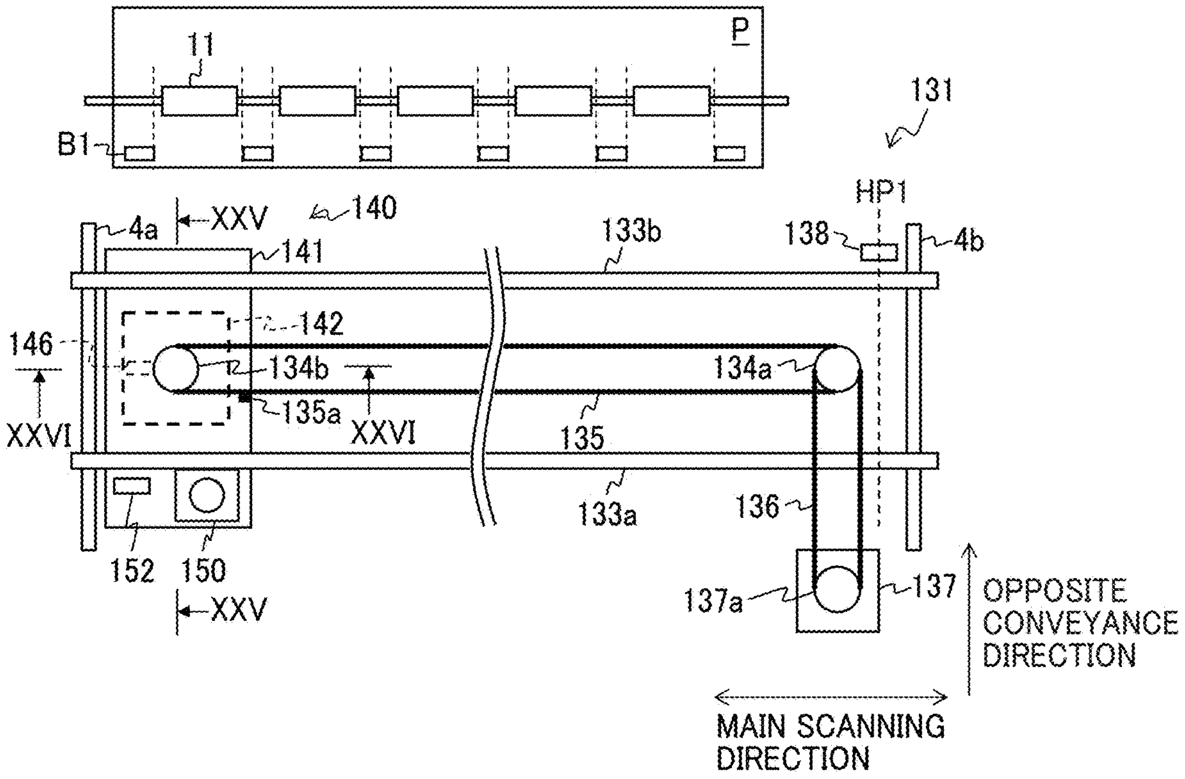
FIGS. 26A and 26B are diagrams each illustrating the liquid applier of the post-processing apparatus according to another embodiment of the present disclosure, viewed from the thickness direction of the sheet.

As illustrated in FIG. 26A, the conveyance roller pair 11 is located so as not to overlap, in the main scanning direction, the first liquid application position B1 on the sheet P to which the liquid has been applied by a liquid application head 146 of the liquid applier 131. This arrangement is to prevent the amount of liquid at the liquid application position B1 from decreasing due to the multiple roller pairs pressing the liquid application position B1 when the conveyance roller pair 11 conveys the sheet P. As a result, when the sheet P reaches the crimper 32' disposed downstream from the liquid applier 131 in the opposite conveyance direction, the amount of liquid at the liquid application position B1 is sufficient to maintain the binding strength. Accordingly, the binding strength of the sheet bundle Pb is prevented from decreasing due to a decrease in the amount of liquid at the liquid application position B1 (corresponding to the binding position B1) while the sheet P is conveyed.

In addition, the multiple roller pairs of the conveyance roller pair 11 that is located so as not to overlap the liquid application position B1 on the sheet P in the main scanning direction prevents the conveying performance of the sheet P from being worse due to the adhesion of liquid to the multiple roller pairs and further prevents a conveyance jam caused by the worsened conveying performance of the sheet P.

Although only the conveyance roller pair 11 has been described above, the multiple roller pairs of the conveyance roller pairs 14 and 15 are preferably located so as not to overlap the liquid application position B1 on the sheet P in the main scanning direction, like the multiple roller pairs of the conveyance roller pair 11.

The liquid applier 131 applies liquid to the sheet P that is conveyed by the conveyance roller pairs 10 and 11. In the following description, the application of liquid may be referred to as "liquid application." The hole punch 132 punches a hole in the sheet P that is conveyed by the conveyance roller pairs 10 and 11 such that the hole penetrates the sheet P in the thickness direction of the sheet P. The processor disposed near the liquid applier 131 is not limited to the hole punch 132. Alternatively, the processor may be an inclination corrector that corrects an inclination or skew of the sheet P that is conveyed by the conveyance roller pairs 10 and 11.

Figure 26B:
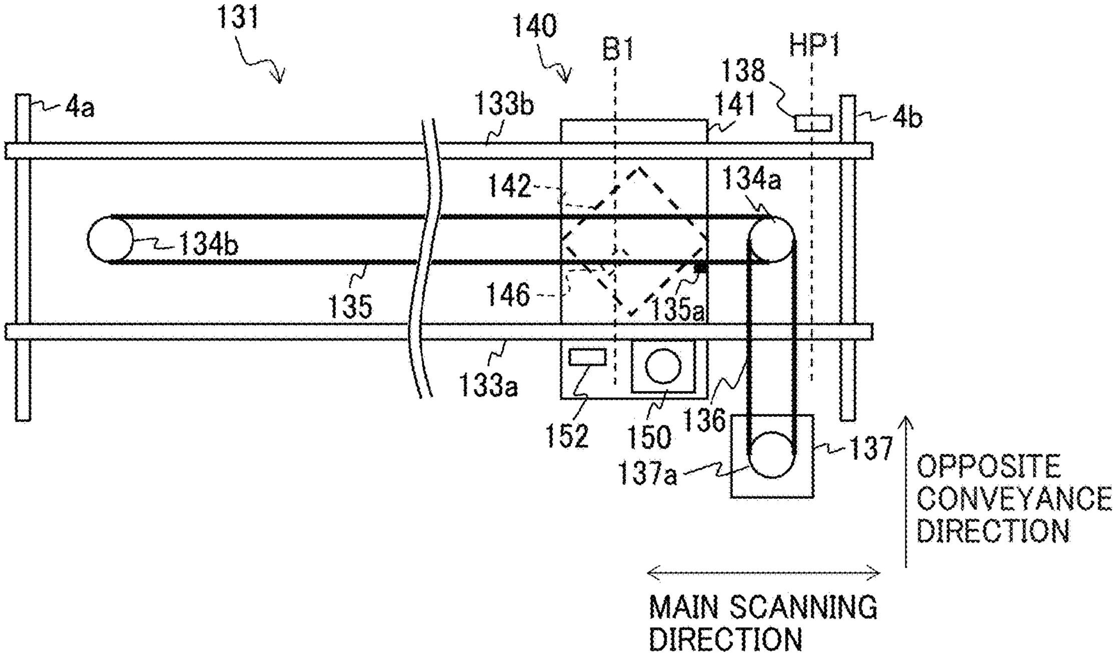

FIGS. 26A and 26B are schematic views of the liquid applier 131 in the thickness direction of the sheet P, according to another embodiment of the present disclosure.

Figure 27A:
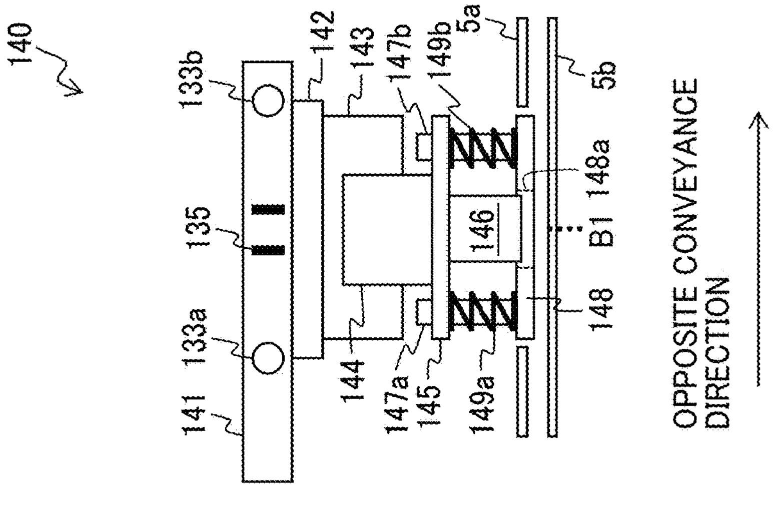
FIGS. 27A, 27B, and 27C are cross-sectional views of a liquid application unit of the liquid applier taken through XXV-XXV of FIG. 26A.
Figure 27B:
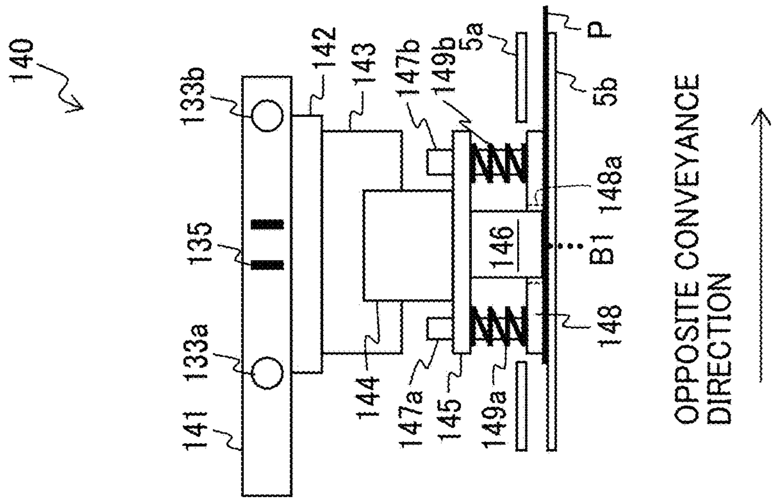
Figure 27C:
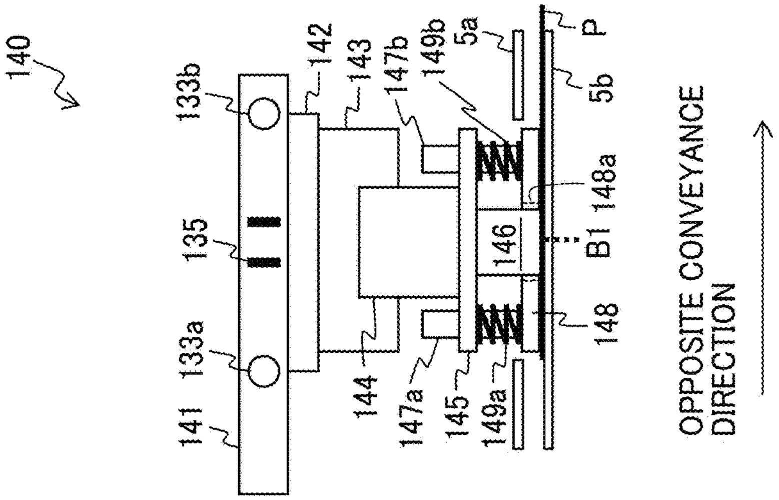

FIGS. 27A to 27C are cross-sectional views of a liquid application unit 140 of the liquid applier 131 taken through XXV-XXV of FIG. 26A.

Figure 28A:
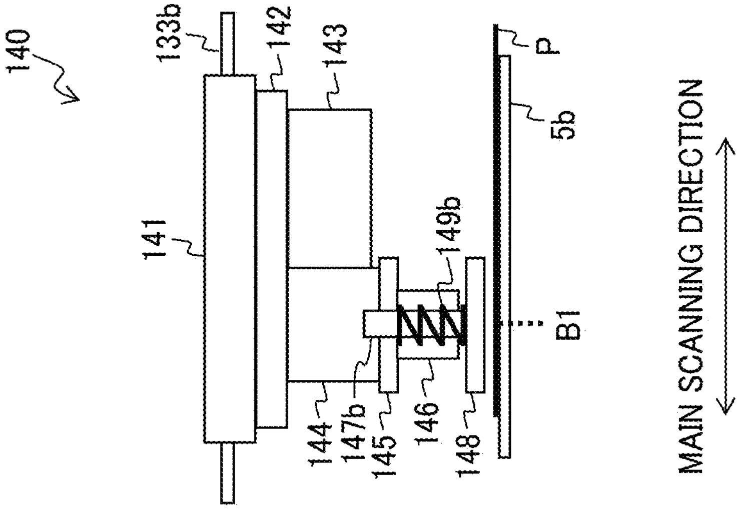
FIGS. 28A, 28B, and 28C are cross-sectional views of the liquid application unit of the liquid applier taken through XXVI-XXVI of FIG. 26A.
Figure 28B:
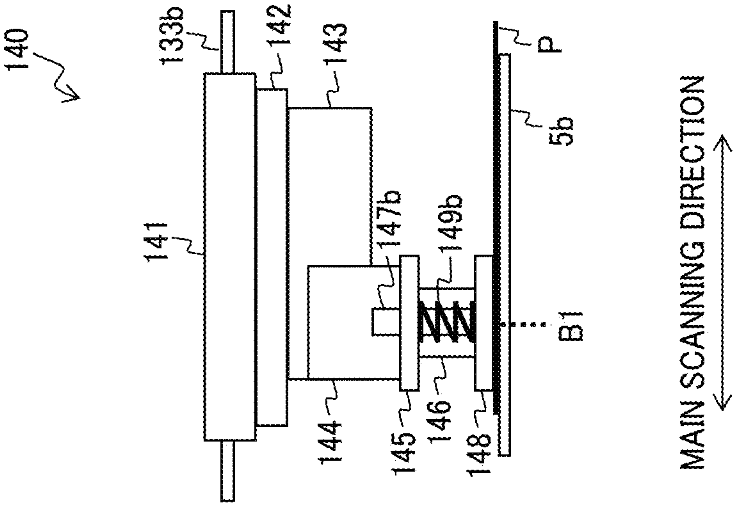
Figure 28C:
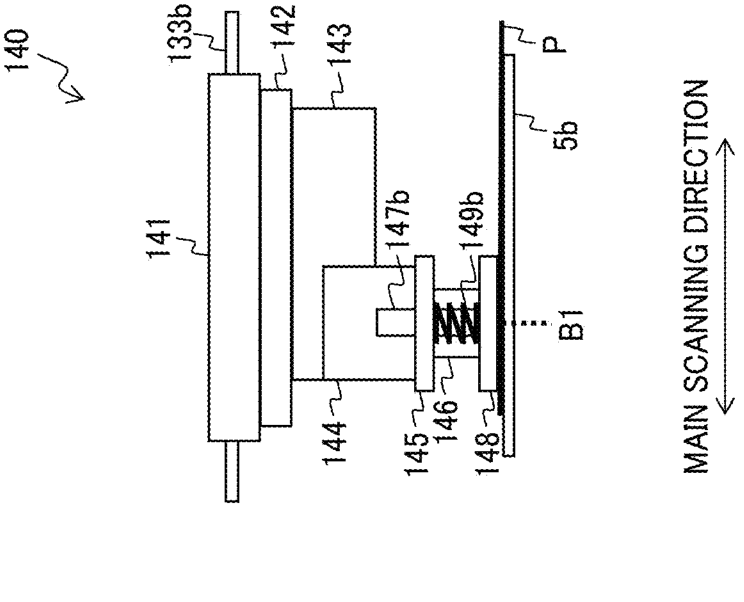

FIGS. 28A, 28B, and 28C are cross-sectional views of the liquid application unit 140 of the liquid applier 131 taken through XXVI-XXVI of FIG. 26A.

As illustrated in FIGS. 26A to 28C, the liquid applier 131 includes a pair of guide shafts 133*a* and 133*b*, a pair of pulleys 134*a* and 134*b*, endless annular belts 135 and 136, a liquid applier movement motor 137, a standby position sensor 138 (see FIG. 29), and a liquid application unit 140.

The guide shafts 133*a* and 133*b*, each extending in the main scanning direction, are spaced apart from each other in the opposite conveyance direction. The pair of guide shafts 133*a* and 133*b* are supported by a pair of side plates 4*a* and 4*b* of the post-processing apparatus 3A. The pair of guide shafts 133*a* and 133*b* support the liquid application unit 140 such that the liquid application unit 140 can move in the main scanning direction.

The pair of pulleys 134*a* and 134*b* is disposed between the pair of guide shafts 133*a* and 133*b* in the opposite conveyance direction. The pair of pulleys 134*a* and 134*b* are spaced apart from each other in the main scanning direction. The pair of pulleys 134*a* and 134*b* are supported by a frame of the post-processing apparatus 3A so as to be rotatable in the forward and reverse directions about the respective shafts extending in the thickness direction of the sheet P.

The endless annular belt 135 is looped around the pair of pulleys 134*a* and 134*b*. The endless annular belt 135 is coupled to the liquid application unit 140 by a connection 135*a*. The endless annular belt 136 is entrained around the pulley 134*a* and a driving pulley 137*a* that is fixed to an output shaft of the liquid applier movement motor 137. The liquid applier movement motor 137 generates a driving force to move the liquid application unit 140 in the main scanning direction.

As the liquid applier movement motor 137 rotates, the endless annular belt 136 circulates around the pulley 134*a* and the driving pulley 137*a* to rotate the pulley 134*a*. As the pulley 134*a* rotates, the endless annular belt 135 circulates around the pair of pulleys 134*a* and 134*b*. As a result, the liquid application unit 140 moves in the main scanning direction along the pair of guide shafts 133*a* and 133*b*. The liquid application unit 140 reciprocates in the main scanning direction in response to switching of the rotation direction of the liquid applier movement motor 137.

The standby position sensor 138 detects that the liquid application unit 140 has reached a standby position HP1 (see FIGS. 26A and 26B) in the main scanning direction. The standby position sensor 138 then outputs a standby position signal indicating the detection result to the controller 100*b*, which will be described below with reference to FIG. 29. The standby position sensor 138 is, for example, an optical sensor including a light emitter and a light receiver. The liquid application unit 140 at the standby position blocks an optical path between the light emitter and the light receiver. The standby position sensor 138 outputs the standby position signal in response to the light output from the light emitter not being received by the light receiver. The specific configuration of the standby position sensor 138 is not limited to the configuration described above.

As illustrated in FIGS. 27A to 27C, the conveyance passage inside the post-processing apparatus 3A is defined by an upper guide plate 5*a* and a lower guide plate 5*b*, which are apart from each other in the thickness direction of the sheet P. The liquid application unit 140 is located to face an opening of the upper guide plate 5*a*. In other words, the liquid application unit 140 is disposed to face the conveyance passage (a position at which the liquid application unit 140 is to face the sheet P conveyed along the conveyance passage) through the opening of the upper guide plate 5*a*.

Figure 29:
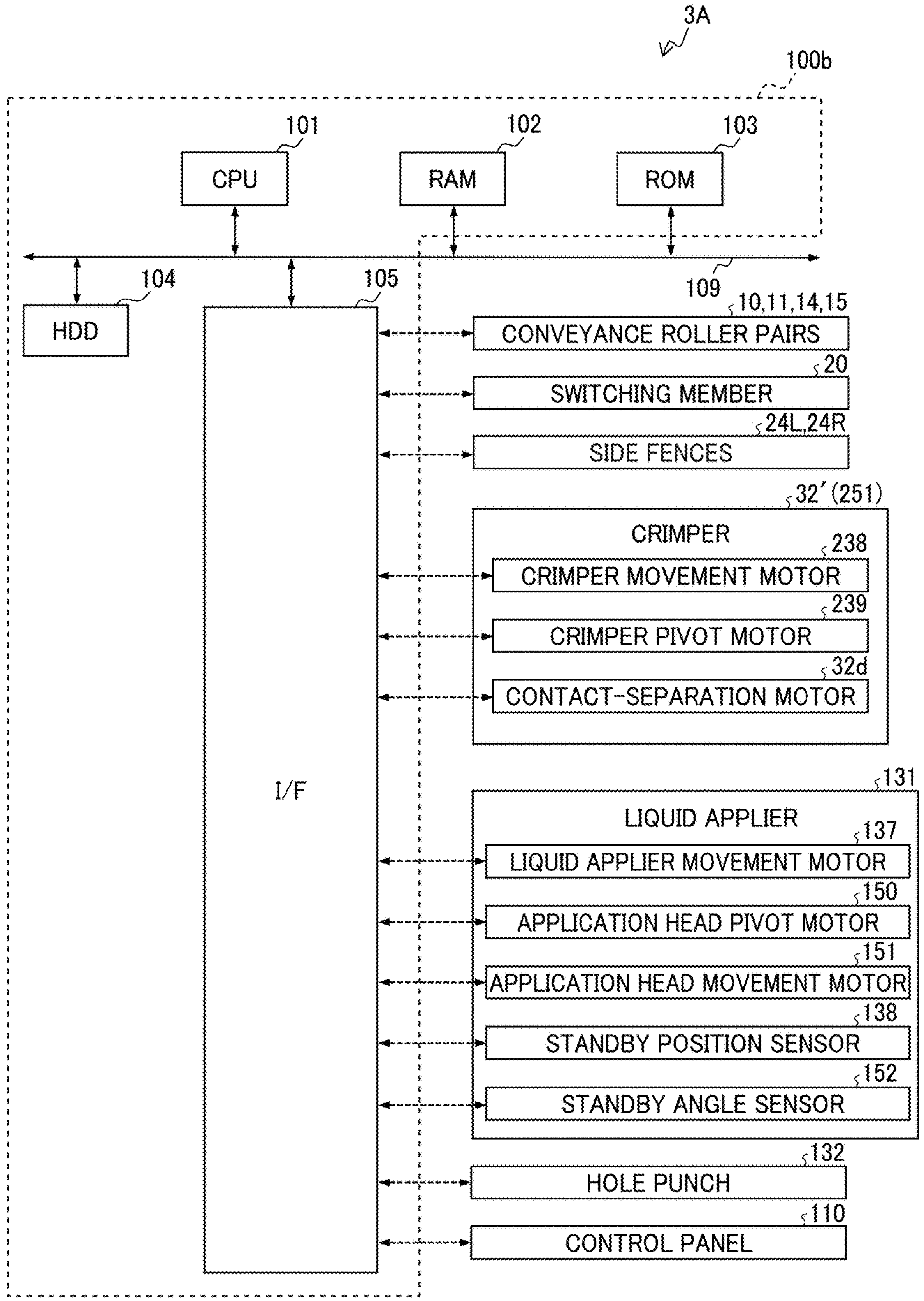
FIG. 29 is a control block diagram illustrating a hardware configuration of the post-processing apparatus according to another embodiment to control the operation of the post-processing apparatus.

As illustrated in FIGS. 26A to 28C, the liquid application unit 140 includes a base 141, a rotary bracket 142, a liquid storage tank 143, an application head mover 144, a holder 145, the liquid application head 146, columns 147*a* and 147*b*, a pressure plate 148, coil springs 149*a* and 149*b*, the application head pivot motor 150, the application head movement motor 151 (see FIG. 29), and a standby angle sensor 152 (see FIG. 29).

The base 141 is supported by the pair of guide shafts 133*a* and 133*b* so as to be slidable in the main scanning direction. The base 141 is coupled to the endless annular belt 135 by the connection 135*a*. The base 141 supports the components of the liquid application unit 140 such as the rotary bracket 142, the liquid storage tank 143, the application head mover 144, the holder 145, the liquid application head 146, the columns 147*a* and 147*b*, the pressure plate 148, the coil springs 149*a* and 149*b*, the application head pivot motor 150, the application head movement motor 151, and the standby angle sensor 152.

The rotary bracket 142 is attached to the lower face of the base 141 so as to be rotatable in the forward and reverse directions about an axis extending in the thickness direction of the sheet P. The rotary bracket 142 is rotated with respect to the base 141 by a driving force transmitted from the application head pivot motor 150. The rotary bracket 142 retains the liquid storage tank 143, the application head mover 144, the holder 145, the liquid application head 146, the columns 147*a* and 147*b*, the pressure plate 148, and the coil springs 149*a* and 149*b*.

The standby angle sensor 152, which is also illustrated in FIG. 29, detects that the rotary bracket 142 has reached a standby angle. The standby angle sensor 152 then outputs a standby angle signal indicating the detection result to the controller 100*b*. The standby angle is, for example, an angle for the parallel binding. The standby angle sensor 152 is, for example, an optical sensor including a light emitter and a light receiver. The rotary bracket 142 at the standby angle blocks an optical path between the light emitter and the light receiver. The standby angle sensor 152 outputs the standby angle signal in response to the light output from the light emitter not being received by the light receiver. The specific configuration of the standby angle sensor 152 is not limited to the configuration described above.

FIG. 26A illustrates the rotary bracket 142 in a position for the parallel binding that is performed by the crimper 32' disposed downstream from the liquid applier 131 in a direction in which the sheet P is conveyed.

FIG. 26B illustrates the rotary bracket 142 in a position for the oblique binding (i.e., corner binding) that is performed by the crimper 32' disposed downstream from the liquid applier 131 in the direction in which the sheet P is conveyed.

The liquid storage tank 143 stores liquid to be applied to the sheet P. The application head mover 144 is attached by the liquid storage tank 143 so as to be movable (e.g., up and down) in the thickness direction of the sheet P. The application head mover 144 is moved with respect to the liquid storage tank 143 by a driving force transmitted from the application head movement motor 151. The holder 145 is attached to a lower end of the application head mover 144. The liquid application head 146 projects from the holder 145 toward the conveyance passage (downward in the present embodiment). The liquid that is stored in the liquid storage tank 143 is supplied to the liquid application head 146. The liquid application head 146 is made of a material having a relatively high liquid absorption (e.g., sponge or fiber).

The columns 147*a* and 147*b* project downward from the holder 145 around the liquid application head 146. The columns 147*a* and 147*b* are movable relative to the holder 145 in the thickness direction. The columns 147*a* and 147*b* have respective lower ends holding the pressure plate 148.

The pressure plate 148 has a through hole 148*a* at a position where the through hole 148*a* faces the liquid application head 146. The coil springs 149*a* and 149*b* are fitted around the columns 147*a* and 147*b*, respectively, between the holder 145 and the pressure plate 148. The coil springs 149*a* and 149*b* bias the columns 147*a* and 147*b* and the pressure plate 148 in a direction away from the holder 145.

As illustrated in FIGS. 27A and 28A, before the sheet P is conveyed to a position where the sheet P faces the opening of the upper guide plate 5*a*, the pressure plate 148 is positioned at or above the opening. Subsequently, when the sheet P that is conveyed by the conveyance roller pairs 10 and 11 stops at a position where the liquid application position B1 on the sheet P faces the opening, the application head movement motor 151 is rotated in a first direction. As a result, the application head mover 144, the holder 145, the liquid application head 146, the columns 147*a* and 147*b*, the pressure plate 148, and the coil springs 149*a* and 149*b* are moved down together to allow the pressure plate 148 to contact the sheet P. The liquid application position B1 corresponds to the binding position B1 to be crimped and bound by the edge binder 251, specifically, the crimper 32'.

As the application head movement motor 151 keeps rotating in the first direction after the pressure plate 148 contacts the sheet P, the coil springs 149*a* and 149*b* are compressed to further move down the application head mover 144, the holder 145, the liquid application head 146, and the columns 147*a* and 147*b*. As a result, as illustrated in FIGS. 27B and 28B, a lower face of the liquid application head 146 contacts the sheet P through the through hole 148*a*. As a result, the liquid contained in the liquid application head 146 is applied to the sheet P.

Further rotation of the application head movement motor 151 in the first direction further strongly presses the liquid application head 146 against the sheet P as illustrated in FIGS. 27C and 28C. Accordingly, the amount of liquid that is applied to the sheet P increases. In other words, the liquid applier 131 changes the pressing force of the liquid application head 146 against the sheet P to adjust the amount of liquid that is applied to the sheet P.

On the other hand, the rotation of the application head movement motor 151 in the second direction opposite to the first direction moves up the application head mover 144, the holder 145, the liquid application head 146, the columns 147*a* and 147*b*, the pressure plate 148, and the coil springs 149*a* and 149*b* together. As a result, as illustrated in FIGS. 27A and 28A, the liquid application head 146 and the pressure plate 148 are separated from the sheet P. In other words, the liquid applier 131 includes the liquid application head 146 that can be separated from the sheet P.

FIG. 29 is a block diagram illustrating a control block hardware configuration of the post-processing apparatus 3A to control the operation of the post-processing apparatus 3A according to another embodiment of the present disclosure.

As illustrated in FIG. 29, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit and controls the overall operation of the post-processing apparatus 3A.

The RAM 102 is a volatile storage medium that allows data to be read and written at high speed. The CPU 101 uses the RAM 102 as a work area for data processing.

The ROM 103 is a read-only non-volatile storage medium that stores programs such as firmware.

The HDD 104 is a non-volatile storage medium that allows data to be read and written and has a relatively large storage capacity. The HDD 104 stores, e.g., an operating system (OS), various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller thus configured cooperates with hardware resources of the post-processing apparatus 3A to construct functional blocks that implement functions of the post-processing apparatus 3A. In other words, the CPU 101, the RAM 102, the ROM 103, the HDD 104, and the I/F 105 constitute at least part of a controller 100*b* serving as a control device that controls the operation of the post-processing apparatus 3A.

The I/F 105 is an interface that connects the conveyance roller pairs 10, 11, 14, and 15, the switching member 20, the side fences 24L and 24R, the crimper movement motor 238, the crimper pivot motor 239, a contact-separation motor 32*d*, a liquid applier movement motor 137, an application head pivot motor 150, an application head movement motor 151, a standby position sensor 138, a standby angle sensor 152, a hole punch 132, and a control panel 110 to the common bus 109. The controller 100*b* controls, via the I/F 105, the operations of the conveyance roller pairs 10, 11, 14, and 15, the switching member 20, the side fences 24L and 24R, the crimper movement motor 238, the crimper pivot motor 239, the contact-separation motor 32*d*, the liquid applier movement motor 137, the application head pivot motor 150, the application head movement motor 151, and the hole punch 132. The controller 100*b* acquires detection results from the standby position sensor 138 and the standby angle sensor 152 through the I/F 105.

Although FIG. 29 illustrates the components of the edge binder 251 (the crimper 32') that executes edge binding and the components of the liquid applier 131, the components of the saddle binder 28 that executes saddle binding are also controlled by the controller 100*b* like the components of the edge binder 251 and the components of the liquid applier 131.

As illustrated in FIG. 31, the image forming apparatus 2 includes the control panel 110. The control panel 110 includes an operation device that receives instructions input by an operator and a display serving as a notifier that notifies the operator of information. The operation unit includes, for example, hard keys and a touch panel superimposed on a display. The control panel 110 acquires information from the user through the operation unit and provides the information to the user through the display. The post-processing apparatus 3A may include a control panel 110 similar to the above-described control panel 110 of the image forming apparatus 2.

Figure 30:
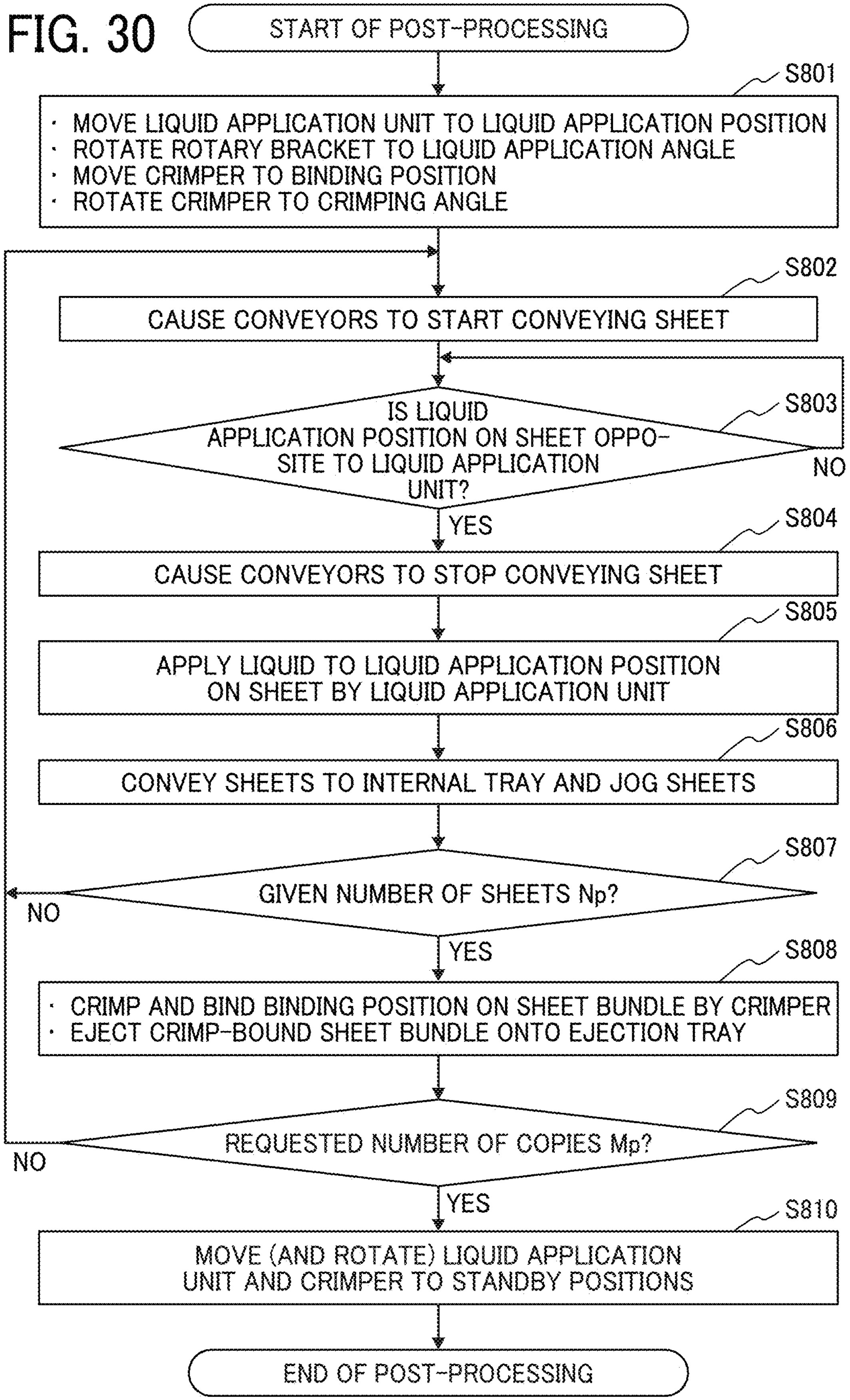
FIG. 30 is a flowchart of post-processing performed by the post-processing apparatus according to another embodiment of the present disclosure.

FIG. 30 is a flowchart of the post-processing process performed by the post-processing apparatus 3A according to another embodiment of the present disclosure.

Specifically, FIG. 30 is a flowchart of a process to execute the one-point binding illustrated in FIGS. 24A to 24C.

For example, the controller 100*b* executes the post-processing illustrated in FIG. 30 when the controller 100*b* acquires an instruction to execute the post-processing from the image forming apparatus 2. In the following description, the instruction to execute the post-processing may be referred to as a “post-processing command.” The post-processing command includes, for example, the number of sheets P of the sheet bundle Pb (referred to as “given number of sheet Np”), the number of sheet bundles Pb to be subjected to binding process (referred to as “requested number of copies Mp”), the binding position B1 (corresponding to the liquid application position B1), the angle of the binding position B1 (corresponding to the angle of the liquid application position B1), the type of binding process (parallel binding process or oblique binding process), and a process that is executed in parallel with the liquid application process (i.e., punching a hole in the present embodiment).

At the start of the post-processing, the liquid application unit 140 is at the standby position HP1 illustrated in FIGS. 26A to 26C whereas the rotary bracket 142 is held at the standby angle (corresponding to the parallel binding posture).

First, in step S801, the controller 100*b* drives the liquid applier movement motor 137 to move the liquid application unit 140 (corresponding to a liquid applier) in the main scanning direction such that a liquid application head 146 moves from the standby position HP1 to a position where the liquid application head 146 can face the liquid application position B1 (see FIG. 26B, the position corresponding to the binding position B1 illustrated in FIGS. 24A to 24C). If the type of the binding process instructed by the post-processing command is “oblique binding process,” in step S801, the controller 100*b* drives the application head pivot motor 150 to rotate the rotary bracket 142. Thus, the liquid application head 146 is rotated from the standby angle to the liquid application angle corresponding to the “oblique binding posture.” It is ascertained, based on a pulse signal output from a rotary encoder of the liquid applier movement motor 137, that the liquid application head 146 has reached the position where the liquid application head 146 can face the liquid application position B1. Similarly, it is ascertained, based on a pulse signal output from a rotary encoder of the application head pivot motor 150, that the liquid application head 146 has reached the liquid application angle. If the type of the binding process instructed by the post-processing command is “parallel binding process”, the controller 100*b* omits the above-described operation of rotating the rotary bracket 142. In other words, the liquid application unit 140 moves in the main scanning direction while holding the rotary bracket 142 at the standby angle.

Further, the controller 100*b* drives the crimper movement motor 238 to move the crimper 32' from the standby position HP2 to the position where the crimper 32' can face the first binding position B1 as illustrated in FIGS. 24A and 24B (step S801). Alternatively, if the type of the binding process instructed by the post-processing command is “oblique binding process”, in step S801, the controller 100*b* drives the crimper pivot motor 239 to rotate the crimper 32' from the standby angle to the crimping angle corresponding to the “oblique binding posture”. It is ascertained, based on a pulse signal output from a rotary encoder of the crimper movement motor 238, that the crimper 32' has reached the position where the crimper 32' can face the binding position B1. Similarly, it is ascertained, based on a pulse signal output from a rotary encoder of the crimper pivot motor 239, that the crimper 32' has reached the crimping angle. If the type of the binding process instructed by the post-processing command is “parallel binding process”, the controller 100*b* omits the above-described operation of rotating the crimper 32'. In other words, the crimper 32' moves in the main scanning direction while maintaining the standby angle.

Subsequently, in step S802, the controller 100*b* drives the conveyance roller pairs 10 and 11 to start conveying the sheet P on which an image is formed by the image forming apparatus 2. The controller 100*b* determines whether the liquid application position B1 on the sheet P faces first the liquid application unit 140 (more specifically, the liquid application head 146) (step S803). In other words, the controller 100*b* determines whether the liquid application unit 140 has faced the first liquid application position B1 on the sheet P. When the liquid application position B1 on the sheet P has not faced the liquid application head 146 (NO in step S803), the controller 100*b* repeats the determination in step S803. In other words, the controller 100*b* continues driving the conveyance roller pairs 10 and 11 until the first liquid application position B1 on the sheet P faces the liquid application head 146. The controller 100*b* determines whether the liquid application position B1 on the sheet P has faced the liquid application unit 140 (more specifically, the liquid application head 146) (step S803). In other words, the controller 100*b* determines whether the liquid application unit 140 has faced the liquid application position B1 on the sheet P. When the liquid application position B1 on the sheet P has not faced the liquid application head 146 (NO in step S803), the controller 100*b* repeats the determination in step S803. In other words, the controller 100*b* continues driving the conveyance roller pairs 10 and 11 until the liquid application position B1 on the sheet P faces the liquid application head 146. When the liquid application position B1 on the sheet P has faced the liquid application head 146 (YES in step S803), the controller 100*b* causes the conveyance roller pairs 10 and 11 (step S804) to stop conveying the sheet P. It is ascertained, based on a pulse signal output from a rotary encoder of a motor that drives the conveyance roller pairs 10 and 11, that the liquid application position B1 on the sheet P has faced the liquid application head 146.

The controller 100*b* causes the liquid application unit 140 to execute the process of applying liquid to the liquid application position B1 on the sheet P (step S805). More specifically, the controller 100*b* rotates the application head movement motor 151 in the first direction to bring the liquid application head 146 into contact with the liquid application position B1 on the sheet P. The controller 100*b* changes the pressing force of the liquid application head 146 (i.e., the amount of rotation or rotation speed of the application head movement motor 151) depending on the amount of liquid to be applied to the sheet P.

The amount of liquid that is applied to the sheet P may be the same for all the sheets P of the sheet bundle Pb or may be different for each sheet P. For example, the controller 100*b* may decrease the amount of liquid applied to a sheet P conveyed later. The amount of rotation of the application head movement motor 151 may be ascertained based on a pulse signal outputted from a rotary encoder of the application head movement motor 151.

In step S806, the controller 100*b* drives the conveyance roller pairs 10, 11, 14, and 15 to place a sheet P on the internal tray 22. The controller 100*b* moves the side fences 24L and 24R to align the position of the sheet P or the sheet bundle Pb placed on the internal tray 22 in the main scanning direction (step S806). In short, the controller 100*b* performs so-called jogging.

The controller 100*b* determines whether the number of sheets P placed on the internal tray 22 has reached the given number of sheets Np indicated by the post-processing command (step S807). When the controller 100*b* determines that the number of sheets P placed on the internal tray 22 has not reached the given number of sheets Np (NO in step S807), the controller 100*b* executes the operations of steps S802 and S803 again until the number of sheets P placed on the internal tray 22 reaches the given number of sheets Np (YES in step S807).

By contrast, when the controller 100*b* determines that the number of sheets P that are placed on the internal tray 22 has reached the given number of sheets Np (YES in step S807), the controller 100*b* causes the crimper 32' to crimp the binding position B1 (corresponding to the liquid application position B1) on the sheet bundle Pb to which the liquid has been applied by the liquid application unit 140 (step S808). In addition, in step S808, the controller 100*b* rotates the conveyance roller pair 15 to eject the crimped sheet bundle Pb to the second ejection tray 26.

The controller 100*b* determines whether the number of sheet bundles Pb thus ejected to the second ejection tray 26 has reached the requested number of copies Mp indicated by the binding command (step S809). When the controller 100*b* determines that the number of the sheet bundles Pb ejected to the second ejection tray 26 has not reached the requested number of copies Mp (NO in step S809), the controller 100*b* repeats the processing of steps S802 to S809 until the number of the sheet bundles Pb ejected to the second ejection tray 26 reaches the requested number of copies Mp (YES in step S809).

When the controller 100*b* determines that the number of sheet bundles Pb ejected to the second ejection tray 26 reaches the requested number of copies Mp (YES in step S809), the controller 100*b* drives the liquid applier movement motor 137 to move the liquid application unit 140 to the standby position HP1 (see FIG. 26) and drives the crimper movement motor 238 to move the crimper 32' to the standby position HP2 (see FIG. 24) (step S810). When the posture that is instructed by the post-processing operation is the "oblique binding posture," the controller 100*b* drives the application head pivot motor 150 and the crimper pivot motor 239 to rotate the liquid application unit 140 and crimper 32' and the parallel binding posture (standby angle) into the parallel binding posture (step S810). By contrast, when the posture that is instructed by the post-processing operation is the "parallel binding posture," the controller 100*b* skips the aforementioned operation of rotating the liquid application unit 140 and the crimper 32' to the parallel binding posture (standby angle). In steps S801 and S810, the execution order of the movement in the main scanning direction and the rotation in the forward and reverse directions of the liquid application unit 140 and the crimper 32' is not limited to the aforementioned order and may be reversed.

The embodiments of the present disclosure are applied to the edge binder 25 that executes the edge binding as described above. However, the embodiments of the present disclosure may be applied to the saddle binder 28 that executes the saddle binding.

The controller 100*b* of the post-processing apparatus 3A according to another embodiment illustrated in FIG. 23 is provided separately from the controller 100*a* of the image forming apparatus 2 as in the configuration of FIG. 1. However, embodiments of the present disclosure are not limited to the above-described configuration. For example, as illustrated in FIG. 32A, the controller 100*b* of the post-processing apparatus 3A may be disposed in the image forming apparatus 2. Further, as in the configuration of FIG. 32B, the controller 100*b* of the post-processing apparatus 3A may be integrated with the controller 100*a* of the image forming apparatus 2.

As in the configuration of FIG. 33A, the controller 100*b* of the post-processing apparatus 3A may be divided into a controller 100*bl* (e.g., a driver system such as a motor) and a controller 100*b*2 (a detector such as a sensor) according to the function, and the controller 100*b*2 of the post-processing apparatus 3A may be disposed in the image forming apparatus 2. Further, as in the configuration of FIG. 33B, the controller 100*b*2 of the post-processing apparatus 3A disposed in the image forming apparatus 2 may be integrated with the controller 100*a* of the image forming apparatus 2.

As described above, the control instruction by the controller 100*b* described above is implemented by cooperation between hardware resources of a computer and a program as computer software. In other words, the control instruction may be executed by causing an arithmetic device, a storage device, an input device, an output device, and a control device to operate in cooperation with each other based on a program. In addition, the program may be written in, for example, a storage device or a storage medium and distributed, or may be distributed through, for example, an electric communication line.

Embodiments of the present disclosure are not limited to the above-described embodiments, and numerous additional modifications and variations are possible in light of the teachings within the technical scope of the appended claims. It is therefore to be understood that the above-described embodiments of the present disclosure may be practiced otherwise by those skilled in the art than as specifically described herein. Such embodiments and variations thereof are included in the scope and gist of the embodiments of the present disclosure and are included in the embodiments described in claims and the equivalent scope thereof.

Aspects of the Present Disclosure

Aspects of the present disclosure are, for example, as follows.

Aspect 1

In Aspect 1, a medium processing apparatus (for example, the post-processing apparatus 3) includes a liquid applier (for example, the liquid applier 31), a post-processing device (for example, the crimper 32), a liquid storage unit (for example, the first liquid storage tank 44, the second liquid storage tank 47), a liquid detector (for example, the first liquid amount detection sensor 43, the second liquid amount detection sensor 94), and circuitry (for example, the controller 100*b*). The liquid applier applies liquid to a part of at least one medium (for example, the sheet P). The post-processing device performs a given process on a bundle of media including the at least one medium on which the liquid is applied by the liquid applier. The liquid storage unit stores the liquid. The liquid detector detects the liquid in the liquid storage unit. The circuitry is to determine whether to cause the liquid applier to apply the liquid on the at least one medium based on a detection result of the liquid detector, and set a number of times of application of the liquid to be equal to or less than a given number of times of application of the liquid when the liquid detector does not detect the liquid in the liquid storage unit.

Aspect 2

In Aspect 2, in the medium processing apparatus (for example, the post-processing apparatus 3) according to Aspect 1 or 2, the number of times of application of the liquid is determined based on a number of media to be included per bundle of media (for example, the liquid applier 31).

Aspect 3

In Aspect 3, in the medium processing apparatus (for example, the post-processing apparatus 3) according to Aspect 1 or 2, the circuitry (for example, the controller 100*b*) is further to cause the liquid applier (for example, the liquid applier 31) to apply the liquid on a part of the bundle of media (for example, the sheet bundle Pb), when the liquid detector (for example, the first liquid amount detection sensor 43, the second liquid amount detection sensor 94) detects a least amount of liquid among a remaining amount of the liquid detectable by the liquid detector.

Aspect 4

In Aspect 4, in the medium processing apparatus (for example, the post-processing apparatus 3) according to any one of Aspects 1 to 3, the circuitry (for example, the controller 100*b*) is to cause the liquid applier (for example, the liquid applier 31) not to apply the liquid on a second bundle of media, when the at least one medium to which the liquid is applied is a final medium of the bundle of media (for example, the sheet bundle Pb), and the number of times of application of the liquid by the liquid applier is less than a maximum number of times of application of the liquid on the bundle of media to which the given process is performed.

Aspect 5

In Aspect 5, the medium processing apparatus (for example, the post-processing apparatus 3) according to Aspect 4 further includes a liquid application operation mode selection unit (for example, the liquid application operation mode selection screen G17) to allow a user to select a liquid application operation mode to be used when the liquid is applied on the bundle of media (for example, the sheet bundle Pb), and determine whether to apply the liquid by the liquid applier (for example, the liquid applier 31) in accordance with the liquid application operation mode that is selected. The circuitry (for example, the controller 100*b*) is further to enable a selection of the liquid application operation mode by the liquid application operation mode selection unit when the number of times of application of the liquid by the liquid applier is less than a maximum number of times of application of the liquid on the bundle of media.

Aspect 6

In Aspect 6, the medium processing apparatus (for example, the post-processing apparatus 3) according to Aspect 4 or 5, the circuitry (for example, the controller 100*b*) is further to automatically transit to the liquid application operation mode selected in advance by the liquid application operation mode selection unit (for example, the liquid application operation mode selection screen G17), when the number of times of application of the liquid by the liquid applier (for example, the liquid applier 31) is less than the maximum number of times of application of the liquid on the bundle of media.

Aspect 7

In Aspect 7, the medium processing apparatus (for example, the post-processing apparatus 3) according to any one of Aspects 4 to 6 further includes a display (for example, the display 200) to display a replenishing method to replenish the liquid to the liquid storage unit (for example, the first liquid storage tank 44, the second liquid storage tank 47). The circuitry (for example, the controller 100*b*) is further to cause the display (for example, the display 200) to display the replenishing method when the user selects a replenishment of the liquid to the liquid storage unit via the liquid application operation mode selection unit (for example, the liquid application operation mode selection screen G17).

Aspect 8

In Aspect 8, the medium processing apparatus (for example, the post-processing apparatus 3) according to Aspect 6 or 7, the circuitry (for example, the controller 100*b*) is further to cause the display (for example, the display 200) to continuously display the replenishing method.

Aspect 9

In Aspect 9, the medium processing apparatus (for example, the post-processing apparatus 3) according to any one of Aspects 6 to 9 further includes a process mode setting unit (for example, the job setting screen G18) to allow a user to select a kind of the given process. The circuitry (for example, the controller 100*b*) is further to cause the process mode setting unit to display a warning message in accordance with the liquid application operation mode, when the number of times of application of the liquid by the liquid applier (for example, the liquid applier 31) is less than the maximum number of times of application of the liquid on the bundle of media (for example, the sheet bundle Pb), and a crimp binding mode is selected via the process mode setting unit.

Aspect 10

In Aspect 10, an image forming system (for example, the image forming system 1) includes an image forming apparatus (for example, the image forming apparatus 2), the medium processing apparatus (for example, the post-processing apparatus 3) according to any one of Aspects 1 to 9, and circuitry (for example, the controller 100*b*). The image forming apparatus forms an image on a medium (for example, the sheet P). The medium processing apparatus (for example, the post-processing apparatus 3) includes a liquid applier (for example, the liquid applier 31), a post-processing device (for example, the crimper 32), a liquid storage unit (for example, the first liquid storage tank 44, the second liquid storage tank 47), a liquid detector (for example, the first liquid amount detection sensor 43, and the second liquid amount detection sensor 94). The liquid applier applies liquid to a part of at least one medium (for example, the sheet P), on which the image is formed by the image forming apparatus. The post-processing device performs a given process on a bundle of media including the at least one medium on which the liquid is applied by the liquid applier. The liquid storage unit stores the liquid. The liquid detector detects the liquid in the liquid storage unit. The circuitry is to determine whether to cause the liquid applier to apply the liquid on the at least one medium based on a detection result of the liquid detector, and set a number of times of application of the liquid to be equal to or less than a given number of times of application of the liquid when the liquid detector does not detect the liquid in the liquid storage unit.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A medium processing apparatus comprising:
a liquid applier to apply liquid to a part of at least one medium;
a post-processing device to perform a given process on a bundle of media including the at least one medium on which the liquid is applied by the liquid applier;
a liquid storage unit to store the liquid;
a liquid detector to detect the liquid in the liquid storage unit; and
circuitry configured to:
determine whether to cause the liquid applier to apply the liquid on the at least one medium based on a detection result of the liquid detector; and
set a number of times of application of the liquid to be equal to or less than a given number of times of application of the liquid when the liquid detector does not detect the liquid in the liquid storage unit.

2. The medium processing apparatus according to claim 1, wherein the number of times of application of the liquid is determined based on a number of media to be included per bundle of media.

3. The medium processing apparatus according to claim 1, wherein the circuitry is further configured to cause the liquid applier to apply the liquid on a part of the bundle of media, when the liquid detector detects a least amount of liquid among a remaining amount of the liquid detectable by the liquid detector.

4. The medium processing apparatus according to claim 1, wherein the circuitry is further configured to cause the liquid applier not to apply the liquid on a second bundle of media,
when the at least one medium to which the liquid is applied is a final medium of the bundle of media; and
the number of times of application of the liquid by the liquid applier is less than a maximum number of times of application of the liquid on the bundle of media to which the given process is performed.

5. The medium processing apparatus according to claim 4, further comprising a liquid application operation mode selection unit to allow a user to:
select a liquid application operation mode to be used when the liquid is applied on the bundle of media; and
determine whether to apply the liquid by the liquid applier in accordance with the liquid application operation mode that is selected,
wherein the circuitry is further configured to enable a selection of the liquid application operation mode by the liquid application operation mode selection unit when the number of times of application of the liquid by the liquid applier is less than a maximum number of times of application of the liquid on the bundle of media.

6. The medium processing apparatus according to claim 5, wherein the circuitry is further configured to automatically transit to the liquid application operation mode selected in advance by the liquid application operation mode selection unit, when the number of times of application of the liquid by the liquid applier is less than the maximum number of times of application of the liquid on the bundle of media.

7. The medium processing apparatus according to claim 5, further comprising a display to display a replenishing method to replenish the liquid to the liquid storage unit,
wherein the circuitry is further configured to cause the display to display the replenishing method when the user selects a replenishment of the liquid to the liquid storage unit via the liquid application operation mode selection unit.

8. The medium processing apparatus according to claim 7, wherein the circuitry is further configured to cause the display to continuously display the replenishing method.

9. The medium processing apparatus according to claim 5, further comprising a process mode setting unit to allow a user to select a kind of the given process,
wherein the circuitry is further configured to cause the process mode setting unit to output a warning message in accordance with the liquid application operation mode,
when the number of times of application of the liquid by the liquid applier is less than the maximum number of times of application of the liquid on the bundle of media; and
a crimp binding mode is selected via the process mode setting unit.

10. An image forming system comprising:
an image forming apparatus to form an image on a medium; and
the medium processing apparatus according to claim 1 to perform the given process on the bundle of media including the at least one medium on which the image is formed by the image forming apparatus.

11. An image forming system comprising:
an image forming apparatus to form an image on a medium;
a medium processing apparatus including
a liquid applier to apply liquid to a part of at least one medium, on which the image is formed by the image forming apparatus,
a post-processing device to perform a given process on a bundle of media including the at least one medium on which the liquid is applied by the liquid applier,
a liquid storage unit to store the liquid, and
a liquid detector to detect the liquid in the liquid storage unit; and
circuitry configured to:
determine whether to cause the liquid applier to apply the liquid on the at least one medium based on a detection result of the liquid detector; and set a number of times of application of the liquid to be equal to or less than a given number of times of application of the liquid when the liquid detector does not detect the liquid in the liquid storage unit.

* * * * *